United States Patent [19]

Taniguchi et al.

[11] Patent Number: 5,369,460
[45] Date of Patent: Nov. 29, 1994

[54] CAMERA HAVING A VARIFOCAL LENS

[75] Inventors: Nobuyuki Taniguchi; Masaaki Nakai; Takanobu Omaki; Tokuji Ishida; Hisayuki Masumoto; Hisashi Tokumaru; Tsuneyo Metabi, all of Osaka, Japan

[73] Assignee: Minolta Camera Kabushiki Kaisha, Osaka, Japan

[21] Appl. No.: 117,774

[22] Filed: Sep. 8, 1993

Related U.S. Application Data

[62] Division of Ser. No. 389,908, Aug. 4, 1989, Pat. No. 5,274,414.

[30] Foreign Application Priority Data

Aug. 5, 1988 [JP] Japan .................. 63-196626

[51] Int. Cl.⁵ .................... G03B 5/00; G03B 13/36
[52] U.S. Cl. .................... 354/400; 354/195.1
[58] Field of Search ............ 354/400, 195.1, 195.12, 354/484, 468, 286

[56] References Cited

U.S. PATENT DOCUMENTS

| | | | |
|---|---|---|---|
| 4,376,265 | 3/1983 | Kiuchi et al. | 354/468 X |
| 4,547,770 | 10/1985 | Suzuki et al. | 354/468 X |
| 4,748,509 | 5/1988 | Otake et al. | 354/400 X |
| 4,847,650 | 7/1989 | Iida et al. | 354/400 |
| 5,113,210 | 5/1992 | Kashiyama et al. | 354/400 |

Primary Examiner—W. B. Perkey
Attorney, Agent, or Firm—Burns, Doane, Swecker & Mathis

[57] ABSTRACT

A camera in which the ratio of an object to the photographing frame can be set comprises a varifocal lens in which the in-focus position is changed in accordance with the change in the focal lens and a focusing lens for correcting the focus by the varifocal lens. The size of the object is set to the desired size by using the varifocal lens, and thereafter the deviation of the in-focus point is controlled by the focusing lens. Since the zooming is carried out by using a varifocal lens, a camera can be provided in which the ratio of an object to the photographing frame can be set in a simple structure.

12 Claims, 54 Drawing Sheets

FIG.11
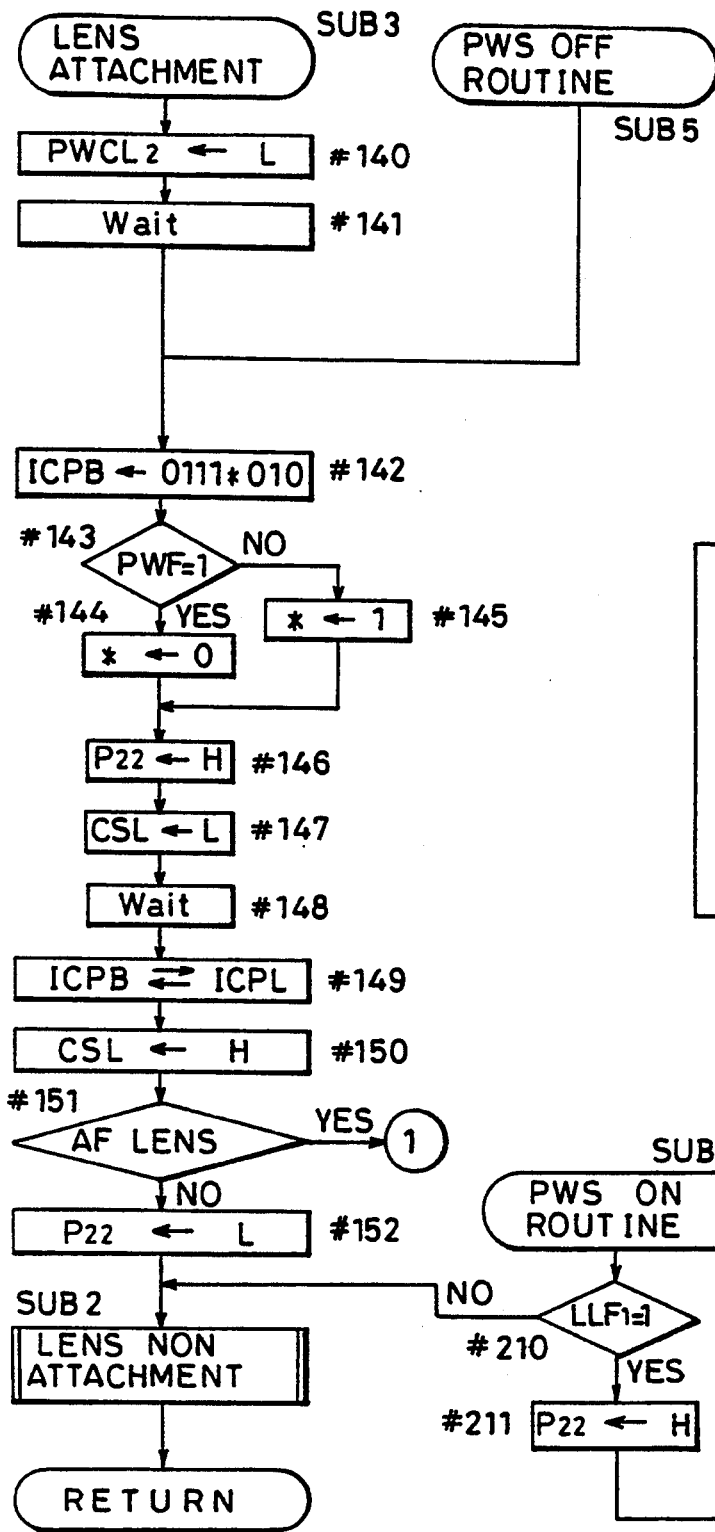
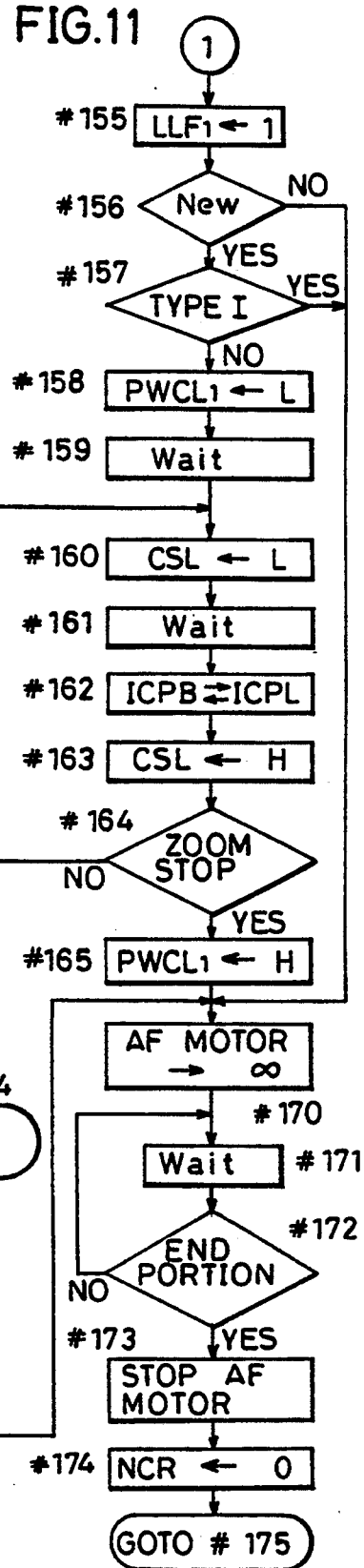

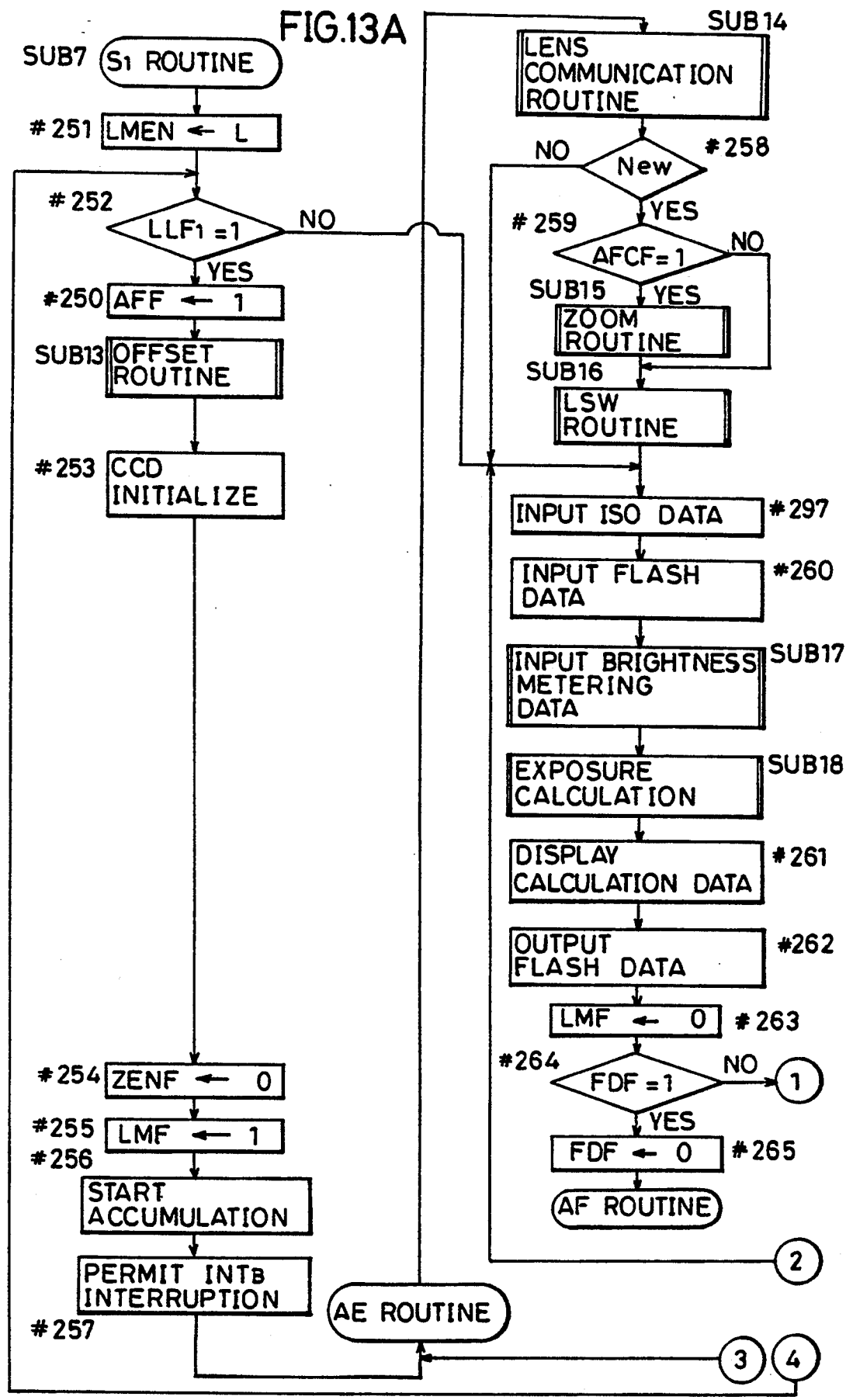

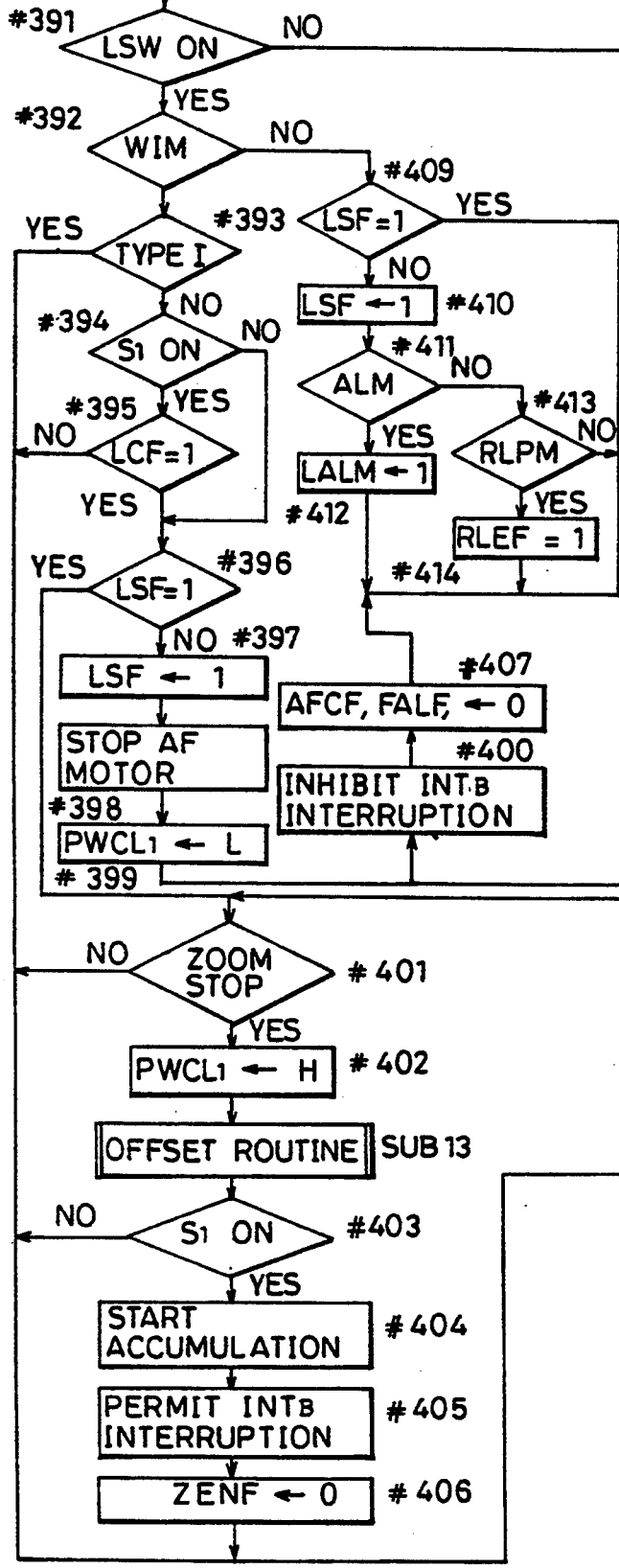
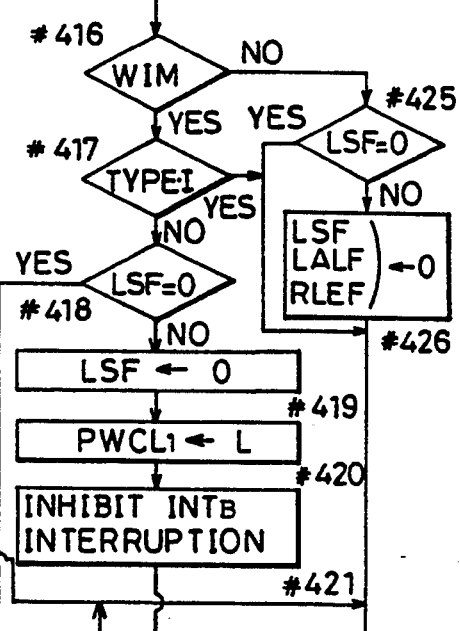
FIG.18

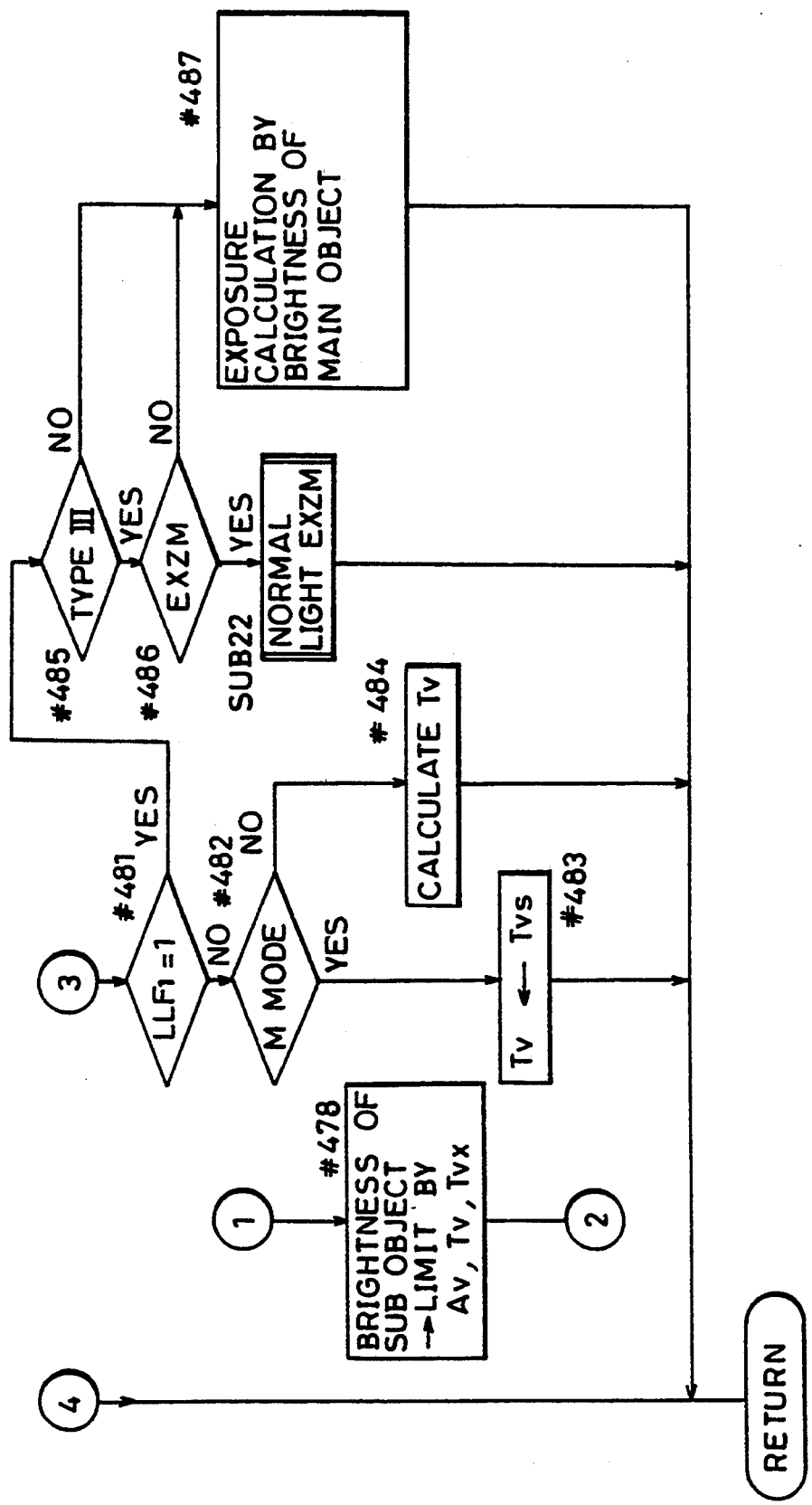

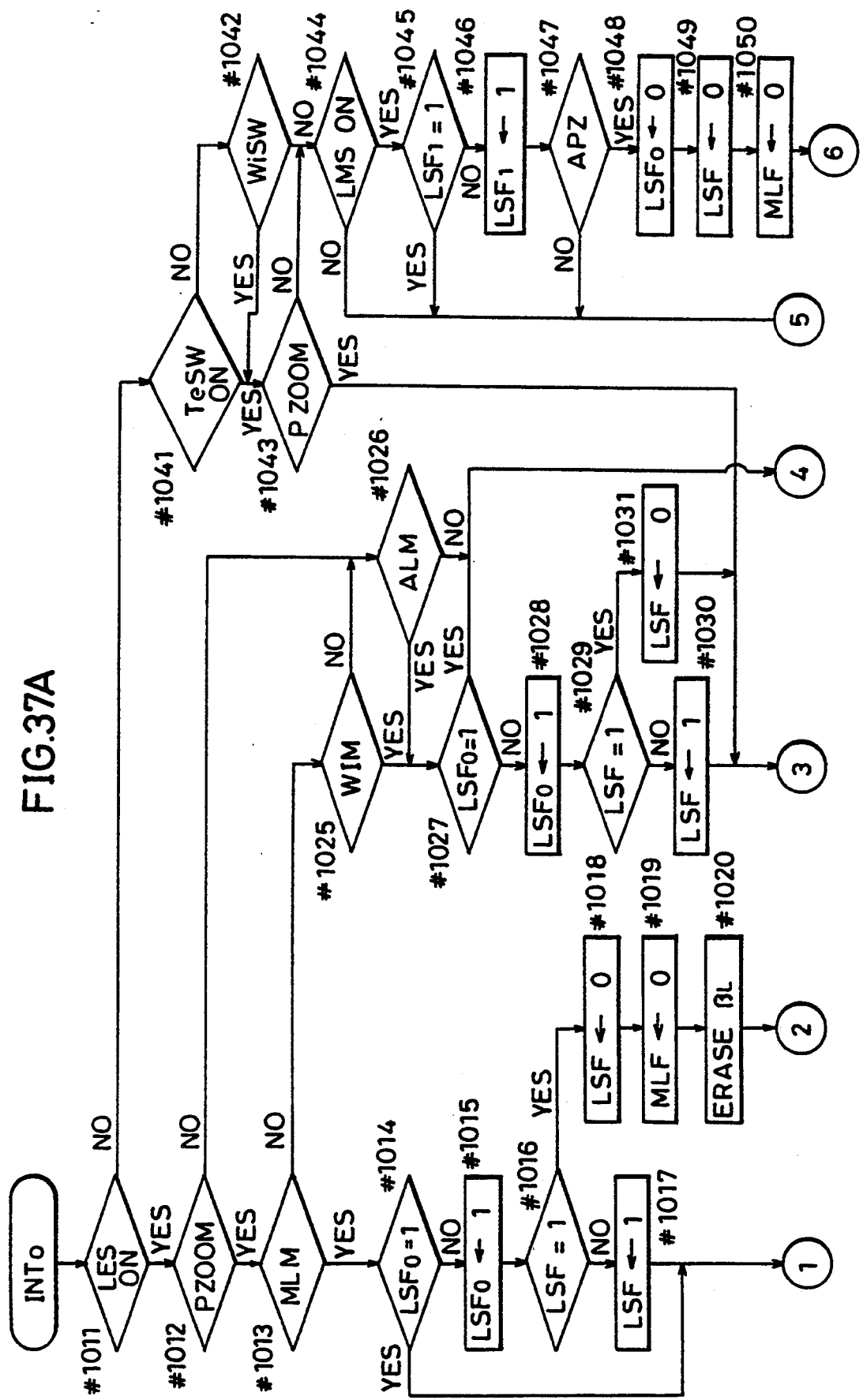

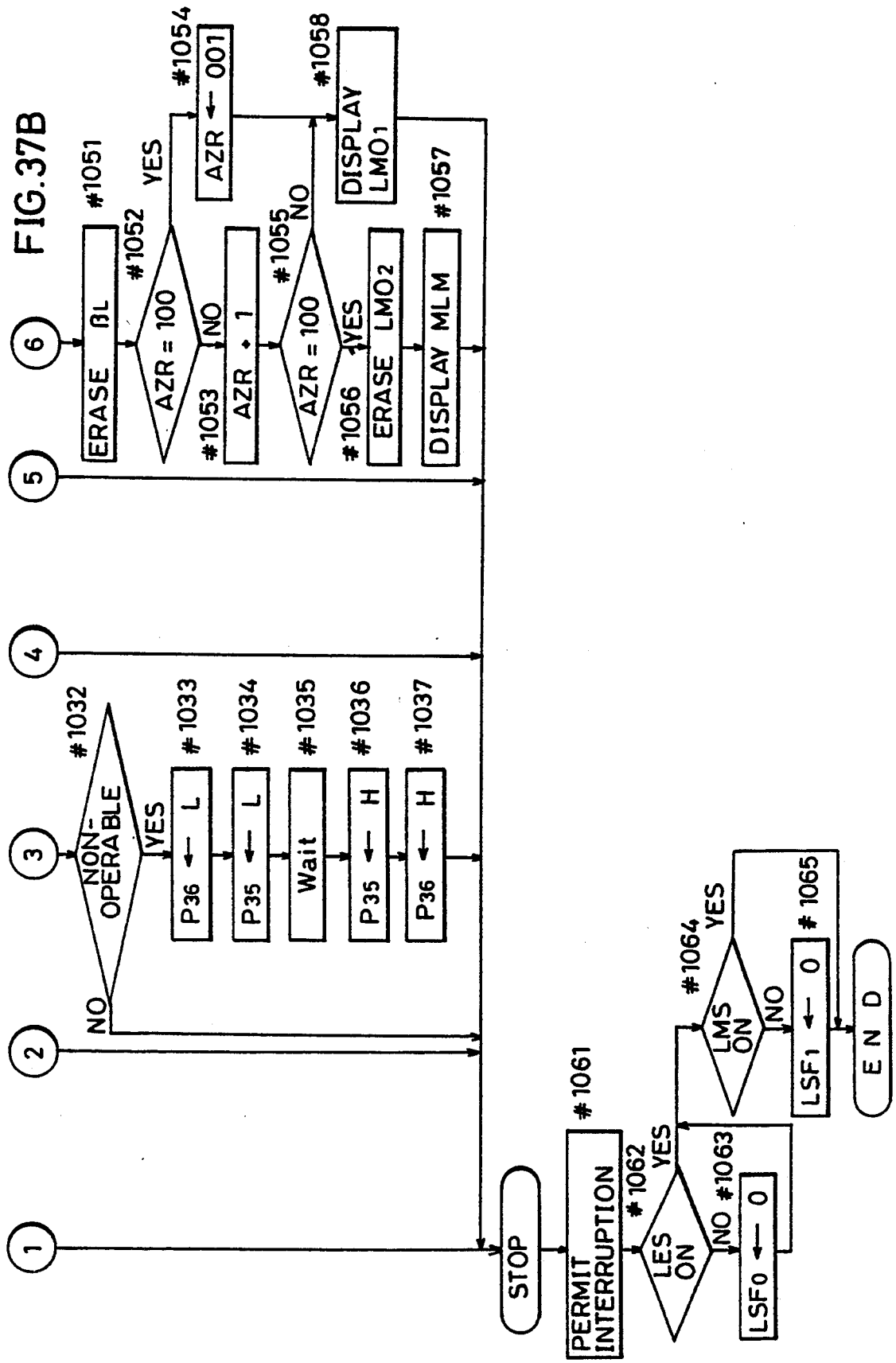

CAMERA HAVING A VARIFOCAL LENS

This application is a divisional of application Ser. No. 07/389,908, filed Aug. 4, 1989 now U.S. Pat. No. 5,274,414.

BACKGROUND OF THE INVENTION

1. Field of the Invention

The present invention relates to a camera having a varifocal lens and, more specifically, to a camera having a varifocal lens in which the ratio of an object to a photographing frame can be set.

2. Description of the Related Art

A camera system of particular interest to the present invention is disclosed in, for example Japanese Patent Laying Application Laid Open No. 63-220118. According to this publication, the camera system comprises an apparatus for setting the ratio of an object to the photographing frame. The focal length is calculated from the photographing distance and the ratio of the object, and the zoom lens is driven so as to realize the calculated focal length. However, the structure of this camera system is complicated, since it employs a zoom lens.

SUMMARY OF THE INVENTION

Therefore, one object of the present invention is to simplify structure of a camera system in which the ratio of the object to the photographing frame is automatically set.

Another object of the present invention is to ensure focus adjustment in a camera system having a varifocal lens and a focusing lens each driven by a motor.

A further object of the present invention is to change methods for driving respective lenses in correspondence with the capacitance of the driving source for driving the lenses, in a camera system having a varifocal lens and focusing lens.

The above described objects of the present invention can be attained by a camera system comprising a distance measuring apparatus for measuring an object distance, a focal length calculating apparatus for calculating the focal length of the varifocal lens based on the object distance, and a correcting amount calculating apparatus for calculating an amount of driving the focusing lens for correction based on the focal length so as to enable focus detection of the focusing lens during zooming in a range from the infinite photographing position to the closest photographing position.

Since the camera system comprises the above described components, when a prescribed photographing frame is determined, the focal length of the varifocal lens can be calculated based on the object distance at that time, and the focusing lens is moved to a prescribed in-focus position so that the image is in the in-focus state.

Therefore, a varifocal lens is employed in a camera system, in which the ratio of the object to the photographing frame can be set. Consequently, the structure of a camera in which the ratio of the object to the photographing frame can be set is simplified.

In accordance with another aspect of the present invention, the camera system of the present invention comprises a varifocal lens driving apparatus having a zooming motor for driving the varifocal lens, a focusing lens driving apparatus having a focusing motor for driving the focusing lens, a power supply for supplying power to the zooming motor and the focusing motor, a power supply capacity detecting apparatus for detecting the capacity of the power supply, and a lens driving controlling apparatus for controlling the motors so that the both motors are driven in accordance with the capacity of the power supply.

Since the camera system comprises the above described components, the varifocal lens and the focusing lens for correcting defocus of the varifocal lens are driven in correspondence with the capacity of the power supply at the time of photographing.

Therefore, when the capacity of the power supply is sufficient, both lenses are driven, and when the power supply capacity is not sufficient, the lenses are not driven.

Consequently, the focus adjustment can be positively carried out in a camera system having a varifocal lens and a focusing lens.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6-12, 13A, 13B, 14-19, 20A, 20B, 21-23, 24A, 24B, 25-36, 37A, 37B, 38, 39A, 39B, 40-44, 45A, 45B, 46, 47A, 47B and 48 are flow charts for illustrating the operation of the present invention;

DESCRIPTION OF THE PREFERRED EMBODIMENTS

Figure 1:
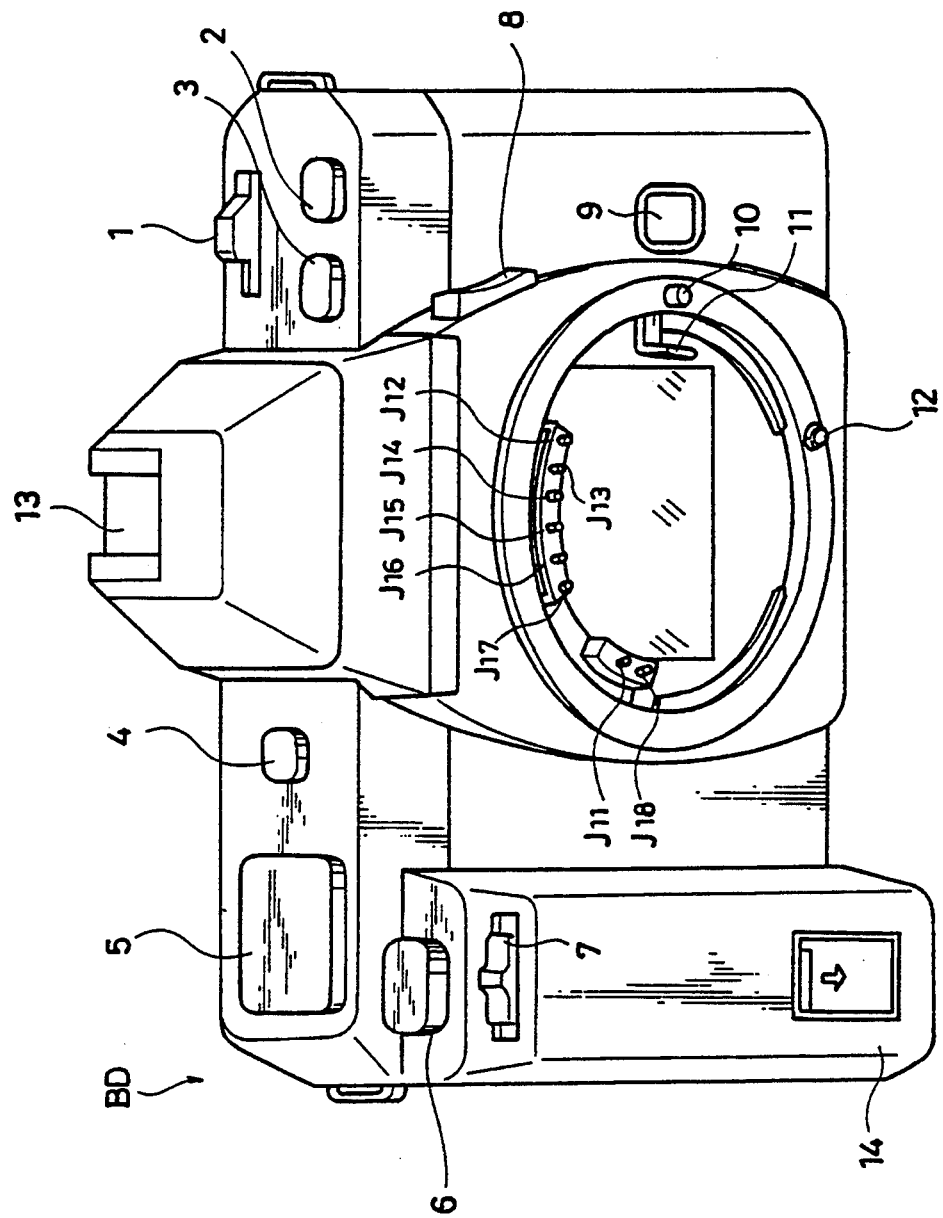
FIG. 1 is a perspective view of a camera body to which the present invention is applied.
Figure 2:
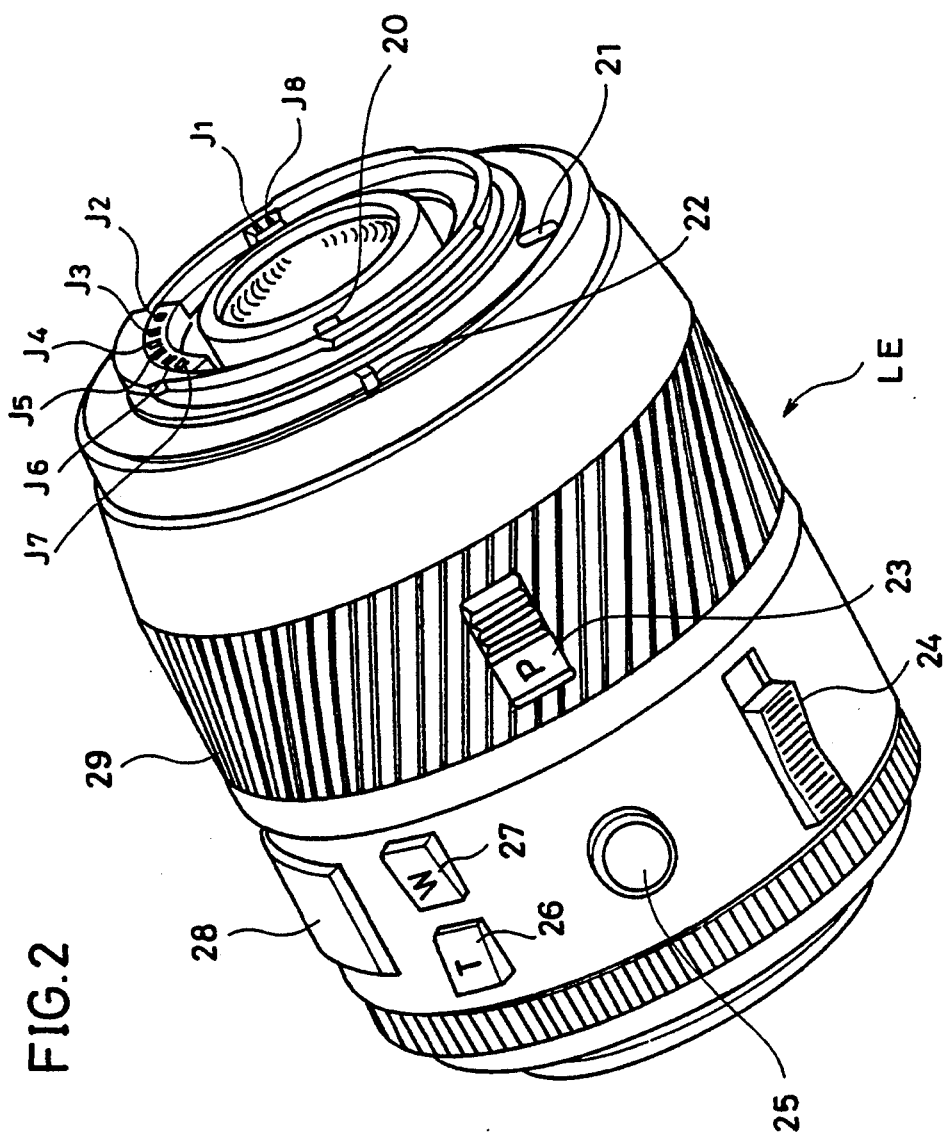
FIG. 2 is a perspective view of an interchangeable lens unit to which the present invention is applied.

One embodiment of the present invention will be hereinafter described. Referring to FIG. 1, the following operations are carried out by using various switches and the like provided on a camera body BD to which the present invention is applied. When a main switch 1 is ON, the camera body BD is in an active state, while it is in an inactive state when the main switch 1 is OFF.

Function of a lens unit selectable by a lens key 25 provided on an interchangeable lens unit LE changes every time a function key 2 is pressed. The functions are stored as lens switch modes $LMO_2$, and switched every time the function key 2 is pressed, in the order of inoperable mode, ALM (AE-lock Mode), RLPM (Release Priority Mode), AVSM (Aperture Value Setting Mode) and the inoperable mode. When the ALM (AE-lock Mode) is selected, and the lens key 25 is pressed once, the camera is set in the AE lock mode, and when the lens key 25 is pressed twice, the AE lock mode is cancelled. When the RLPM (Release Priority Mode) is selected, the camera is in the release priority mode while the lens key 25 is pressed. When the AVSM (Aperture Value Setting Mode) is selected, the setting of the aperture value Av is made possible while the lens key 25 is pressed. However, when the camera is in the MLM (Magnification Rate Lock Mode), which will be described later, the lens key 25 serves as a switch for locking the magnification rate and for cancelling the same. When the camera is set in a WIM (Wide Mode), the lens key 25 serves as a switch for setting and cancelling the wide zoom.

Exposure control mode is switched every time a mode key 3 is pressed, in the order of a program AE mode (P mode), an aperture priority AE mode (A mode), a shutter speed priority AE mode (S mode), a manual mode (M mode) and the program AE mode (P mode).

The camera body BD comprises a system reset key 4. When the system reset key 4 is pressed, the lens switch mode $LMO_2$ is set in the inoperable mode, and the exposure control mode is set in the P mode. A focusing lens is moved realward to the infinite focusing position. A present position register NCR for storing the amount of movement of the focusing lens from the infinite focusing position is reset to 0.

A displaying portion 5 on the camera body displays the exposure control mode, a lens mode $LMO_1$, the lens switch mode $LMO_2$, exposure time, aperture value and so on. At a displaying portion in a finder (not shown), the in-focus state, incapability of focus detection, exposure time, aperture value, emission of flash and so on are displayed.

When a shutter button 6 is pressed to a first stroke, a photographing preparatory switch $S_1$, which will be described later, is turned on to start various operations such as measurement of brightness, calculation of exposure and automatic focusing. When the button 6 is pressed to a second stroke, a release switch $S_2$, which will be described later, is turned on to start exposure controlling operation.

When an up/down lever 7 is slid in the left direction, an up switch UPS, which will be described later, is turned on to carry out stepping-up operation. When the up/down lever 7 is slid in the right direction, a down switch DOS, which will be described later, is turned ON to carry out the stepping-down operation. When the up operation is carried out, the shutter speed Tv becomes +1.0 Ev in the S mode. In the A mode, the aperture value Av becomes +0.5 Ev. In the M mode, Tv becomes +1.0 Ev when the Av selection key 8 is not pressed, and the value becomes +0.5 Ev when the key 8 is pressed. When the stepping-down operation is carried out, the value Tv becomes −1.0 Ev in the S mode, the value Av becomes −0.5 Ev in the A mode, in the M mode the value Tv becomes −1.0 Ev when the Av selection key 8 is not pressed, while the value Av becomes −0.5 Ev when the selection key 8 is pressed.

When the Av selection key 8 is pressed in the M mode and the up/down lever 7 is operated, the Av value changes. The function of the Av selection key 8 can be realized by the lens key 25 when the AVSM (Aperture Value Setting Mode) is selected by the function key 2.

A mount lock releasing button 9 and a mount lock pin 10 are provided on the camera body BD. When the mount lock releasing button 9 is pressed, the mount lock pin 10 is recessed in the camera body to release the mount locking and the interchangeable lens unit LE can be removed. When the interchangeable lens unit LE is mounted and the camera body BD is in the mount lock state, a lens lock switch LLS, which will be described later, is OFF. Otherwise, the lens lock switch LLS is ON.

A stopping down lever 11 is to stop down the aperture of the interchangeable lens unit LE by the number of steps of stopping down calculated in the camera body BD.

An AF coupler 12 is rotary driven based on a rotation of an AF motor in the camera body BD.

A hot shoe 13 to which a flash is mounted comprises terminals $J_{30}$ to $J_{37}$ (not shown).

When a lever provided on a portion 14 for mounting a lens mode setting member (for example an IC card) is moved downward in the direction shown by an arrow, a lid of the mounting portion 14 is opened to permit attachment of the lens mode setting member. There are three lens mode setting members, and the lens mode $LMO_1$ is not set until any one of these is attached.

Figure 52:
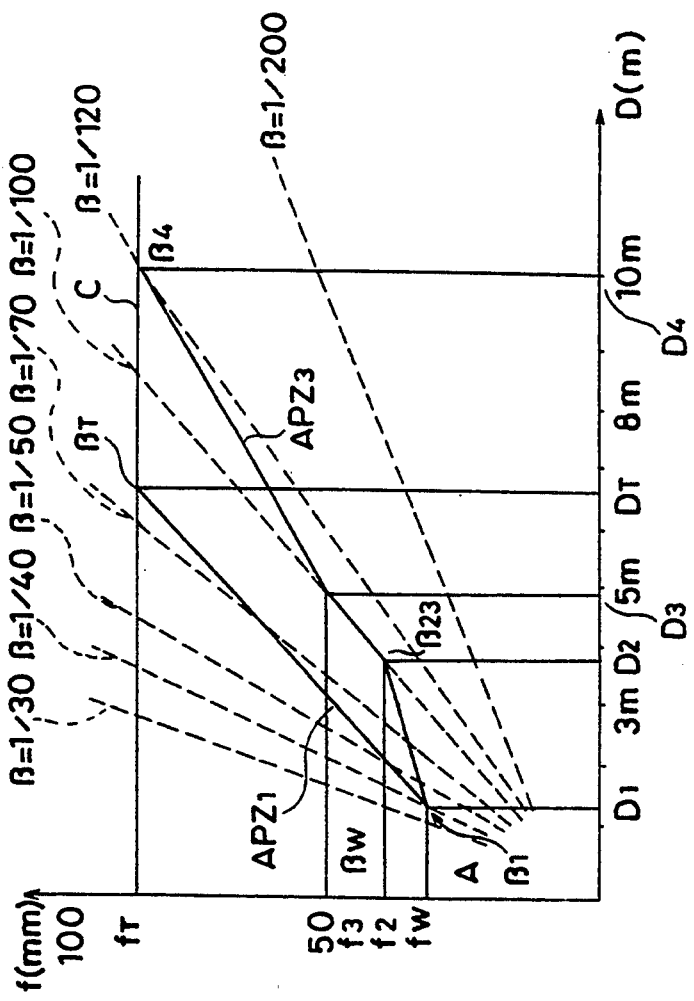
FIGS. 50 to 52 show the program lines of automatic programming of zooming employed in the present invention.
Figure 50:
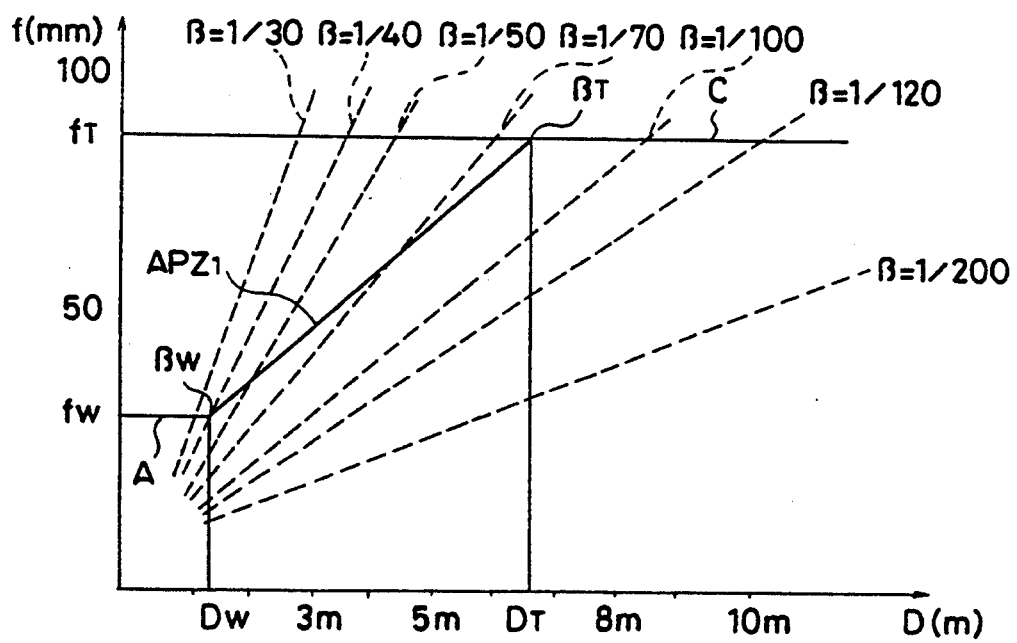
Figure 51:
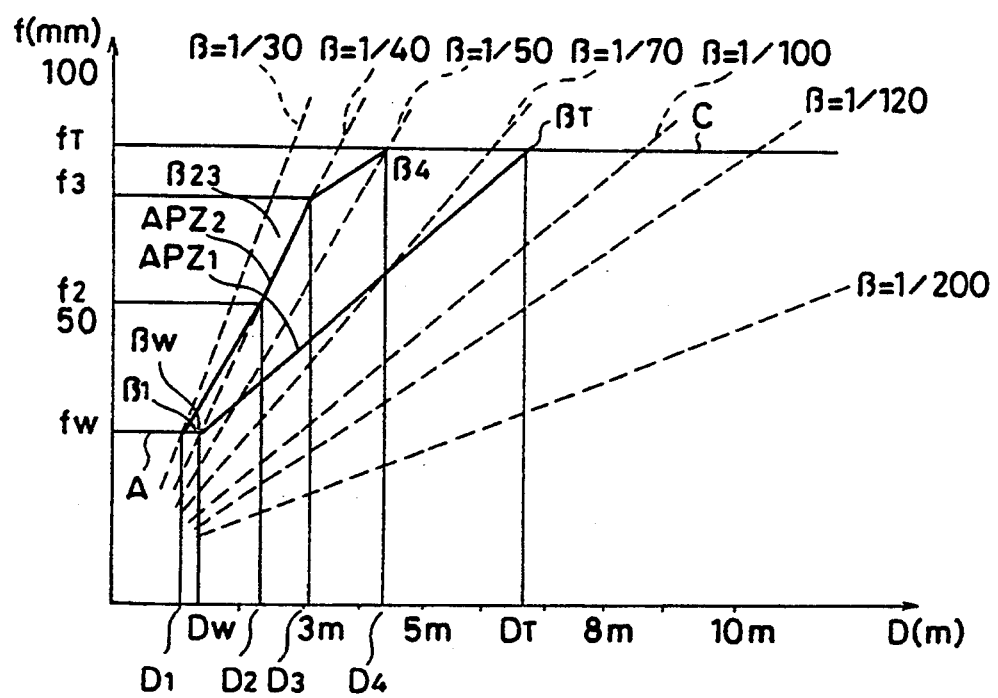

The first setting member is for setting APZ (Automatic Programing of Zooming), and four different modes can be selected by an APZ switching lever 24 on lens unit. In the first mode $APZ_1$, the second mode $APZ_2$ and the third mode $APZ_3$, the relations between the focal length f and the photographing distance D are shown in FIGS. 50, 51, and 52, respectively. In the respective modes $APZ_1$ to $APZ_3$, the focal length f is calculated based on the detected photographing distance and the graphs shown in FIGS. 50 to 52 in the interchangeable lens unit LE, and the lens is moved to the calculated focal length f. The fourth mode is the MLM (Magnification Rate Locking Mode). In this mode, when the user presses the lens key 25 once when the desired magnification rate is realized, the magnification rate at this time point is locked. After this operation, the focal length f enabling locked magnification rate is calculated even if the photographing distance D is changed, and the lens is moved to the calculated focal length f. The MLM (Magnification Rate Locking Mode) is released when the lens key 25 is pressed again.

The second setting member is for setting the WIM (Wide Mode). When this member is attached and the lens key 25 is pressed once, the lens is moved to the wide end corresponding the shortest focal length of the lens (an end opposite to the tele-photo end corresponding the longest focal length), and the surroundings of the object can be also monitored. The lens is also moved to the wide end when focus detection is impossible. Consequently, the field of focus detection is widened and the contrast in the range of focus detection is increased, facilitating the focus detection of the object to be photographed. It is effective when a tele-photo zoom lens with the tele-photo end being 300 to 600 mm is used, for example. When the lens key 25 is pressed again, the lens is returned to the initial focal length.

The third setting member is for setting the EXZM (Exposure During Zooming mode). When this member is attached, the lens is moved from the wide end to the tele-photo end during actual exposure on the film. Consequently, a special effect is provided on the photograph, that is, exposure during zooming. In this embodiment, the exposure during zooming is inhibited even if the EXZM setting member is attached, when a varifocal lens is used, in which the photographing distance changes during zooming. When a varifocal lens is used, focus adjustment is carried out at the wide end and the lens may be moved from the wide end to the tele-photo end during exposure. In that case, a photograph can be provided in which focusing on the object which is in-focus at the wide end being a center becomes gradually larger with the focus thereon gradually goes out. The respective setting members are generally constituted by cards (IC cards) including microcomputers. A printed circuit board having conductive patterns indicative of a lens mode printed thereon may be used.

When an interchangeable lens unit LE is attached to the camera body, the mount lock pin 10 engages with a mount lock groove 22, a convex portion of an AF coupler 12 on the body engages with a concave portion of an AF coupler 21 on the lens unit, so that the rotation of the AF motor on the body is transmitted to the lens unit through the AF couplers 12 and 21. Accordingly, the focusing lens moves and the photographing distance is adjusted. In addition, the terminals $J_1$ to $J_8$ on the lens unit are connected to the terminals $J_{11}$ to $J_{18}$ on the body. The stopping down lever 11 engages with a stopping down lever 20 on the lens unit, and the stopping down lever 20 on the lens unit follows the movement of the stopping down lever 11 on the body. The aperture opening is controlled such that the value of the opening corresponds to the movement of the stopping down levers 11 and 20.

A P/M selecting lever 23 is provided on the interchangeable lens unit LE. When the zooming is no be carried out by a motor in the lens unit using power from the body, then the lever is set at a position indicating PZOOM (Power Zoom) (the position where the letter "P" is exposed, as shown in the figure). When the PZOOM (Power Zoom) is selected, the focal length can be moved to the direction toward the tele-photo end and to the direction toward the wide end by using zooming motors, by operating a tele key 26 and a wide key 27 of the lens unit. In addition, photographing in the respective lens modes, that is, the APZ (Auto Program Zoom), WIM (Wide Mode) and EXZM (Exposure during Zooming Mode) can be carried out. When the P/M selecting lever 23 is set at a position indicating manual zooming (a position indicating "M", not shown), the power zooming operation is not carried out and manual zooming by using a zoom ring 29 is permitted. When the manual zooming is selected and any of the lens modes APZ, WIM and EXZM is set, a warning is given at the lens displaying portion 28.

The lens displaying portion 28 displays the lens mode $LMO_1$, the lens switch mode $LMO_2$, the focal length f, the photographing distance D, the locked magnification rate $\beta_L$ at MLM (Magnification Rate Lock Mode) and so on.

The lens key 25 is provided on the interchangeable lens unit LE, whose function is as described above.

An APZ switching key 24 is provided on the interchangeable lens unit LE. This is provided for switching four different modes, that is $A_1$, $A_2$, $A_3$ and MLM, when a member for setting APZ (Automatic Programming of Zooming) is attached.

Figure 3:
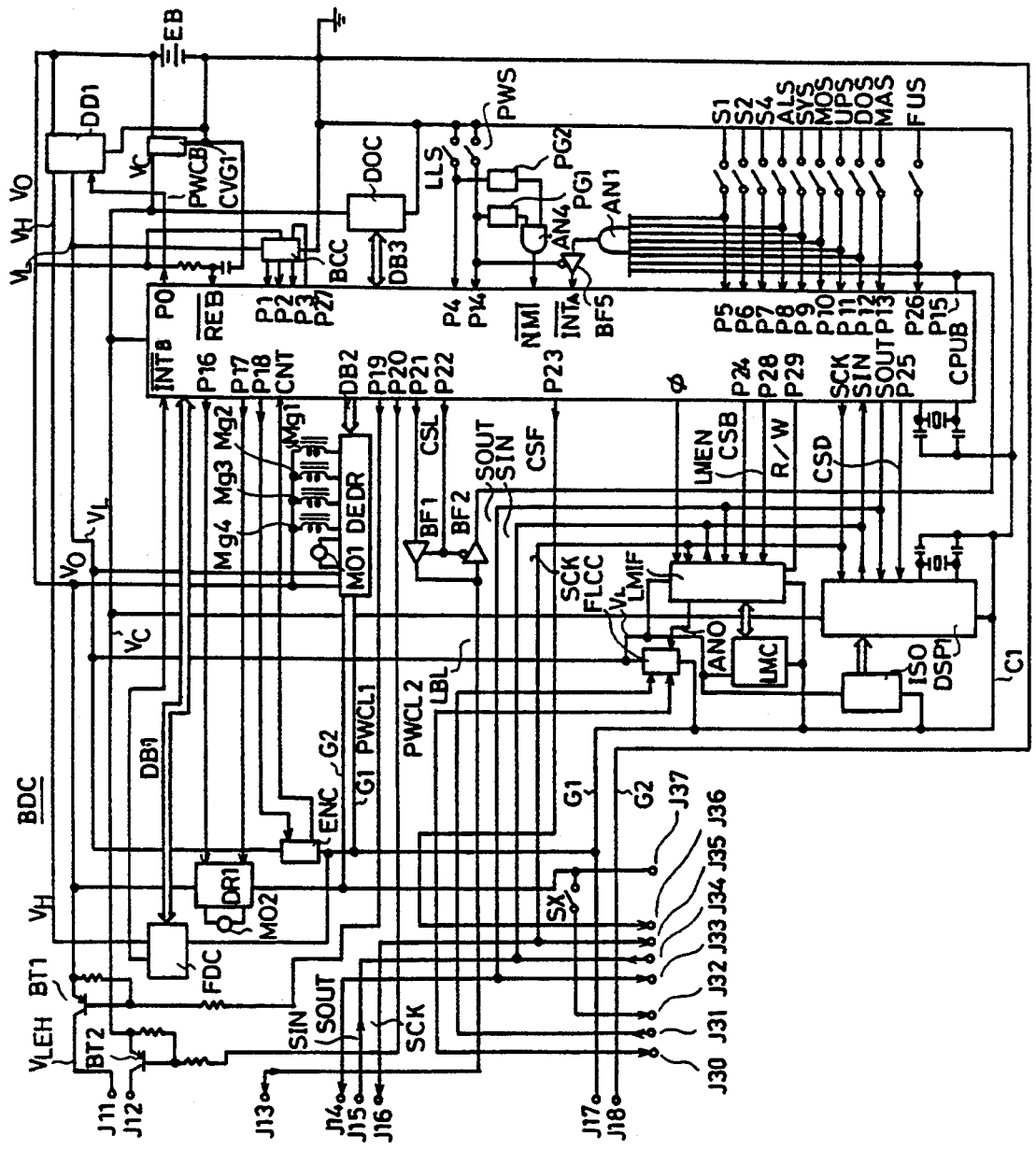
FIG. 3 is a circuit diagram of the camera body to which the present invention is applied.

Referring to FIG. 3, a circuit BDC in the camera body BD to which the present invention is applied comprises a preparatory switch S1 which is turned ON by a first stroke of a shutter button 6, a release switch S2 which is turned ON by a second stroke of the release button 6, and a reset switch S4 which is turned ON at the completion of exposure and which is turned OFF at the completion of winding. Referring to FIG. 3, various switches are respectively operated as will be described in the following.

An AE lock switch ALS is kept ON while an AE lock key (not shown) is pressed. A system reset switch SYS is kept ON while a system reset key 4 is pressed. A mode switch MOS is kept ON while a mode key 3 is pressed. An up switch UPS is turned on when the up-/down lever 7 is slid in the left direction. A down switch DOS is turned ON when the up/down lever 7 is slid in the right direction. A manual Av switch MAS is turned ON when the Av selecting key 8 is pressed, which is used for setting the aperture value Av in the manual mode. A function switch FUS is turned ON when a function key 2 is pressed. A lens lock switch ALLS is turned OFF only when the interchangeable lens unit LE is mounted and locked on the camera body BD. A power switch PWS is turned ON when the main switch 1 is at ON position, and it is turned OFF when the main switch 1 is at the OFF position.

Pulse generators $PG_1$ and $PG_2$ output "low" level pulses every time the power switch PWS or the lens lock switch LLS turned from ON to OFF or from OFF to ON. These outputs are inputted as interrupt signals to a Non Maskable Interrupt terminal NMI in a microcomputer CPUB in the body through an AND gate $AN_4$. A buffer $BF_5$ is activated only when the power switch PWS is ON. The outputs from the switches $S_1$, ALS, SYS, MOS, UPS, DOS, FUS and from the buffer $BF_2$ are inputted to the interrupt terminal $INT_A$ through the AND gate $AN_1$ and the buffer $BF_5$. Therefore, when these switches are turned ON with the power switch PWS being ON or when the output from the buffer $BF_2$ attains the "low" level, the operation of the microcomputer CPUB in the body is interrupted.

A setting member DOC is attached to the attachment portion 14 of the lens mode setting member. It outputs a signal indicative of the APZ, WIM or the EXZM lens mode.

A boosting circuit $DD_1$ in the body carries out boosting operation when a body power supply controlling signal PWCB is at "low" level. A high voltage $V_H$ (for example 12 V) is used as a power supply for a light receiving circuit for focus detection (FDC). A low voltage $V_L$ (for example 6 V) is mainly used as a power supply to analog circuits.

A constant voltage source $CVG_1$ in the body outputs a constant voltage $V_c$ (for example 6 V) for digital circuits such as the micrccomputer CPUB in the body.

A direct output $V_O$ of a power supply battery EB becomes a power supply of large load. A transistor $BT_1$ applies the output $V_O$ of the power supply battery EB as a high voltage $V_{LEH}$ through the terminals $J_{11}$ and $J_1$ to the zoom motor $MO_3$ in the interchangeable lens unit as a power supply, when the lens power supply controlling signal $PWCL_1$ is at "low" level. A transistor $BT_2$ applies an output $V_c$ on the constant voltage source $CVG_1$ as a low voltage $V_{LEL}$ for the lens through the terminals $J_{12}$ and $J_2$ as power supply to the circuits in the interchangeable lens unit, when the lens power supply controlling signal $PWCL_2$ is at the "low" level.

A ground line $G_1$ for circuits with low power consumption is connected between the lens unit and the body through the terminals $J_{17}$ and $J_7$. Although separate ground lines must be provided for the analogue circuits and the digital circuits in the body, only one ground line is shown in the figure.

A ground line $G_2$ for circuits with large power consumption is connected between the lens unit and the body through the terminals $J_{18}$ and $J_8$ and between the flash and the body through the terminals $J_{37}$ and $J_{27}$.

A battery check circuit BCC checks the voltage of the battery output $V_O$ when a port $P_{27}$ attains the "low" level.

When $V_O \geq V_1$, it is determined to be normal power supply without condition and the simultaneous operation of the AF motor $MO_2$ and the zoom motor $MO_3$ is permitted. On this occasion, the ports $P_1$, $P_2$ and $P_3$ are all brought to "high" level.

When $V_1 > V_O \geq V_2$, it is regarded as a conditional normal power supply in which the simultaneous operation of the AF motor $MO_2$ and the zoom motor $MO_3$ is inhibited. On this occasion, the port $P_1$ attains the "low" level while the ports $P_2$ and $P_3$ attain "high" level.

When $V_2 > V_O \geq V_3$, it is regarded as a first state of warning in which the simultaneous operation of the AF motor $MO_2$ and the zoom motor $MO_3$ is inhibited. On this occasion, the ports $P_1$ and $P_2$ attain the "low" level and the port $P_3$ attains the "high" level.

When $V_3 > V_O$, it is regarded as a second state of warning in which all operations are inhibited. On this occasion, all the ports $P_1$, $P_2$ and $P_3$ are at the "low" level.

A reset terminal REB of the microcomputer CPUB in the body receives a "low" level pulse from a reset circuit composed of the resistor and the capacitor as a reset signal when the battery EB is loaded, to reset the microcomputer CPUB in the body.

A light receiving circuit for focus detection FDC comprises a CCD for focus detection, a circuit for driving the CCD and a circuit for processing and A/D converting the output from the CCD to supply the same to the microcomputer CPUB in the body, and the light receiving circuit is connected to the microcomputer CPUB in the body through a data bus $DB_1$. When charge accumulation an the light receiving portion is completed, it outputs "low" level pulses to the interrupt terminal $INT_B$ of the microcomputer CPUB in the body.

A forward rotation, reverse rotation and the stopping of the AF motor $MO_2$ is controlled by the ports $P_{16}$ and $P_{17}$ through a driver $DR_1$.

An encoder ENC monitors the rotation of the AF motor $MO_2$ when the port $P_{18}$ is at the "low" level and outputs the detected pulses to a counter input terminal CNT. It monitors the movement of the stopping down lever 11 when the port $P_{18}$ is at the "high" level and outputs the detected pulses to the counter input terminal CNT.

A motor $MO_1$ carries out film winding and charging of the exposure controlling mechanism. A decoder driver DEDR drives the motor $MO_1$ for charging and magnets $Mg_1$ to $Mg_4$ based on data from a data bus $DB_2$. The magnets $Mg_1$ to $Mg_4$ are a release magnet, a magnet for terminating the stopping down operation of the diaphragm aperture (Ap), a magnet for starting the travel of a preceding shutter curtain (1C) and a magnet for starting the travel of a trailing shutter curtain (2C). These are all combination magnets which are pulse driven.

A direct light measuring circuit FLCC is for controlling the amount of emission of the flash. A light receiving portion thereof is oriented at a position for receiving light reflected from a film surface. The direct light measuring circuit FLCC starts integration at the light receiving portion in response to an integration starting signal INSTA transmitted from the terminal $J_{21}$ and $J_{31}$ in synchronization with the start of emission of the flash. When the integration at the light receiving portion reaches the analog value ANO transmitted from the microcomputer CPUB in the body through a light measuring interface LMIF and D/A converted there, the direct light measuring circuit FLCC generates a light emission shopping signal FSTP to the flash through the terminals $F_{30}$ and $J_{20}$.

A multi divisional light measuring circuit LMC is provided in a finder optical path which outputs analogue signals at respective brightness measuring portions in response to selecting signals from the light measuring interface LMIF to the light measuring interface LMIF.

The light measuring interface LMIF receives the flash amount controlling level signal from the microcomputer CPUB in the body. The interface LMIF has functions of D/A converting the signal to output the same as an analogue value ANO to the direct light measuring circuit FLCC for controlling flash emission, selecting the brightness measuring portion of the multi divisional light measuring circuit LMC, A/D converting the selected brightness measuring output to transmit the same to the microcomputer CPUB in the body and so on.

A film sensitivity outputting portion ISD outputs data of ISO sensitivity provided on the film cartridge.

A displaying circuit $DSP_1$ in the body provides displays at the lens displaying portion 5 shown in FIG. 1 and the finder displaying portion (not shown) in accordance with the data from the microcomputer CPUB in the body and transmits the data from the film sensitivity outputting portion ISD to the microcomputer CPUB in the body.

The light measuring interface LMIF, the displaying circuit $DSP_1$ in the body and the microcomputer CPUB in the body serially exchange data with each other through respective signal lines of serial input SIN, serial output SOUT and serial clock SCK. The microcomputer CPUB in the body communicates with the light measuring interface LMIF when the body select signal CSB is at "low" level and the microcomputer communicates with the displaying circuit $DSP_1$ when the display select signal CSD is at the "low" level. Three signal lines SIN, SOUT, and SCK for serial communication are connected to the interchangeable lens unit through the terminal $J_{15}$, $J_5$; $J_{14}$; $J_4$; $J_{16}$, $J_6$ and to the flash through the terminal $J_{24}$, $J_{34}$; $J_{23}$, $J_{33}$; and $J_{25}$, $J_{35}$.

When a lens select signal CSL is set to the "low" level, communication with the lens unit is enabled. The signal is transmitted to the lens unit through the terminals $J_{13}$ and $J_3$. When a flash select signal CSF is set to "low" level, communication with the flash is enabled. This signal is transmitted to the flash through the terminals $J_{36}$ and $J_{26}$.

A signal line LBL connected through the terminals $J_{13}$ and $J_3$ between the interchangeable lens unit and the body allows bidirectional exchange of signals. When a port $P_{22}$ in the microcomputer CPUB in the body is at the "high" level and a port $P_{36}$ in a microcomputer CPUL in the lens unit is at the "high" level, buffers $BF_1$ and $BF_3$ are activated. A signal which makes the lens select signal CSL "low" level is transmitted from the microcomputer CPUB in the body to the microcomputer CPUL in the lens, and an interruption signal is inputted to the interrupt terminal $INT_1$ in the microcomputer CPUL in the lens unit. Consequently, the microcomputer CPUL in the lens unit is activated and the interchangeable lens unit is designated as the object of communication with the body. Meanwhile, when the port $P_{22}$ in the microcomputer CPUB in the body is at the "low" level and the port $P_{36}$ in the microcomputer CPUL in the lens unit is at the "low" level, the buffers $BF_2$ and $BF_4$ are activated. When the port $P_{35}$ in the microcomputer CPUL in the lens unit attains "low" level, this signal is inputted to the interrupt terminal $INT_A$ in the CPUB in the body through a signal line LBL, an AND gate $AN_1$ and the buffer $BF_5$. Consequently, the microcomputer CPUB in the body is activated by respective operations of the lens key 25, the tele key 26 and the wide key 27 on the interchangeable lens unit.

A synchro switch SX is turned ON when the travel of the preceding shutter curtain (1C) is completed, and the ON signal is transmitted through the terminals $J_{32}$ and $J_{22}$ to the flash as an emission starting signal.

Figure 4:
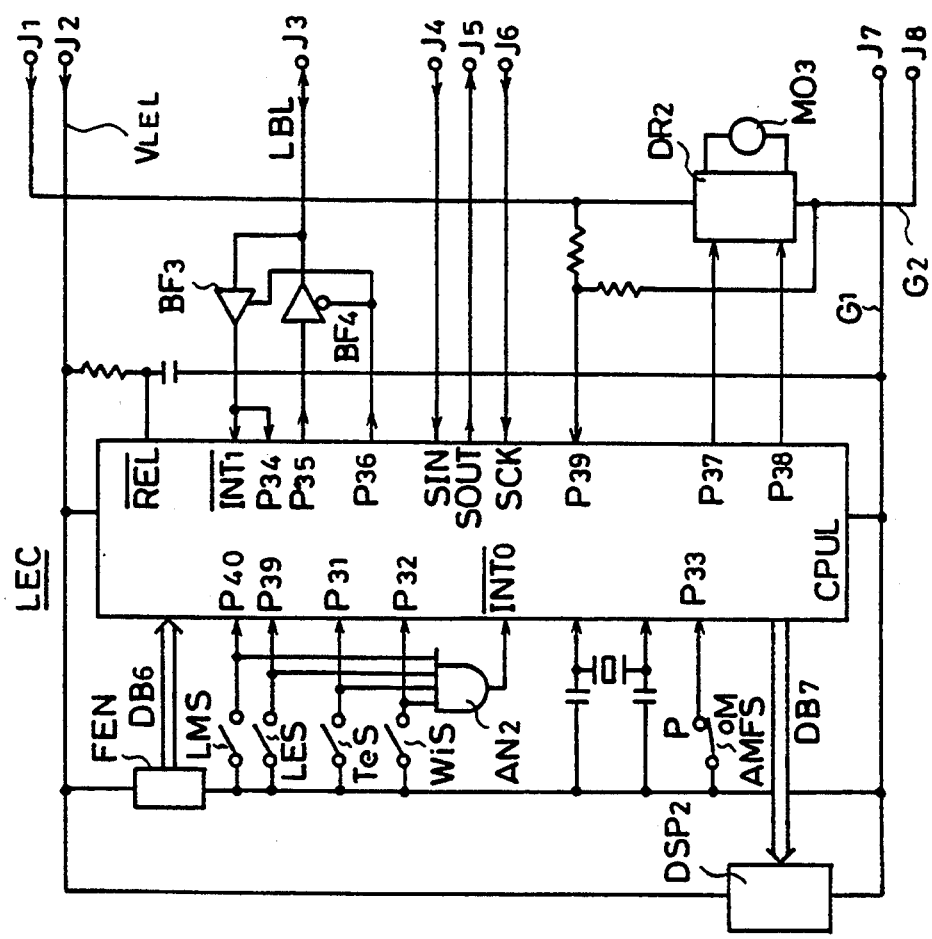
FIG. 4 is a circuit diagram of the interchangeable lens unit to which the present invention is applied.

A circuit LEC in the lens unit (see FIG. 4) will be described in the following.

A lens mode switch LMS is turned ON when the APZ switching lever 24 is slid. The lens switch LES is turned ON, when the lens key 25 is pressed. A tele switch TeS is turned ON when the tele key 26 is pressed. A wide switch WiS is turned ON when the wide key 27 is pressed. When any one of these switches LMS, LES, TeS and WiS is turned ON, an interruption signal is inputted to the input terminal $INT_0$ of the microcomputer CPUL in the lens unit through an AND gate $AN_2$, and the microcomputer CPUL in the lens unit is activated.

An coding plate FEN outputs data corresponding to the zooming position of the lens.

The displaying circuit $DSP_2$ in the lens unit provides display at the lens displaying portion 28 based on the data from the microcomputer CPUL in the lens unit.

The motor $MO_3$ carries out zooming of the lens. The reference character $DR_2$ represents the driver of the motor. The forward rotation, revise rotation and the stopping of the motor $MO_3$ are controlled by the outputs from the ports $P_{37}$ and $P_{38}$. Whether or not power is applied to the driver $DR_2$ is monitored by the microcomputer CPUL in the lens unit through the port $P_{39}$ and resistors for voltage division.

A switch AMFS is related to the P/M selecting lever 23 for switching power zooming and the manual zooming. At the P position, power zooming is selected, and at the M position, manual zooming is selected.

A reset terminal REL carries out resetting of the microcomputer CPUL in the lens unit, which receives "low" level pulses from a reset circuit composed of a resistor and a capacitor as a reset signal when a low voltage $V_{LEL}$ for the lens unit is supplied from the body through the terminals $J_{12}$ and $J_2$.

The low voltage $V_{LEL}$ for the lens unit is supplied while the interchangeable lens unit is mounted on the body. Meanwhile, the high voltage $V_{LEH}$ for the lens unit is supplied only when power zooming is to be carried out.

Figure 5:
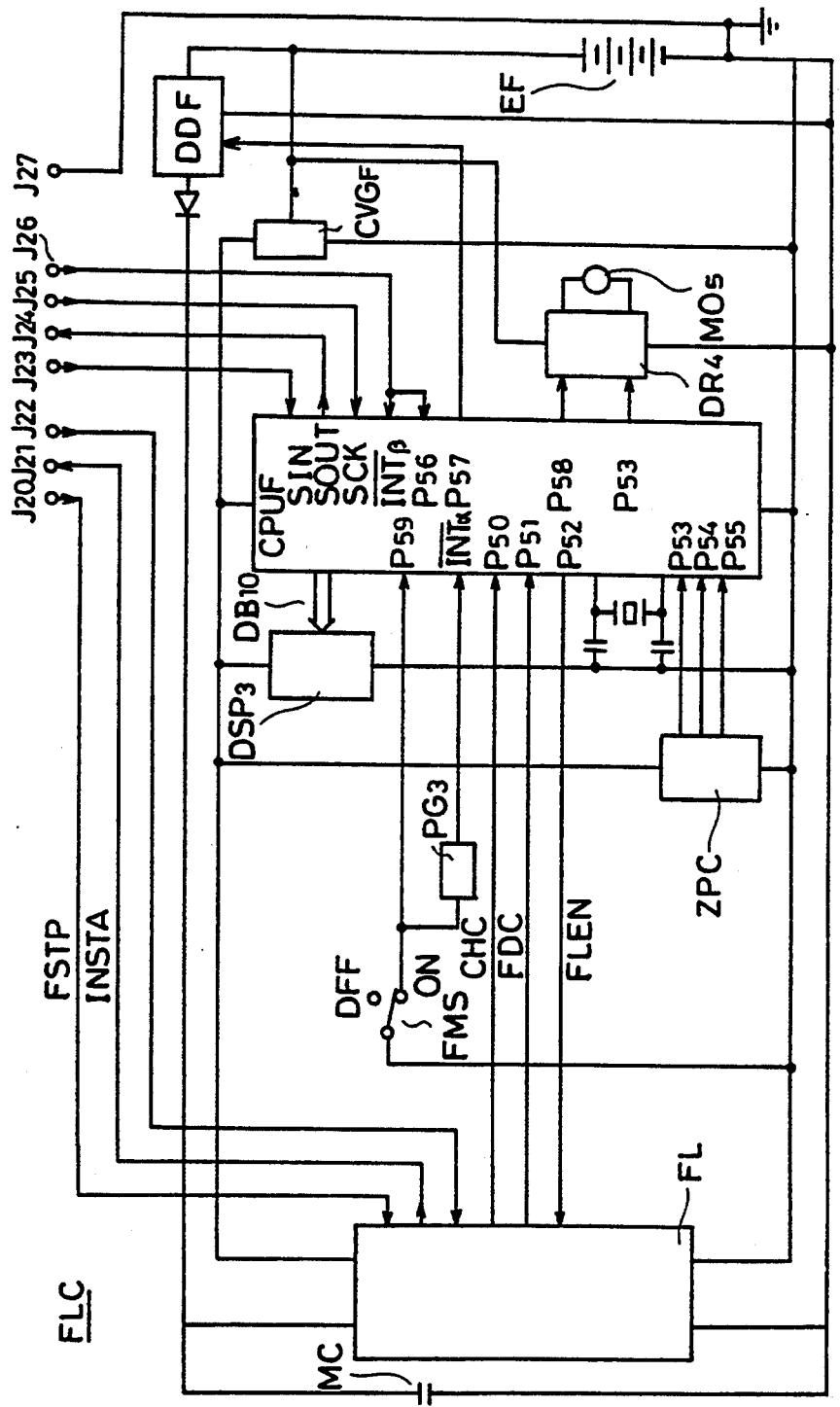
FIG. 5 is circuit diagram of a flash to which the present invention is applied.

The circuit FLC in the flash (see FIG. 5) will be described in the following.

A power supply battery EF is provided for the flash. A boosting circuit DDF in the flash operates when a port $P_{57}$ is at the "low" level. A constant voltage source $CVG_F$ in the flash generates a constant voltage and supplies power to the portions of low power consumption in the flash circuit FLC.

The motor $MO_5$ is provided for changing the flash emission coverage and $DR_4$ represents the driver thereof. The forward rotation, reverse rotation and the stopping of the motor $MO_5$ are controlled in response to the potentials of the ports $P_{53}$ and $P_{58}$.

A coding plate ZPC outputs positional data of the member for changing the flash emission coverage driven by the motor $MO_5$.

A displaying circuit $DSP_3$ in the flash displays emission/non-emission of the flash, available flash distance range, attainment of proper flash emission control and the flash emission coverage.

The reference character FL designates the light emitting portion. When the charging voltage of a main capacitor MC reaches a prescribed value (for example 300 V), then the charge completion signal CHC attains the "high" level and this signal is transmitted to the port $P_{50}$ of the microcomputer CPUF in the flash. When the ON signal of the synchro switch SX is transmitted through the terminals $J_{32}$ and $J_{22}$, the emission of flash is started by the light emitting portion FL, and an integration starting signal INSTA is transmitted to the direct light measuring circuit FLCC in the body through the terminal $J_{21}$ and $J_{31}$. A flash enable signal FLEN which attains the "low" level only when the flash is to be emitted is applied from the port $P_{52}$ of the microcomputer CPUF in the flash to the light emitting portion FL. When an emission stopping signal FSTP is inputted from the direct light measuring circuit FLCC in the body to the light emitting portion FL through the terminals $J_{30}$ and $J_{20}$, the light emitting portion FL stops emission of the flash, a flash display controlling signal FDC is kept at the "high" level for a prescribed time period and the attainment of proper completion of the flash emission control is displayed in the displaying circuit $DSP_3$ in the flash.

A flash main switch FMS switches emission/non-emission of the flash. A "low" level pulse is outputted from a pulse generator $PG_3$ every time the flash main switch FMS turns from ON to OFF or from OFF to ON. Consequently, an interruption signal is inputted to an interruption terminal $INT_\alpha$ of the microcomputer CPUF in the flash. When a "low" level flash select signal CSF is inputted from the port $P_{23}$ of the microcomputer CPUB in the body through terminals $J_{36}$ and $J_{26}$, an interruption signal is inputted to an interruption terminal $INT_\beta$. A port $P_{56}$ in the microcomputer CPUF in the flash determines a body data input mode and a flash data output mode in accordance with the flash select signal CSF.

The hardware structure of the camera system no which the present invention is applied has been described. The software structure will be described in the following with reference to flow charts.

Figure 6:
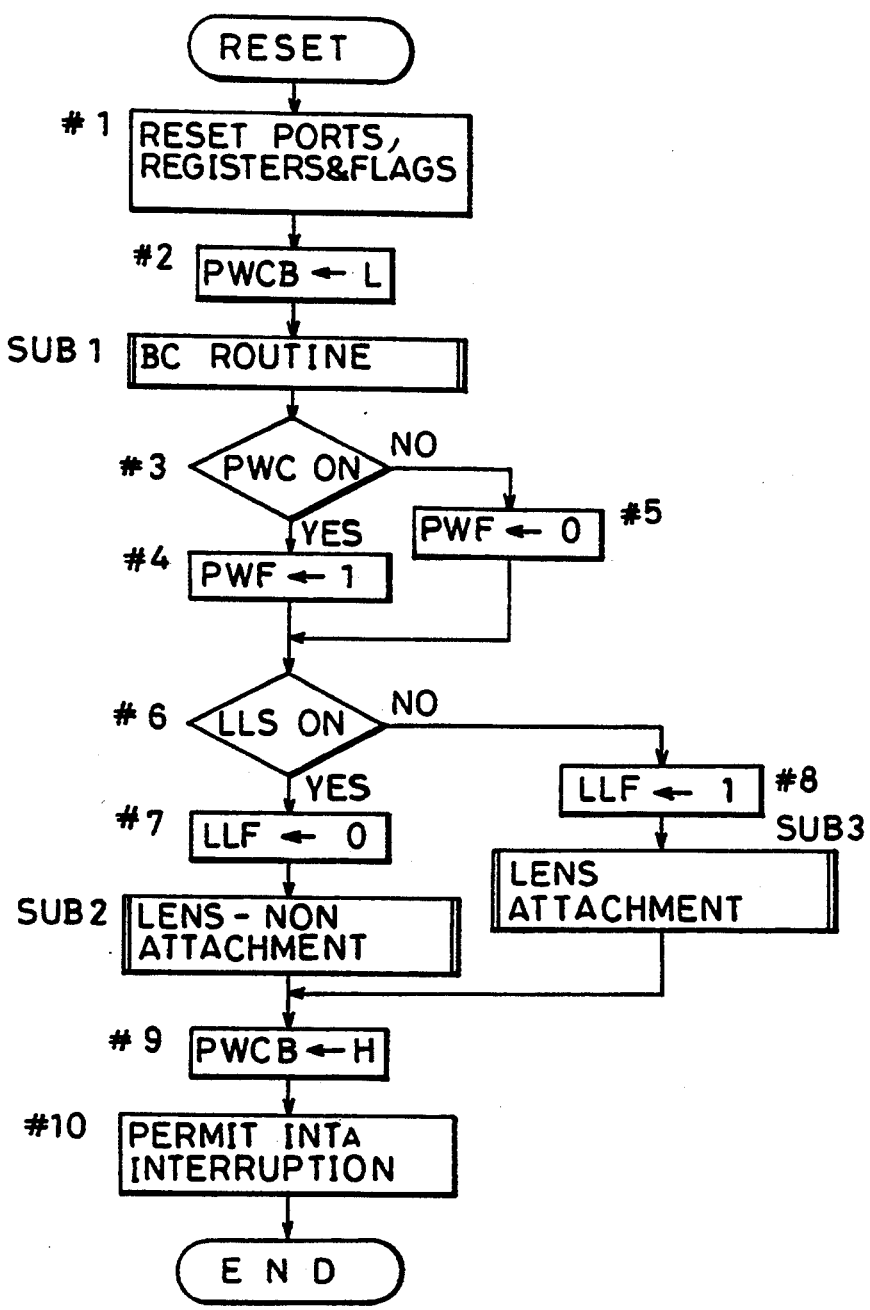

First, when the power supply battery EB is loaded in the body, a reset signal is inputted to the reset terminal REB of the microcomputer CPUB in the body and a reset routine shown in FIG. 6 is carried out. In the reset routine, the ports, registers and the flags are reset at first (#1). Thereafter, the power supply controlling signal PWCB in the body is set to the "low" level to operate the boosting circuit $DD_1$ in the body, and the high voltage $V_H$ and the low voltage $V_L$ in the body are supplied (#2). Thereafter, a subroutine for checking the battery (hereinafter referred to as a "BC routine") is executed (SUB1).

Figure 9:
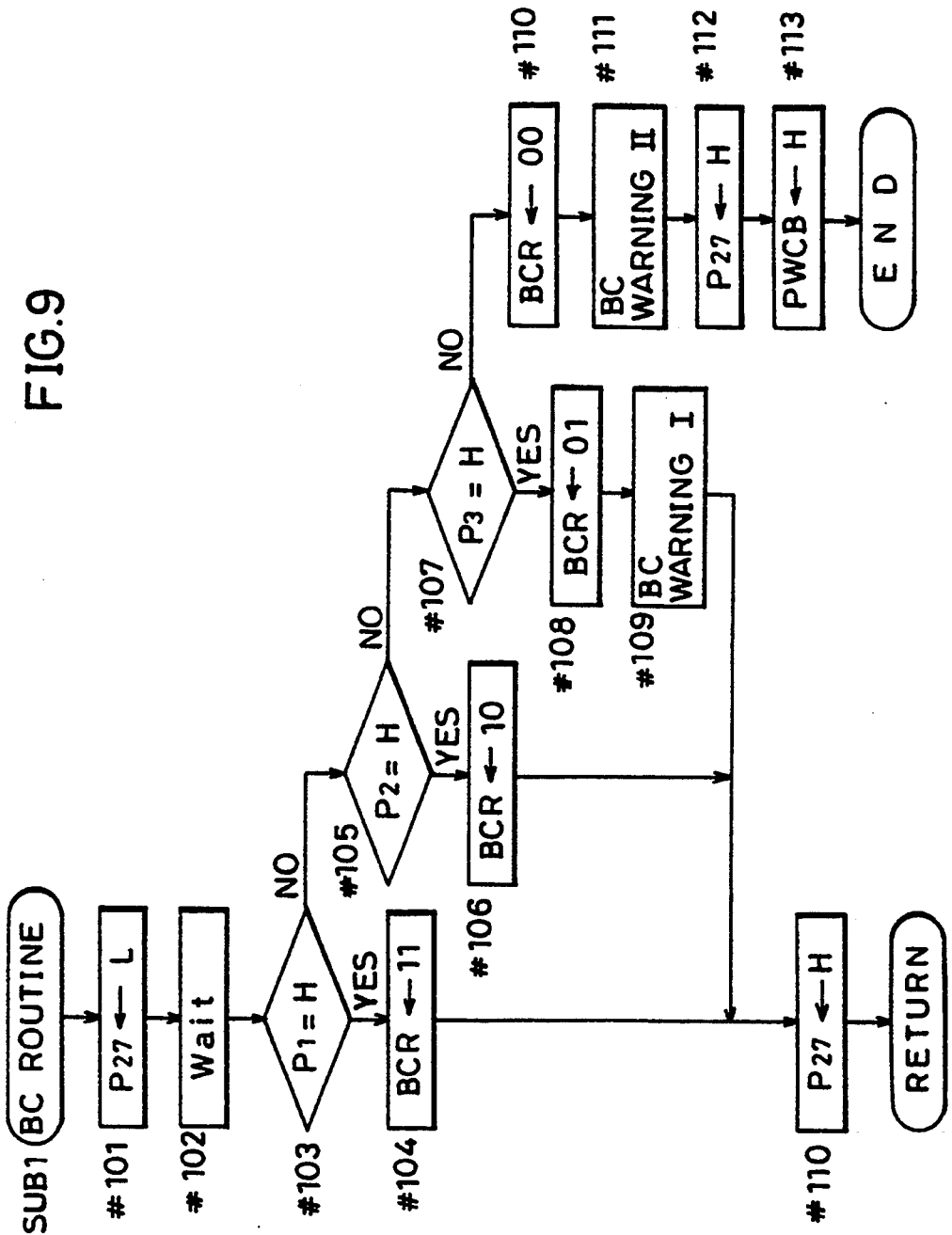

The BC routine will be described with reference to FIG. 9. When this subroutine is called, the port $P_{27}$ is set to the "low" level and the battery check circuit BCC waits the voltage checking operation until the same circuit becomes stable (#101, #102). Thereafter, whether or not the port $P_1$ is at the "high" level is determined (#103). When the port $P_1$ is at the "high" level, it means that the battery voltage $V_0$ is $V_0 \geq V_1$, so that the battery check register BCR is set to BCR=11 (#104). The battery check register BCR is a 2 bit register, which is set to BCR=11 when the AF motor $MO_2$ and the zoom motor $MO_3$ can be simultaneously turned ON. When the simultaneous turning ON is impossible, it is set to BCR=10, in giving a warning, it is set to BCR=01 and when the operation is impossible, it is set to BCR=00. When the port $P_1$ is not at the "high" level in #103, then whether or not the port $P_2$ is at the "high" level is determined in #105. If the port $P_2$ is at the "high" level, then $V_1 > V_0 \geq V_2$, so that the register is set to BCR=10 (#106). If the port $P_2$ is not at the "high" level in #105, whether or not the port $P_3$ is at the "high" level is determined in #107. If the port $P_3$ is at the "high" level, then $V_2 > V_0 \geq V_3$, so that the register is set to BCR=01 and a first BC warning (for example flickering of a mark indicating that the battery is running out, for example) is carried out (#108, #109). After the respective operations in the steps #104, #106 and #109, the port $P_{27}$ is set to the "high" level in #110 to disable the battery check circuit BCC and the program returns to the main flow.

If the port $P_3$ is not at the "high" level in #107, then $V_3 > V_0$, so that the register is set to BCR=00. A second BC warning (flickering of a mark indicating that the battery is out) is carried out, and the port $P_{27}$ is set to the "high" level to disable the battery check circuit BCC. The power supply controlling signal PWCB in the body is set to the "high" level to stop the boosting circuit $DD_1$ in the body, and the microcomputer CPUB in the body stops its operation (#110 to #113). Therefore, when $V_3 > V_0$, only the resetting operation by changing of the battery or an operation caused by an interruption signal to the non maskable interruption terminal NMI (caused by an ON/OFF operation of the power switch PWS or of the lens lock switch LLS) are permitted.

Returning to the reset routine (FIG. 6), whether or not the power switch PWS is ON is checked (#3). If the power switch PWS is ON, then a power flag PWF is set to 1. If the power switch PWS is not ON, then the power flag PWF is set to 0 (#4, #5). Thereafter, whether or not the lens lock switch LLS is ON is determined (#6). If the lens lock switch LLS is ON, it means that the lens unit has not yet been attached. Therefore, a lens attachment flag LLF is set to 0 in #7 and a subroutine (SUB2) for the lens non-attachment is executed. If the lens lock switch LLS is not ON, it means that the lens has been mounted, so that the lens attachment flag LLF is sen to 1 in #8 and a subroutine (SUB3) for lens attachment is carried out. When the subroutine SUB2 or the subroutine SUB3 is completed, the power supply controlling signal PWCB in the body is set to the "high" level to stop the boosting circuit $DD_1$ in the body, the interruption to the interruption terminal $INT_A$ is permitted and the operation is completed (#9, #10).

Figure 10:
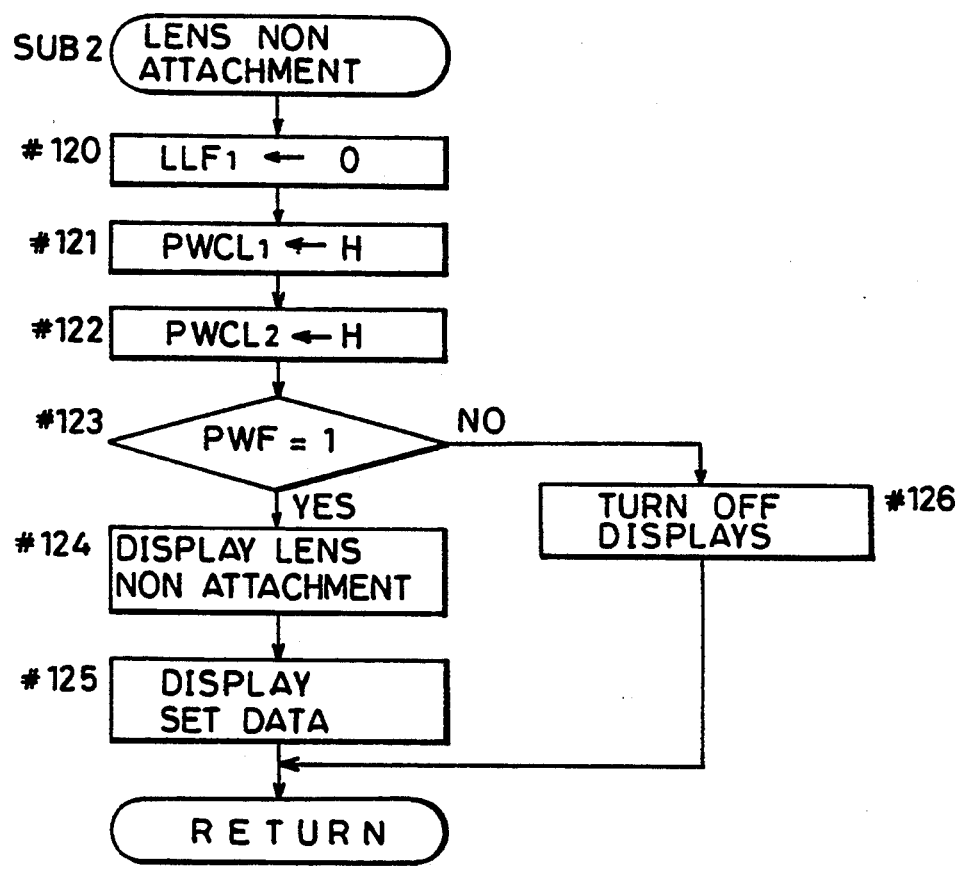

The subroutine (SUB2) for the lens non-attachment will be described with reference to FIG. 10. When this subroutine is called, an AF lens attachment flag $LLF_1$ is set to 0, the power supply controlling signals $PWCL_1$ and $PWCL_2$ in the lens unit are set to the "high" level to stop the application of the high voltage $V_{LEH}$ and the low voltage $V_{LEL}$ for the lens unit (#120 to #122). Thereafter, whether or not the power flag PWF is 1 is checked (#123). If the power flag PWF is 1, then the lens non-attachment display is given (there aperture value displaying portion is made "- -") and the set mode is displayed. If it is the mode for setting the exposure time, the data for the exposure time is displayed and the program returns (#124, #125). If the power flag PWF is 0, all displays are erased and the program returns to the main flow (#126).

The subroutine (SUB3) for lens attachment will be described in the following with reference to FIG. 11. In the lens attachment operation, communication of the body status data ICPB and the lens status data ICPL is carried out, and the resetting operations of the zoom lens and the focusing lens in the interchangeable lens unit are carried out. The body status data ICPB and the lens status data ICPL are 1 byte data for informing each other the states of the body and the lens unit. Their structures are as follows.

(a) The body status data ICPB comprises 8 bits data from the most significant bit $b_7$ to the least significant bit $b_0$. The ith bit $b_i$ of the body status data ICPB will be hereinafter referred to as $ICPB_i$. The bits $B_7$ and $B_6$ distinguish a new body from a conventional body. That is, when $ICPB_{76}=00$, it means a conventional body, and when $ICPB_{76}=01$, it means a new body. A conventional body does not have all the functions of a new body (see FIG. 3) and it does not have the terminals $J_{11}$ and $J_{18}$. The bits $B_5$ and $B_4$ indicate operating state of the body. If $ICPB_{54}=00$, it means that the body is inactive. If $ICPB_{54}=01$, it means that the body is carrying out exposure calculation. If $ICPB_{54}=10$, it means that the body is carrying out exposure control. If $ICPB_{54}=11$, it means that the body has been system reset. The bit $b_3$ indicates the state of the power switch PWS of the body. If the $ICPB_3=0$, it means that the power switch PWS is ON. If $ICPB_3=1$, it means that the power switch PWS is OFF. The bit $B_2$ distinguishes the body data output and the lens data input. If $ICPB_2=0$, it means a body data output. If $ICPB_2=1$, it means the lens data input. The bit $b_1$ indicates whether or not power zooming is possible. If $ICPB_1=0$, it means that the power zooming is impossible. If $ICPB_1=1$, it means that the power zooming is possible. The bit $b_0$ indicates whether or not the AF operation is being carried out. If $ICPB_0=0$, it means that the AF operation is not carried out and if $ICPB_0=1$, it means the AF operation is being carried out.

(b) The lens status data ICPL comprises 8 bits data from the most significant bit $b_7$ to the least significant bit $b_0$. The ith bit $b_i$ of the lens status data ICPL will be hereinafter referred to as $ICPL_i$. The bits $b_7$ and $b_6$ distinguishes a new lens unit and an conventional lens unit. If $ICPL_{76}=10$, it means an conventional lens unit. $ICPL_{76}=01$, it means a new lens unit. An conventional lens unit does not have all the functions of a new lens unit (see FIG. 5) and it does not have the terminals $J_1$ and $J_8$. The bits $b_5$ and $b_4$ indicate the states of the tele switch TeS, the wide switch WiS and the lens switch LES. If $ICPL_{54}=00$, the switches TeS, WiS and LES are all OFF. If $ICPL_{54}=01$, it means that only the tele switch TeS is ON. If $ICPL_{54}=10$, it means that only the wide switch WiS is ON. If $ICPL_{54}=11$, it means that only the lens switch LES is ON. The bits $b_3$, $b_2$ and $b_1$ indicate types of the lens units. If $ICPL_{321}=001$, it means a lens of a fixed focal length. If $ICPL_{321}=010$, it means power zooming using a common zoom lens and not a varifocal lens. If $ICPL_{321}=011$, it means manual zooming with a common zoom lens and not a varifocal lens. If $ICPL_{321}=100$, it means power zooming with a varifocal lens. If $ICPL_{321}=101$, it means manual zooming with a varifocal Lens. In the following description, a fixed focal lens or a manual zoom lens is called a type I lens, a common zoom lens, not a varifocal lens is called a type III lens, and a varifocal lens is called a type II lens. The least significant bit $b_0$ of the lens status data ICPL indicates whether or not the zooming is carried out. If $ICPL_0=0$, it means that the zooming is stopped. If $ICPL_0=1$, it means that the zooming is been carried out.

The body status data ICPB is positioned at, the 0th address AD0 of a data group transmitted from the body to the lens unit and it is transmitted at the start of communication. The lens status data ICPL is positioned at the 0th address AD0 of a data group transmitted from the lens unit to the body and it is transmitted at the start of communication.

The data group transmitted from the body to the lens unit comprises 4 bytes in total starting from the 0th address AD0 to the third address AD3. From the 0th address AD0 the body status data ICPB is transmitted, from the first address AD1, the information of the data pointer DP0 is transmitted, from the second address AD2 the information of the mode buffer MOB is transmitted and from the third address AD3 the information of the photographing distance D is transmitted. The data pointer DP designates by the upper 4 bits $b_7$ to $b_4$ the head address of the lens data when the body receives data from the lens unit and designates by the lower 4 bits $b_3$ to $b_0$ how many bytes of data should be inputted from the head address. The mode buffer MOB indicates the lens mode $MO_1$ by the upper 4 bits $b_7$ to $b_4$ and the lens switch mode $LMO_2$ by the lower 4 bits $b_3$ to $b_0$ so as to display the lens mode $LMO_1$ and the lens switch mode $LMO_2$ in the displaying circuit $DSP_2$ in the lens unit. The lens mode are indicated as follows. Namely, when $LMO_1=0000$, it means non-operative mode. If $LMO_1=1000$, it means APZ (Automatic Programming of Zooming), if $LMO_1=0001$, it means WIM (Wide Mode) and if $LMO_1=0010$, it means EXZM (Exposure During Zooming) mode. The lens switch mode is indicated as follows. Namely, if $LMO_2=0000$, it means the non-operable mode. If $LMO_2=0001$, it means the ALM (AE Lock Mode), if $LMO_2=0010$, it means the RLPM (Release Priority Mode) and if $LMO_2=0011$, it means AVSM (Aperture Value Priority Mode).

The data group transmitted from the lens unit to the body comprises 9 bytes in total from the 0th address AD0 to the eighth address AD8. From the 0th address ADO, the lens status ICPL is transmitted. From the first address AD1, a full open aperture value Av0 is transmitted. From the second address AD2, a minimum opening aperture value (Avmax) is transmitted. From the third address AD3, deviation of the aperture value ΔAvz is transmitted. From the fourth address AD4, a conversion coefficient K1 for converting defocus amount DF to the number N of rotation of the AF motor $MO_2$ is transmitted. From the fifth address AD5, a conversion coefficient NDC for converting the number of rotation N of the coupler to the photographing distance D is transmitted. From the sixth address AD6, the focal length f is transmitted. From the seventh address AD7, the photographing magnification rate $\beta$ is transmitted. From the eighth address AD8, information of the offset amount $N_L$ in the lens unit transmitted.

When the subroutine (SUB3) of the lens attachment operation shown in FIG. 11 is called, a lens power supply controlling signal $PWCL_2$ is set to "low" level to start supply of a low voltage $V_{LEL}$ of the lens (#140). Consequently, power is supplied to the microcomputer CPUL in the lens unit and the resetting operation of the microcomputer CPUL in the lens unit is carried out by the CR circuit connected to the reset terminal REL. The program waits for a sufficient time period to complete the resetting operation (#141). Then, 0111*010 is set in the body status ICPB (#142). The body status data represents a new body, system reset, ON or OFF of the power switch, body data output, the power zoom possible and non AF operation. The * of the bit $b_3$ ($b_3=$*) of the body status data ICPB is set to 0 when the power flag PWF is 1. It is set to 1 when PWF=0 (#143 to #145). The body status data ICPB is outputted to the lens unit and, at the same time, the lens status data ICPL is applied from the lens unit (#146 to #150). More specifically, the port $P_{22}$ of the microcomputer CPUB in the body is set to "high" to permit the lens select signal CSL from the port $P_{21}$ to be inputted to the interrupt terminal $INT_1$ and to the port $T_{34}$ of the microcomputer CPUL in the lens unit through the buffer $BF_1$, bidirectional signal line LBL, the terminals $J_{13}$, $J_3$ and the buffer $BF_3$. Thereafter, the lens select signal CSL is set to the "low" level to generate an interruption by the interrupt terminal $INT_1$ in the microcomputer CPUL in the lens unit, and the program waits for a prescribed time period. Thereafter, the body status data ICPB is outputted to the lens unit in synchronization with a serial clock SCK and the lens status data ICPL is inputted from the lens unit. Thereafter, the lens select signal CSL is returned to the "high" level and the communication is thus completed. Since the processes from the step #140 to #150 are frequently carried out, the processes will be hereinafter referred to as "bidirectional lens-body status communication", representing the exchange of the body status data ICPB and the lens status data ICPL.

When the bidirectional body-lens status communication (#147 to #157) is completed, whether or not a dedicated AF lens is used is determined (#151). If it is not the dedicated AF lens, the port $P_{22}$ is returned to the "low" level and the lens non-attachment operation (subroutine SUB2) is executed, and thereafter the program returns to the main flow.

If it is determined that the dedicated AF lens is used in the step #151, then the AF lens attachment flag $LLF_1$ is set to 1 and whether or not a new lens unit is used is determined (#155, #156). An conventional lens unit does not have the microcomputer CPUL in the lens unit even if it is a dedicated AF lens. Therefore, the conventional lens unit has function only to output the data from the address AD0 to AD6. If it is determined that an conventional lens unit is used in the step #156, then the program proceeds to the step #170. If it is determined that a new lens unit is used in #156, whether the lens is of the type I or not is checked in #157. The type I lens means a fixed focal lens or a manual zoom lens. If the type I lens is used, the program proceeds to the step #170 as in the case of an conventional lens unit. Meanwhile, if it is determined that the employed lens unit is not the type I in #157, it means that power zooming is possible, so that the lens power supply controlling signal $PWCL_1$ is set to "low" level to supply the high voltage $V_{LEH}$ for the lens unit, and the program waits for a prescribed time period (#158, #159) This is to automatically set the shortest focal length by power zooming, and this power zooming operation is carried out when the battery is loaded, when the lens is attached or when the power switch PWS is turned OFF. After the start of application of the high voltage $V_{LEH}$ for the lens unit, the bidirectional lens-body status communication is carried out (#160 to #163) and whether or not the least significant bit $b_0$ of the lens status data ICPL is 1 is determined (#164). If the least significant bit $b_0$ is 1, it means that the zooming is being carried out, so that the flow returns from the step #164 to the step #160 to carry out the bidirectional lens-body status communication (#160 to #163), and this operation is repeated until the least significant bit $b_0$ of the lens status ICPL becomes 0 Ln #164. If the least significant bit, $b_0$ is 0, it means the zooming is stopped, so that the lens power supply controlling signal $PWCL_1$ is returned to "high" level in the step #165 to stop the application of the high voltage $V_{LEH}$, and the flow proceeds to the step #170.

In #170, the lens is driven to the infinite photographing position by using the AF motor $MO_2$. After the lapse of a prescribed time period, whether or not the lens reached the infinite end position is determined (#171, #172). More specifically, at the time when no pulse comes to the encoder ENC even if AF motor $MO_2$ is driven, it is the time when the lens reached the infinite end position. The operation of the steps #171 and #172 is repeated until the lens reaches the infinite end position. When the lens reaches the end position, the AF motor $MO_2$ is stopped and the present position register NCR is set to 0 (#173, #174). The present position register NCR is for storing the amount of movement (pulse number from the encoder ENC) of the focusing lens from the infinite end position.

When the content of the battery check register is BCR=11, it means that the AF motor $MO_2$ and the zooming motor $MO_3$ can be simultaneously operated, so that the above described zooming operation (#158 to #165) and the movement of the focusing lens to the infinite photographing position (#170 to #174) may be simultaneously carried out. It is to be noted that the movement of the focusing lens to the infinite photographing position is also carried out when the power switch PWS is turned ON or OFF and when the system reset key 4 is pressed, in addition to the time when the power supply battery EB is attached and when the interchangeable lens unit LE is attached.

Figure 12:
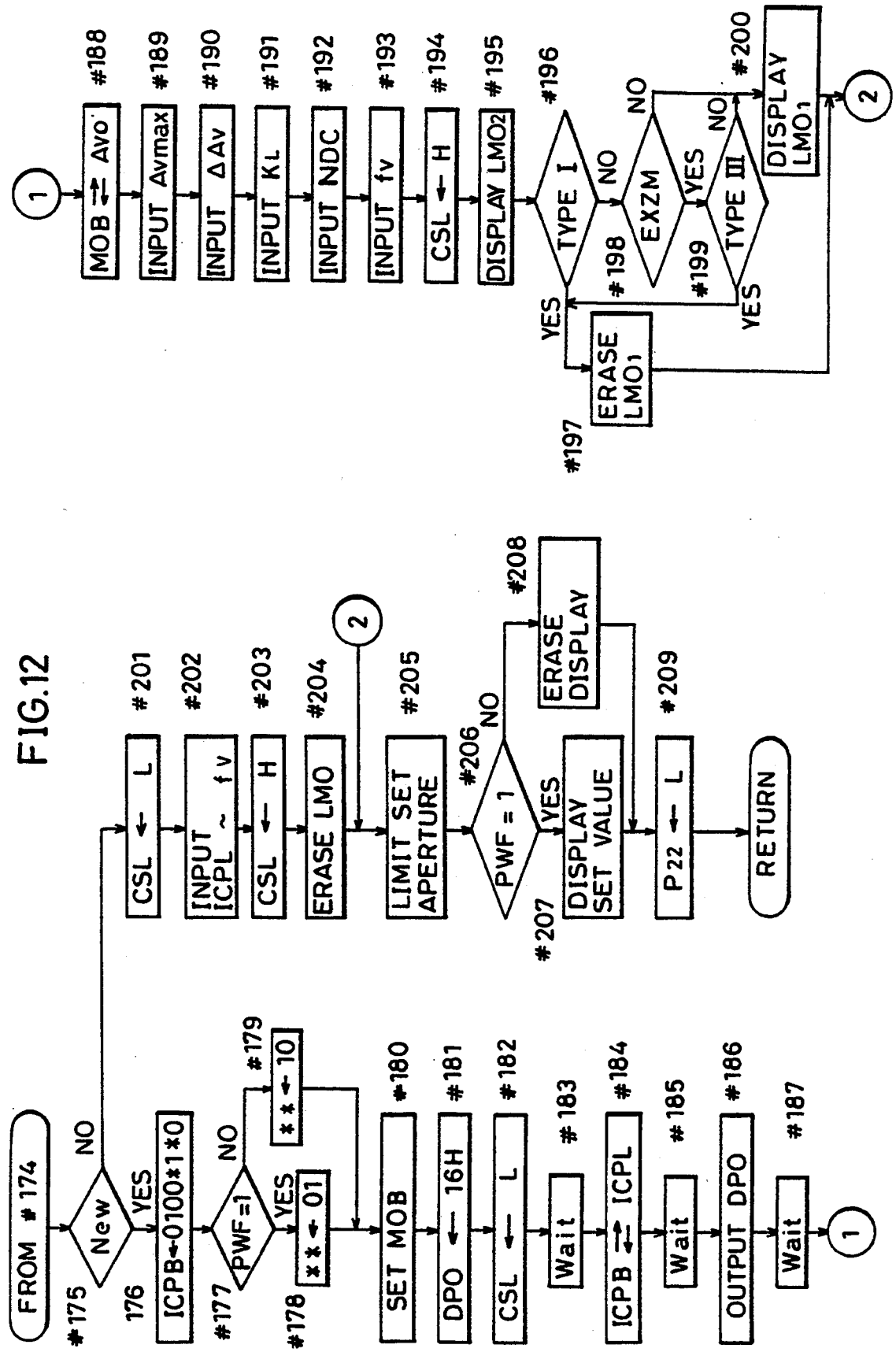

When the power zooming and the movement of the focusing lens to the infinite photographing position are completed, the flow proceeds to the #175 shown in FIG. 12 in which whether or not a new lens unit is used is determined. If a new lens unit is used, the body status data ICPB is set to be 01000110 or 01001100 (#176 to #179). This corresponds to the body status of non-operative, power switch ON or OFF, lens data input, power zoom possible or impossible, not AF operation. Thereafter, the lens mode $LMO_1$ and the lens switch mode $LMO_2$ are set in the mode buffer MOB. The data pointer is set to $DPO=16_H$ so as to designate the input data from the lens unit as 6 bytes from the first address AD1 (#180, #181). The body status data ICPB and the lens status data ICPL are exchanged by the bidirectional lens-body status communication (#182 to #184) and the data pointer DPO is outputted (#185, #186). The mode buffer MOB is outputted to the lens unit and at the same time, the full open aperture value Avo is inputted from the lens unit (#187, #188). Thereafter, the maximum aperture value Avmax, the deviation of the aperture value ΔAv, conversion coefficients $K_L$ and NDC, and the focal length $f_v$ are inputted from the lens unit (#189 to #193). The data of the focal length f from the lens unit is inputted as a value fv in the APEX system. After the completion of data communication described above, the lens select signal CSL is returned to the "high" level and the lens switch mode $LMO_2$ is displayed (#194, #195).

Thereafter, whether or not the lens is the type I (fixed focus lens or manual zoom lens) is determined (#196). If the lens is of the type I, then the display of the lens mode $LMO_1$ is erased in #197 and the flow proceeds to #205. If the lens unit is not the type I but a lens unit capable of power zooming, then whether or not the EXZM (Exposure during Zooming) mode is selected or not is determined (#198). If it is not the EXZM (Exposure during Zooming) mode, then the lens mode $LMO_1$ is displayed in #200 and the flow proceeds to the #205. If it is the EXZM (Exposure during Zooming), whether or not the lens unit is of the type III (varifocal lens) is determined (#199). If the lens unit is the type III lens, the display of the lens mode $LMO_1$ is erased in #197, and the flow proceeds to #205. If the lens unit is not the type III lens, then the lens mode $LMO_1$ (EXZM) is displayed in the step #200, and the flow proceeds to #205. As for the displays of the lens mode $LMO_1$ and the lens switch mode $LMO_2$ (#200, #195), when the respective modes are set to the non-operable state, there will be no display. Even if a varifocal lens is used, the steps #198 and #199 are unnecessary to carry out EXZM (Exposure during Zooming) operation.

If it is determined that an conventional lens unit is used in #175, the body data output is not carried out since the lens unit cannot read the body data output. The lens status data ICPL, the full open aperture value Avo, the maximum aperture value Avmax, the deviation of the aperture value ΔAv, conversion coefficient $K_L$ and NDC and the focal length fv in the APEX system are inputted (#201 to #203). Both displays of the lens mode $LMO_1$ and the lens switch mode $LMO_2$ are erased (#204). No matter whether a new or conventional lens unit is used, the content of the register storing the set aperture value is limited so that the content is in the range of (Avo+Av) and (Avmax+Av) (#205). Thereafter, whether or not the power flag PWF is 1 is determined (#206). If PWF=1, the set value is displayed, and when PWF=0, all displays are erased (#207, #208). In either case, the port $P_{22}$ is returned to the "low" level and the program returns to the main flow (#209). The level change of the port $P_{22}$ means to permit input of an interruption signal from the microcomputer CPUL in the lens unit to the interrupt terminal $INT_A$ of the microcomputer CPUB in the body through the bidirectional signal line LBL. If there is no need to transmit a signal from the body to the lens unit, generally the port $P_{22}$ is returned to the "low" level to be in a standby state waiting an activation from the lens unit.

Figure 7:
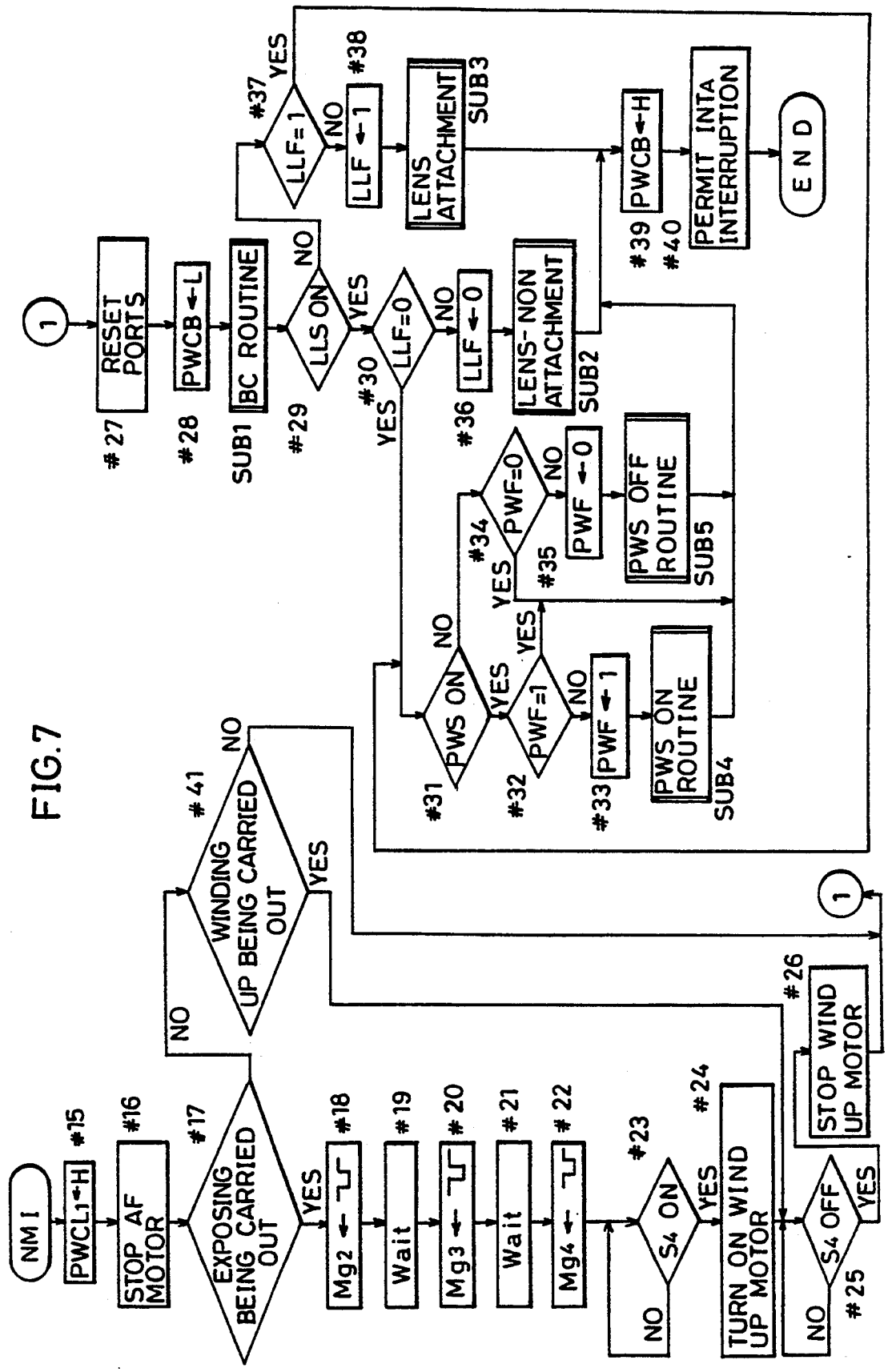

An operation when the power switch PWS turns from ON to OFF or from OFF to ON, or when the lens lock switch LLS is turned ON to OFF or from OFF to ON will be described in the following. If the power switch PWS is turned from ON to OFF or from OFF to ON, a "low" level pulse from the pulse generator $PG_1$ is inputted to the non maskable interrupt terminal NMI through an AND gate $AN_4$. If the lens lock switch LLS is turned from ON to OFF or from OFF to ON, a "low" level pulse from the pulse generator $PG_2$ is inputted to the non maskable interrupt terminal NMI through the AND gate $AN_4$. Thereafter, the interrupt processing starting from the step #15 shown in FIG. 7 is carried out. The process through the steps #15 to #26 is to finish faster the operation which has been executed at the time when the power switch PWS is ON/OFF operated or when the lens unit is attached or detached. First, the application of the high voltage $V_{LEH}$ for the lens unit is stopped ($PWCL_1$="high") to stop the zoom motor $MO_3$ (#15). A stopping signal for the AF motor $MO_2$ is outputted (#16). Thereafter, whether or not exposure is being carried out is determined (#17). If the exposure is being carried out, the exposure controlling operation is completed by operating respective magnets $Mg_2$ to $Mg_4$ (#18 to #22). When the exposure controlling operation is completed and the reset switch $S_4$ is turned ON, then the film winding motor $MO_1$ is turned on and the film is wound up (#23, #24). When the film winding is completed and the reset switch $S_4$ is turned OFF, the film winding motor $MO_1$ is stopped (#25, #26). Then the flow proceeds to the step #27. If the exposure is not being carried out in the step #17, whether film winding is being carried out or not is determined (#41). If the film winding is being carried out, then the flow proceeds to #25 and after the completion of the film winding, the flow proceeds to step #27. When exposure and film winding are not being carried in the steps #17 and #41, then the flow direcnly proceeds to step #27.

After the completion of the exposure and film winding, the ports are reset and the boosting circuit $DD_1$ in the body is operated (PWCB="low") (#27, #28). Thereafter, a BC routine (SUB1) is executed and the flow proceeds to step #29 (the term "step" is omitted hereinafter).

In #29, whether or not the lens lock switch LLS is ON is determined. If the lens lock switch LLS is ON, it means that the lens unit has not yet been attached. If the lens lock switch LLS is ON in #29, then whether the lens lock switch LLS is changed from OFF to ON or it has been ON is determined in #30 by checking the lens attachment flag LLF. in the latter case, the flow proceeds to #31. If the lens lock switch LLS is OFF in #29, then whether the lens lock switch LLS is changed from ON to OFF or it has been OFF is determined in #37 by checking the lens attachment flag LLF. In the latter case, the program proceeds to #31.

If the lens lock switch LLS is ON in #29 and if LLF is not 0 in #30, then it means that the lens lock switch LLS is changed from OFF to ON. In #36, the LLF is set to 0 and the lens non-attachment operation (SUB2) is executed, and the flow proceeds to #39. If the lens lock switch LLS is OFF in #29 and LLF is not 1 in #37, it means that the lens lock switch LLS is changed from ON to OFF. Therefore, in #38, the LLF is set to 1, the lens attachment operation (SUB3) is executed and the flow proceeds to #39.

If the lens lock switch LLS has been ON or OFF in the steps #29, #30 and #37, the flow proceeds to #3. In #31, whether or not the power switch PWS is ON is determined. If the power switch PWS is ON in #31, then whether the power switch PWS is changed from OFF to ON or it has been ON is determined in #32 by checking the power flag PWF In the latter case, the program proceeds to #39. If the power switch PWS is OFF in #31, then whether the power switch PWS is changed from ON to OFF or it has been OFF is determined in #34 by checking the power flag PWF. In the latter case, the program proceeds to #39. If the power switch PWS is ON in #31 and the PWF is not 1 in #32, it means that the power switch PWS is changed from OFF to ON. Therefore, the PWF is set to 1 in #33, the power on routine (SUB4) is executed and the flow proceeds to #39. If the power switch PWS is OFF in #31 and the PWF is net 0 in #34, it means that the power switch PWS is changed from ON to OFF. Therefore, PWF is set to 0 in #35, the powder off routine (SUB5) is executed and the flow proceeds to #39. In #39, the operation of the boosting circuit $DD_1$ in the body is stopped (PWCB="high") and interruption by the interrupt terminal $INT_A$ is permitted in #40 and thus the process is completed.

The content of the power on routine (SUB4) is shown in FIG. 11. First, in #210, whether or not a dedicated AF lens unit is attached is determined by checking the AF lens attachment flag $LLF_1$. If $LLF_1$ is not 1 in #210, it means that the dedicated AF lens unit is not attached, so that the subroutine for the lens non-attachment (SUB2) is executed, and the program returns to the main flow. If $LLF_1=1$ in #210, it means that a dedicated AF lens unit is attached, so that the port $P_{22}$ is set to the "high" level. Thereafter, the processes starting from the step #170 (resetting of the focusing lens at the infinite position) of the above described subroutine (SUB3) of the lens attachment operation is carried out and the program returns to the main flow.

The content of the power switch off routine (SUB5) is the same as the subroutine (SUB3) of the lens attachment operation except that the operation of the steps #140 and #141 is omitted.

As described above, when the battery is loaded or when the lens unit is attached, a low voltage $V_{LEL}$ is applied to the lens unit to start the operation of the microcomputer CPUL in the lens unit, and when the low voltage $V_{LEL}$ is applied or when the power switch PWS is OFF, the lens is set at the smallest zooming position where the size of the lens along the optical axis becomes shortest. Thereafter, or when the power switch PWS is turned ON, the focusing lens is reset at the infinite photographing position. The application of the low voltage $V_{LEL}$ for the lens unit is stopped by detaching the lens unit.

Figure 8:
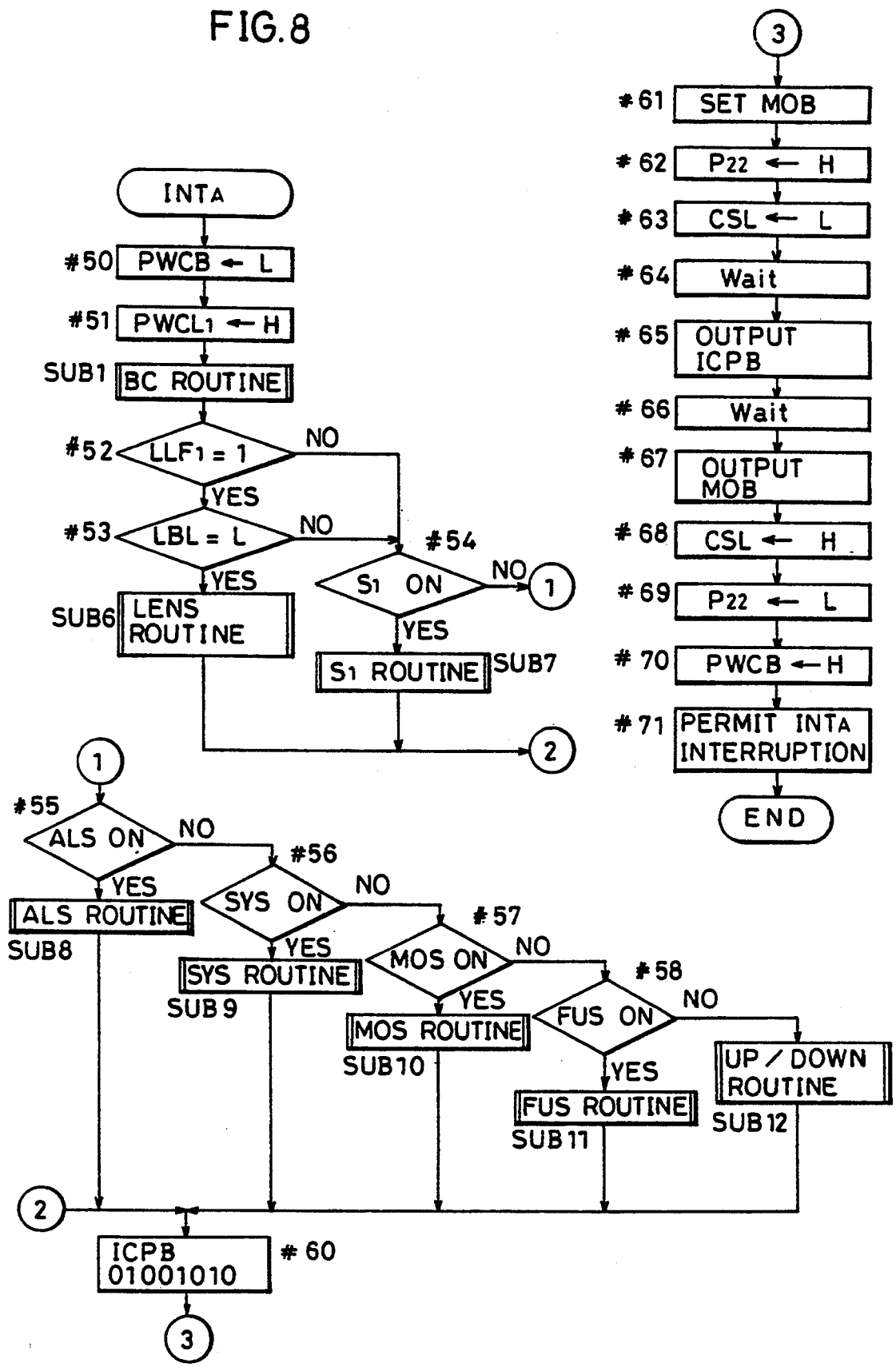

The interruption caused by operations of respective switches will be described in the following. When the switches are operated and a "low" level interrupt signal is inputted to the interrupt terminal $INT_A$, the operation starting from the step #50 shown in FIG. 8 is carried out. First, the boosting circuit $DD_1$ in the body is operated (PWCB="low"), and the application of the high voltage $V_{LEH}$ for the lens unit is stopped ($PWCL_1$="high") (#50, #51), in case of interruption during zooming. Thereafter, the BC routine (SUB1) is carried out. Whether or not a dedicated AF lens unit is attached is determined by checking the AF lens attachment flag $LLF_1$ (#52). If $LLF_1=1$, it means that the dedicated AF lens unit is attached, so that whether or not the bidirectional signal line LBL connected to this lens unit is at the "low" level is determined (#53). If the bidirectional signal line LBL is at the "low" level, it means that the microcomputer CPUB in the body is activated by the interruption signal from the lens unit. Therefore, a lens routine (SUB6) is executed and the program proceeds to #60. If the bidirectional signal line LBL connected to the lens unit is at the "high" level in #53 or when the $LLF_1$ is not 1 in #52, activation is not by the interruption signal from the lens unit, so that respective switches in the body are checked (#54 to #58).

First, whether or not the switch $S_1$ is ON is determined (#54). If the switch $S_1$ is ON, the activation is by the operation of the release button 6, so that a $S_1$ routine (SUB7) is executed and the program proceeds to #60. If the switch $S_1$ is not ON in #54, whether or not the respective switches ALS, SYS, MOS and FUS are ON or not is checked in the step #55, #56, #57 and #58. If any one of these switches is ON, then a subroutine corresponding to that switch, that is, AE lock routine (SUB8), a system reset routine (SUB9), a mode changing routine (SUB10) or a function routine (SUB11) is executed and the program proceeds to #60. If these switches are all OFF in #54 to #58, then it is determined that the up switch UPS or the down switch DOS is turned ON, so that a up/down subroutine of Av and Tv (SUB12) is carried out, and the program proceeds to #60.

In #60, the data 01001010 are set as the body status data ICPB, representing non-operable, power switch ON, body data output, power zoom possible and AF non-operation. In #61, the lens mode $LMO_1$ and the lens switch mode $LMO_2$ are set in the mode buffer MOB. In #62, the port $P_{22}$ is set at the "high" level and the bidirectional signal line LBL is set as a signal transmitting line from the body to the lens unit. In #63, the lens select signal CSL is set to the "low" level to select the lens unit as an object communication with the microcomputer CPUB in the body. The program waits for a prescribed time period in #64. In #65, the contents of the body status data ICPB are outputted to the lens unit, the program waits for a time lapse in #66, and the contents of the mode buffer MOB are outputted to the lens unit in #67. In #68, the lens select signal CSL is returned to "high" level, and the port $P_{22}$ is set to "low" level in #69 so that the bidirectional signal line LBL is set as a signal transmitting line from the lens unit to the body. Consequently, the activation from the lens unit is permitted. In #70, the boosting by the boosting circuit $DD_1$ in the body is stopped (PWCB="high") and in #71, an interruption by the interrupting signal $INT_A$ is permitted, and thus the process is terminated.

The $S_1$ routine (SUB7), which is called when the switch $S_1$ is turned ON will be described with reference to FIG. 13. In this subroutine, a light measurement enable signal LMEN is set to the "low" level to make the light measuring interface LMIF in an operation state (#251). By doing so, the light measuring interface LMIF successively A/D converts measured brightness values at a constant period based on a reference clock $\phi$ from the microcomputer CPUB in the body. Every time an A/D conversion of one measured brightness value is completed, the brightness measuring data are latched to registers corresponding to respective brightness measuring portions. This operation is repeated while the light measurement enable signal LMEN is at the "low" level. Thereafter, whether a dedicated AF lens unit is attached or not is determined based on the AF Lens attachment flag $LLF_1$ (#252). If $LLF_1=1$ (AF lens attached), then a flag AFF indicating the AF operation is carried out is set to 1 and the flow proceeds to the offset routine (SUB13). If $LLF_1=0$ (AF lens unit has not yet been attached), then the program proceeds to #297.

In the offset routine (SUB13), processes for focus detection are carried out. First, offset processing is carried out in the offset routine (SUB13) in which the focusing lens is moved to a position enabling focus detection of a varifocal lens. The offset process is an operation for ensuring focus detection. More specifically, when a varifocal lens, in which the in-focus state changes during zooming, is used, and the focusing lens goes out of the in-focus position during zooming, the focusing lens is moved in the range from the infinite photographing position to the closest photographing position to enable the in-focus state. The amount of movement of the lens at this time is called an offset amount $N_L$, and how to calculate this amount will be described later with reference to FIGS. 53 and 54.

Figure 14:
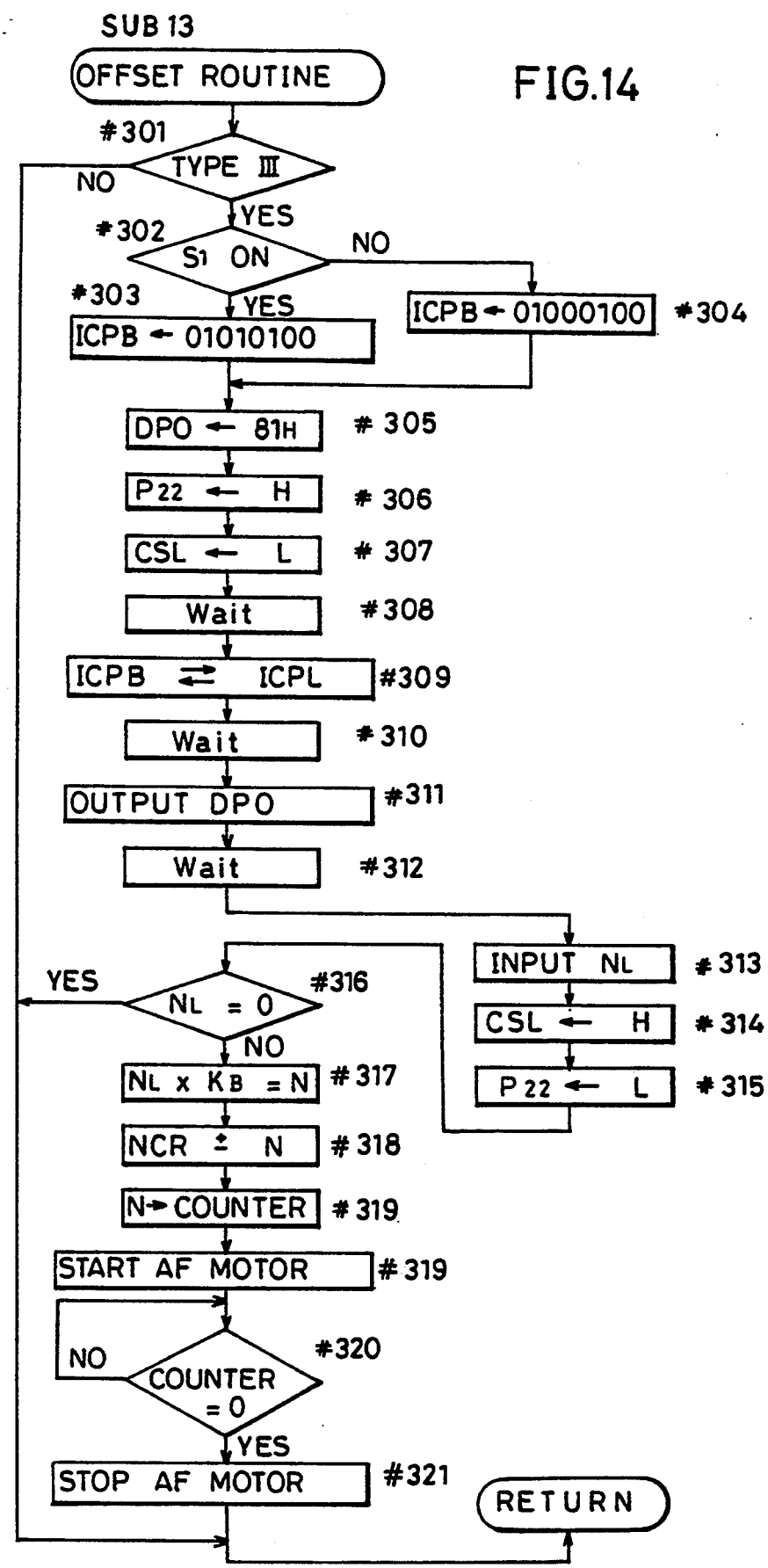

The offset routine (SUB13) will be described in the following with reference to FIG. 14. In this subroutine, first, whether or not the lens unit attached is of the type III (varifocal lens) is determined (#301). If the lens unit attached is not the varifocal lens, the program directly returns to the main flow. Meanwhile, if it is the varifocal lens, whether or not the preparatory switch $S_1$ is ON is determined (#302). If the preparatory switch $S_1$ is ON, then data 01010100 is set at the body status ICPB, representing exposure calculation, power switch ON, lens data input, power zoom possible and AF non-operation. When the preparatory switch $S_1$ is OFF, then the data 01000100 are set as the body status data ICPB representing non-operable, power switch ON, lens data input, power zoom possible and AF non-operation (#303, #304). The data pointer DP0 is set to $81_H$ (#305). This means that 1 byte data from the eighth address (AD8) (that is, the offset amount $N_L$ in the lens unit) is to be inputted from the lens unit. In #306 to #311, these two data are transmitted to the lens unit. Namely, the port $P_{22}$ is set to "high" level in #306 to use the bidirectional signal line LBL as a signal transmitting line from the body to the lens unit, and the lens select signal CSL is set to "low" level in #307 so as to select the lens unit as an object of communication with the microcomputer CPUB in the body. Thereafter, the program waits for a prescribed time period in #308, the body status data ICPB and the lens status data ICPL are exchanged in #309, the program waits for a prescribed time period in #310 and the contents of the data pointer DP0 are outputted to the lens unit in #311. Thereafter, the program waits for a time period required for calculating the offset amount $N_L$ in the lens unit and the offset amount $N_L$ is inputted (#312, #313). In #314, the lens select signal CSL is returned to "high" level, and the port $P_{22}$ is set to the "low" level in #315 so as to set the bidirectional signal line LBL as a signal transmitting line from the lens unit to the body. Consequently, activation from the lens unit is permitted. In #316, whether or not the offset amount $N_L$ is 0 is determined. If $N_L=0$, there is no need to move the lens by the offset amount, so that the program directly returns to the main flow. Meanwhile, if $N_L$ is not 0, the lens must be moved by the offset amount, so that $N_L \times K_B = N$ ($K_B$ is a coefficient for converting the amount of rotation $N_L$ of AF couplers 12 and 21 to the number of rotation N of the AF motor $MO_2$) is calculated. The number of rotation N of the AF motor $MO_2$ for moving the focusing lens by the offset amount $N_L$ is calculated, and the number of rotation N is added or subtracted in accordance with the direction of driving to or from the present position register NCR of the focusing lens (#317, #318). The number of rotation N may be positive or negative. The number of rotation N is preset in a counter for counter interruption, the AF motor $MO_2$ is rotated in a direction corresponding to the negative or positive direction of the rotation number N, and the program waits until the content of the counter become 0 by the subtraction by the process from the encode ENC. If the content of the counter reaches 0, the AF motor $MO_2$ is stopped and the program returns to the main flow (#319 to #321).

Figure 13B:
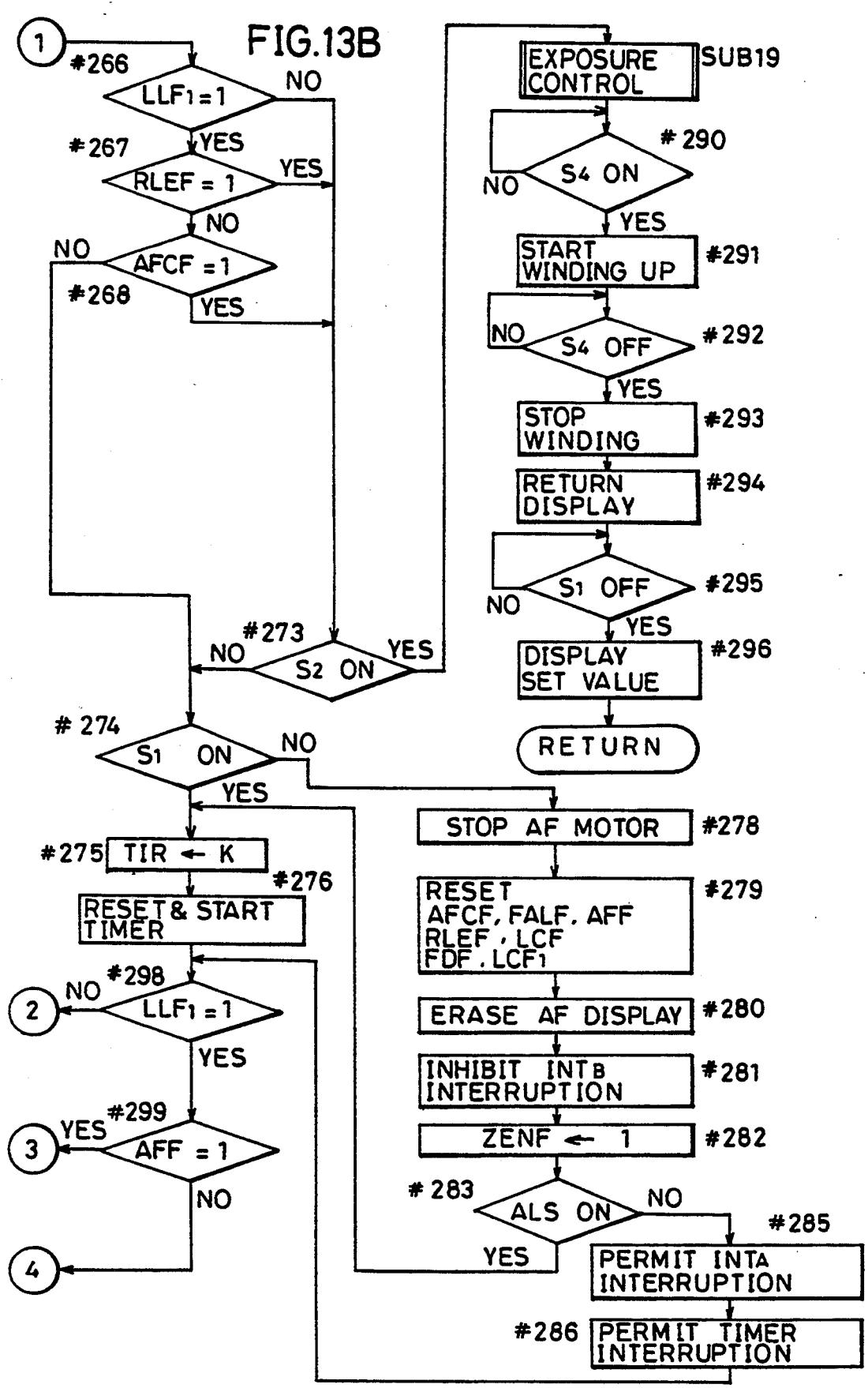

Returning to the flow of FIG. 13, when the offset routine (SUB13) is completed in $S_1$ routine, an CCD initializing operation is carried out for sweeping unnecessary charges of the CCD (#253). In order to prevent power zooming, a zoom enable flag ZENF is set to 0 and in order to indicate that the light measurement calculation has not yet been completed, a light measurement calculation un-finish flag LMF is set to 1. Charge accumulation of the CCD is started, an interruption by an interruption signal inputted to the interruption terminal $INT_B$ at the end of accumulation is permitted, and the flow proceeds to an AE routine (#254 to #257).

In the AE routine, at first a lens communication routine (SUB14) is executed. This routine is to read data necessary for AE and AF from the lens unit. Whether or not the lens unit attached is a new lens unit is determined (#258). If it is a new lens unit, then whether or not the AF completion flag AFCF is checked (#259). This is to determine whether or not AF is completed. If AFCF=1 and AF is completed, the power zooming is permitted and the zooming routine (SUB15) is executed. Meanwhile, if the AFCF is not 1 and the AF is not completed, proper focus detection during zooming is impossible since light from the object entering the light receiving portion for focus detection is changed during zooming (size of the object corresponding to the focus detecting during zooming area is changed), so that the zooming routine (SUB15) is skipped. In addition, when a varifocal lens is used, the photographing distance is also changed by the zooming operation, so that zooming during movement of the focusing lens is not preferred. Therefore, when the AF is not completed, the zooming routine (SUB15) for power zooming is skipped. If the AF is not completed or if the zooming routine (SUB15) is completed, a lens switch routine (SUB16) is executed to carry out a process in correspondence with the operation of the lens switch, and the program proceeds to the step #297. If it is determined in #258 that the lens unit employed is an conventional lens unit, the program skips the step #259 and the subroutines SUB15 and SUB16 to proceed to the step #297, since the conventional lens has neither the power zooming mechanism nor the lens switch. If the dedicated AF lens unit is not attached in #252, the program also skips the zooming routine (SUB15) and the lens switch routine (SUB16) and proceeds to the step #297.

In #297, ISO data indicative of the film sensitivity is inputted. Thereafter, data from the flash is inputted (#260). For inputting the flash data, the flash select signal CSF is set to the "low" level, and it is set to the "high" level after a prescribed time period. A serial clock SCK is outputted and serial data transmitted in synchronization with the clock signals SCK from the flash are read. Consequently, data of a dedicated flash, completion of charging, attainment of proper flash emission control and the data of the amount of flash are inputted from the flash to the body. Thereafter, a subroutine (SUB17) for inputting light measuring data from the light measuring interface LMIF is executed, and a subroutine (SUB18) of exposure calculation is executed based on the inputted light measuring data. Thereafter, the result of calculation is transmitted to the displaying circuit $DSP_1$ to provide a display, and data are outputted to the flash (#261, #262). In outputting data to the flash, the flash select signal CSF is set to "low" level and the said signal CSF is kept at "low" level while the data are outputted, thereby distinguishing the case from data input. The output data from the body to the flash are the aperture value Av, the film sensitivity Sv, the photographing distance Dv and the focal length f. Since the exposure calculation has been carried out, the exposure calculation non finished flag LMF is set to 0 (#263). In #264, whether or not the flag FDF is 1 is determined. The flag FDF is provided for a case in which an interruption is generated by the completion of CCD accumulation when the exposure calculation has not yet been completed once. Namely, the data from the CCD are inputted and then the flag FDF is set to 1, the program returns to the address of the AE routine where the interruption occurred and the remaining AE routine is executed (see #581 to #583 of FIG. 24). If FDF=1 in #264, then FDF is set to 0 in #265 and the program proceeds to the AF routine. If FDF=0 in #264, the flow proceeds to #266.

In #266 to #273, whether or not the program can proceed to the exposure controlling operation is determined. In #266, whether or not the lens unit attached is the dedicated AF lens is determined by checking AF lens attachment flag $LLF_1$. If $LLF_1$ is not 1 and the lens employed is not the dedicated AF lens, the flow directly proceeds to #273. If the lens attached is a dedicated AF lens, then whether or not the release enable flag RLEF is 1 is determined in #267. If RLEF=1 in #267, it means that release is given priority, so that the flow proceeds to #273 If RLEF is not 1 in #267, it means the AF is given priority, so that whether or not AF completion flag AFCF is 1 is determined in #268. If AF has been completed in #268 the flow proceeds to #273. If not, the program proceeds to #274. In #273, whether or not the release switch $S_2$ is ON is determined. If the release switch $S_2$ is ON in #273, the flow proceeds to the exposure controlling operation (SUB19). If the release switch $S_2$ is OFF, the flow proceeds to #274.

In #274, whether or not the preparatory, switch $S_1$ is ON is determined. If the preparatory switch $S_1$ is ON, then a prescribed value K is set in a register TIR for a timer in #275, and the timer is reset and started in #276. In #298, whether or not the lens unit attached is a dedicated AF lens unit is determined by checking the AF lens attachment flag $LLF_1$. If $LLF_1$=1 (a dedicated AF lens unit), then whether or not AF operation is being carried out is determined in #299 by checking the AF operation flag AFF. If AFF is not 1, the program proceeds to #252. If AFF=1, the flow proceeds to AE routine. If the lens attached is not the dedicated AF lens in #298, then the flow proceeds to #297.

If the preparatory switch $S_1$ is OFF in #274, the AF motor $MO_2$ is stopped and respective flags AFCF, FALF, AFF, RLEF, LCF, FDF, and $LCF_1$ are reset to 0, a display for AF is erased, interruption by the interruption terminal $INT_B$ (interruption at the time of completion of CCD accumulation) is inhibited, and the power zooming is permitted (ZENF=1) (#278 to #282). Thereafter, whether or not AE lock switch ALS is ON is determined (#283). If AE lock switch ALS is OFF, it means that the preparatory switch $S_1$ and AE lock switch ALS are both OFF. Since the AE routine is to be repeated for a prescribed time period (for example 5 sec) from the turning OFF of the switches $S_1$ and ALS, an interruption by the interruption terminal $INT_A$ is permitted in #285 and an interruption by the timer is permitted in #286, and then, the program proceeds to #298. If the AE lock switch ALS is ON in #283, the program proceeds to #275.

If the release switch $S_2$ is ON in #273, the exposure controlling routine (SUB19) is executed. If the exposure controlling operation is terminated and the reset switch $S_4$ is turned ON, then film winding is carried out (#290, #291). If the film winding is completed and the reset switch $S_4$ is turned OFF, the film winding is stopped (#292, #294). The display is provided again and the program is kept in a waiting state until the preparatory switch $S_1$ is turned OFF (#294, #295). If the preparatory switch $S_1$ is turned OFF, only the set value is displayed and the program returns to the main routine (#296).

Each of the subroutines in the $S_1$ routine will be described in the following.

First, a lens-body data communication routine (SUB14) will be described with reference to FIG. 15. If this subroutine is called, the port $P_{22}$ is set to "high" level and the bidirectional signal line LBL is used as a signal transmitting line from the body to the lens unit (#331). Thereafter, whether or not the lens unit attached is a new lens is determined (#332). If it is a new lens unit, then the subroutine for setting ICPB (SUB20) is executed, and otherwise the program proceeds to #345.

Figure 16:
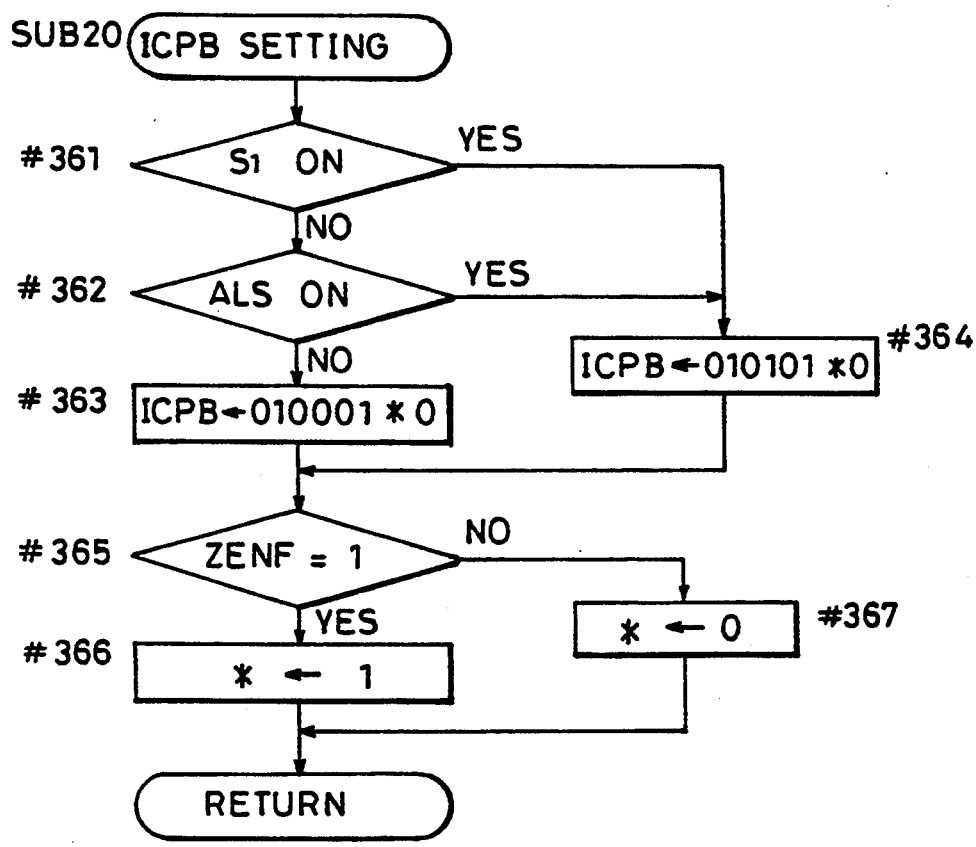

The subroutine (SUB20) for setting ICPB will be described with reference to FIG. 16. In this subroutine, first, whether or not the preparatory switch S1 or the AE lock switch ALS is ON is determined (#361, #362). If either one of the switches S1, ALS is ON, it means that the body is carrying out exposure calculation, so that data 010101*0 indicating a lens data input are set at the body status data ICPB (#364). If the switches $S_1$ and ALS are both off, it means that the body is not operating, so that data 010001*0 indicative of lens data input are set at the body status data ICPB (#364). The first bit $b_1$ of the body status ICPB is set to 1 to indicate that the power zooming is possible when the zoom enable flag ZENF is 1. If ZENF=0, the first bit $b_1$ is set to 0 so as to indicate that the power zooming is impossible (#365 to #367).

Figure 15:
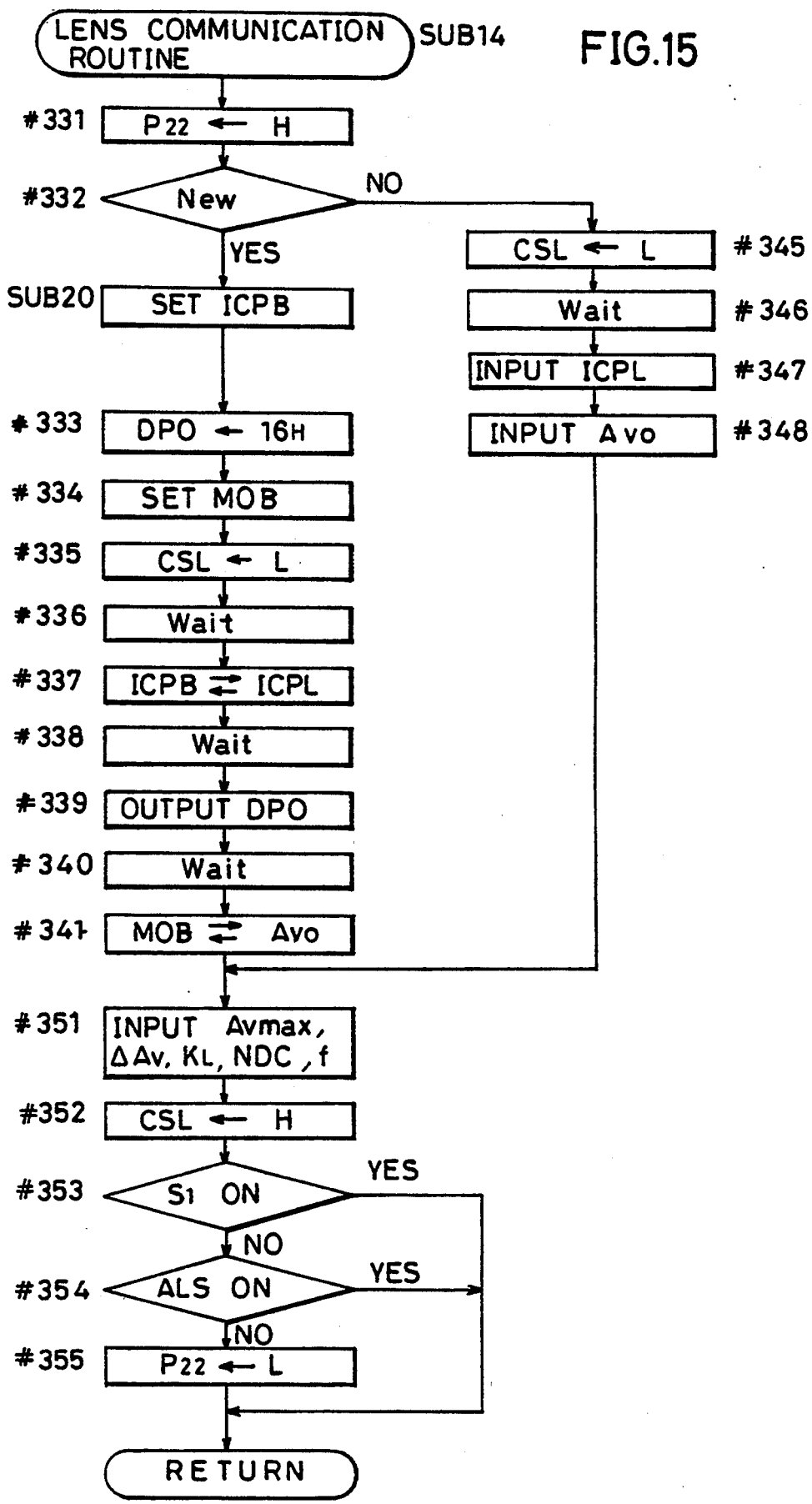

Returning to the flow of FIG. 15, the data pointer DPO is set to $16_H$ in #333. Consequently, 6 bytes data from the first address AD1 are designated as the data to be read from the lens unit. In #334, the mode buffer MOB is set. The contents of the body status data ICPB, the data pointer DPO and of the mode buffer MOB are transmitted to the lens unit. At the same time, in exchange with the body status data ICPB, the lens status data ICPL is received from the lens unit, and in exchange with the mode buffer MOB, the data of the full open aperture value Avo is received from the lens unit (#335 to #341) Data of the maximum aperture value Avmax, the deviation of the aperture value ΔAv, conversion coefficients $K_L$ and NDC and of the focal length f are inputted from the lens unit, and the lens select signal CSL is returned to the "high" level (#351, #352).

Meanwhile, if it is not a new lens unit in #332, then the lens status data ICPL and the full open aperture value Avo are inputted in #345 to #348, and the remaining lens data (Avmax to f) are similarly inputted in #351. The reason for this is that the body status data ICPB, the data pointer DPO and the mode buffer MOB cannot be received by an conventional lens unit.

After the completion of the above described data communication, whether or not the preparatory switch S1 and the AE lock switch ALS are both OFF is determined (#353, #354). If the switches S1 and ALS are both OFF, then the port $P_{22}$ is set to the "low" level and the bidirectional signal line LBL is used as a signal transmitting line from the lens unit to the body. Thereafter, the program returns to the main flow (#355). If either one of the preparatory switch $S_1$ and the AE lock switch ALS is ON, then the program skips the step #355 and returns to the main flow. In that case, the bidirectional signal line LBL serves as a signal transmitting line from the body to the lens unit.

Figure 17:
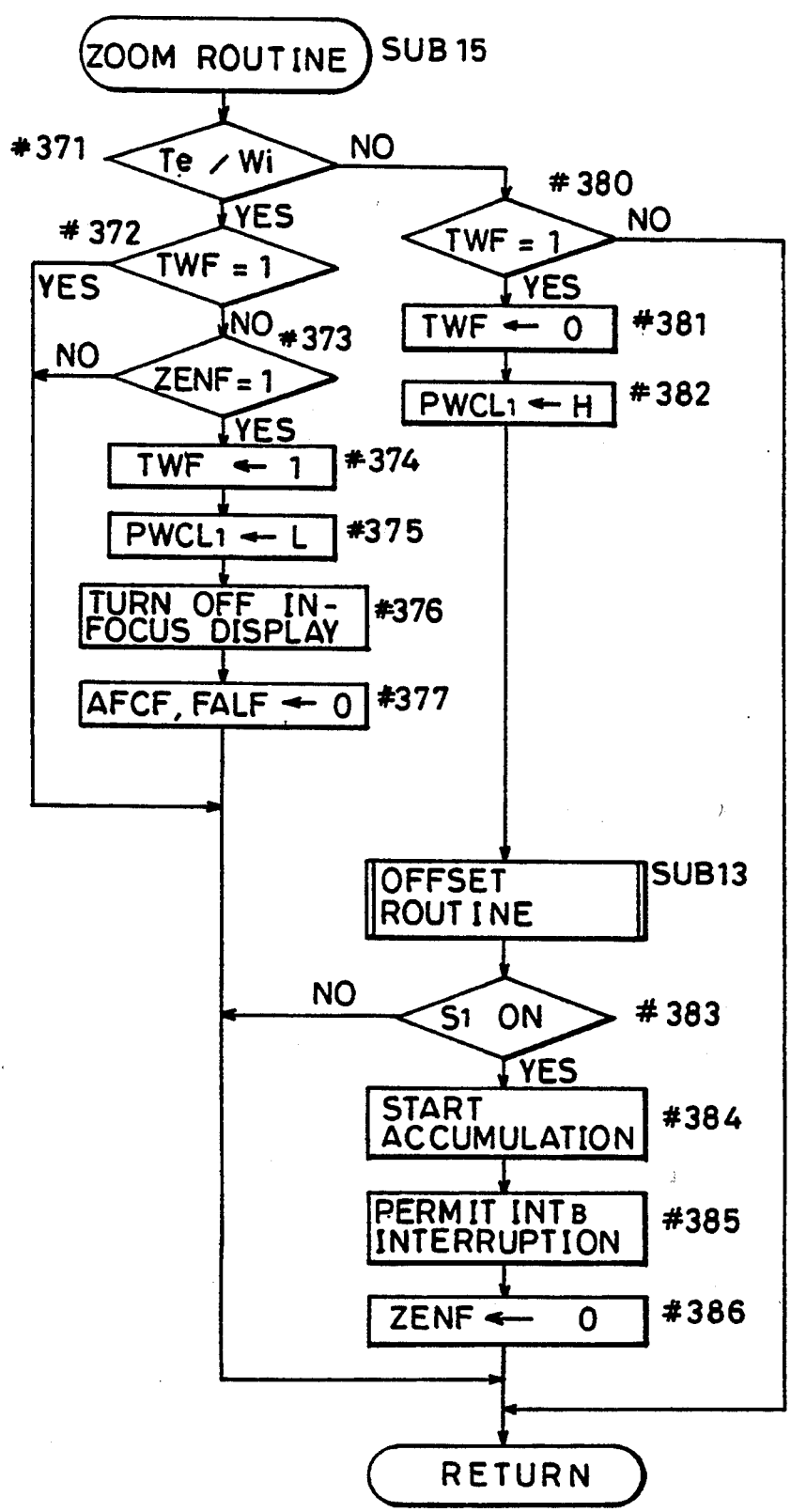

The zooming routine (SUB15) will be described in the following with reference to FIG. 17. In this subroutine, whether or not an ON signal of the tele switch TeS or the wide switch WiS has been inputted is determined (#371). If an ON signal has been inputted in #371, then the program proceeds to #372, in which whether or not it is the first ON signal inputted is determined by checking a flag TWF. The flag TWF becomes 1 when the tele switch TeS or the wide switch WiS is ON. The flag is set to 0 when the tele switch TeS and wide switch WiS are both off. If TWF is not 1 in #372, it means that the state has changed from OFF to ON. In this case, whether or not power zooming is possible is determined by checking the zoom enable flag ZENF in #373. If power zooming is possible, then TWF is set to 1, the high voltage $V_{LEH}$ for the lens unit is supplied (PWCL$_1$="low"), the in-focus display is erased, the flags ALCF and FALF are set to 0, and the program returns to the main flow (#374 to #377). If TWF=1 in #372, it means that the switch TeS or WiS for zooming has been ON, therefore the program skips the steps #373 to #377 to return to the main flow. If the zoom enable flag ZENF is not 1 in #373, power zooming is impossible even if the switch TeS or WiS for zooming is turned from OFF to ON, so that the program skips the steps #374 to #377 and returns to the main flow.

If the tele switch TeS and the wide switch WiS are both off in #371, then whether or not the state of these switches have been changed from ON to OFF are determined by checking the flag TWF (#380). If TWF is not 1, it means that the switches have been OFF, so that the program directly returns to the main flow. If TWF=1, it means that the switches are turned from ON to OFF, so that the flag TWF is set to 0, and the application of the high voltage $V_{LEH}$ for the lens unit is stopped (PWCL$_1$="high") (#381, #382). Thereafter, the offset routine (SUB13) is executed and the offset (amount $N_L$) of the focusing lens caused by the zooming operation is corrected. Whether or not the preparatory switch $S_1$ is ON is determined (#383). If the preparatory switch $S_1$ is OFF, then the program directly returns to the main flow. If the preparatory switch $S_1$ is ON, then charge accumulation of the CCD is started. Interruption to the interrupt terminal $INT_B$ (interruption caused by the completion of CCD accumulation) is permitted, AF operation is carried out for confirming whether or not the in-focus state can be corrected by the movement of the offset amount $N_L$ of the focusing lens, the flag ZENF is set to 0, and the program returns to the main flow (#384 to #386).

The lens switch routine (SUB16) will be described in the following with reference to FIG. 18. In the subroutine, whether or not the lens switch is ON is determined at first (#391). If the lens switch is ON, whether or not the WIM (Wide Mode) is selected or not is determined (#392). If it is the WIM (Wide Mode), whether or not the lens is of the type I (fixed focal lens or manual zoom lens) is determined (#393). If the lens unit is of the type I, then the program directly returns to the main flow. If the lens unit is not of the type I, then whether or not the preparatory switch $S_1$ is ON is determined (#394). If the switch $S_1$ is ON, whether or not a low contrast flag LCF is 1 is determined (#395). If the low contrast flag LCF is not 1, it means that the focus detection is possible, and the program directly returns to the main flow. If the preparatory switch $S_1$ is OFF (#394) or if the low contrast flag LCF=1 in #395 indicating that the focus detection is impossible, then whether or not the lens switch flag LSF is 1 is determined (#396). If the lens switch flag LSF is not 1, it means that the lens switch has been turned from OFF to ON. Therefore, the lens switch flag LSF is set to 1, the AF motor $MO_2$ is stopped and a high voltage $V_{LEH}$ for the lens unit is supplied ($PWCL_1$="low") (#397 to #399) in order to move the zooming lens to the wide end. Interruption to the interruption terminal $INT_B$ (interruption by the completion of CCD accumulation) is inhibited, the flags AFCF and FALF are set to 0 and the program returns to the main flow (#400, #407).

If the lens switch flag LSF is 1 in #396, it means that the lens switch has been ON, and the WIM (Wide Mode) operation has been carried out, so that whether or not the zooming to the wide end has been terminated or not in the lens unit is determined (#401). If the zooming has not yet been stopped, then the program directly returns to the main flow, if the zooming is stopped, then the application of the high voltage $V_{LEH}$ for the lens unit is stopped ($WCL_1$="high") so as to stop the zoom motor $MO_3$ (#402). In order to correct the defocus amount (offset amount) of the focusing lens caused by the zooming, the offset routine (SUB13) is executed, and whether or not the preparatory switch $S_1$ is ON is determined (#403). If the switch $S_1$ is OFF, then the program directly returns to the main flow. If the preparatory switch $S_1$ is ON, charge accumulation of the CCD is started, interruption to the interruption terminal $INT_B$ (interruption by the completion of CCD accumulation) is permitted. An AF operation is carried out to check whether or not the in-focus state is corrected by the movement of the focusing lens by the offset amount $N_L$, the flag ZENF is set to 0 and the program returns to the main flow (#404 to #406).

If it is not the WIM (Wide Mode) in #392, then whether or not the lens switch flag LSF is 1 is determined (#409). If LSF is not 1 in #409, it means that the lens switch is turned from OFF to ON. In #410, the LSF is set to 1, and whether or not it is ALM (AE lock mode) is determined in #411. If it is the ALM (AE lock mode), then LALM is set to 1 in #412 and the program returns to the main flow. The flag LALM indicates that the AE lock operation is carried out by the operation of the lens unit. If it is not ALM (AE lock mode) in #411, then whether it is the RLPM (Release Priority Mode) is determined in #413. If it is the RLPM (Release Priority Mode) in #413, then RLEF is set to 1 in #414 and the program returns to the main flow. The flag RLEF indicates the release priority mode. If it is not the RLPM (Release Priority Mode) in #413, the program directly returns to the main flow. If LSF is 1 in #409, it means that the lens switch has been ON, therefore the program directly returns to the main flow.

If the lens switch is OFF in #391, whether or not it is the WIM (Wide Mode) is determined (#416). If it is the WIM (Wide Mode), whether or not the lens unit is of the type I (fixed focal lens or manual zoom lens) is determined (#417). If the lens unit is of the type I, then the program directly returns to the main flow. If the lens unit is not of the type I, whether or not the lens switch flag LSF is 0 is determined (#418). If the lens switch flag LSF is not 0, it means that the lens switch is turned from ON to OFF, so that the flag LSF is set to 0. A high voltage $V_{LEH}$ for the lens unit is supplied ($PWCL_1$="low") in order to move the lens from the wide end to the original focal length, the interruption by the interruption terminal $INT_B$ is inhibited, and the program returns to the main flow (#419 to #421). The flags AFCF and FALF are set to 0 (#407) If the lens switch flag LSF is 0 in #418, it means that the lens switch is OFF, so that the program proceeds to #401. Whether or not the zooming is stopped (the original focal length is realized) is determined, the above described operation is carried out, and the program returns to the main flow.

If it is not the WIM (Wide Mode) in #416, whether or not the lens switch flag LSF is 0 is determined (#425). If the lens switch flag LSF is 0, it means that the lens switch has been OFF, so that the program directly returns to the main flow. If the lens switch flag LSF is not 0 in #425, it means that the lens switch is turned from ON to OFF, so that the flags LSF, LALF and RLEF are set to 0 in #426, and the program returns to the main flow.

Figure 19:
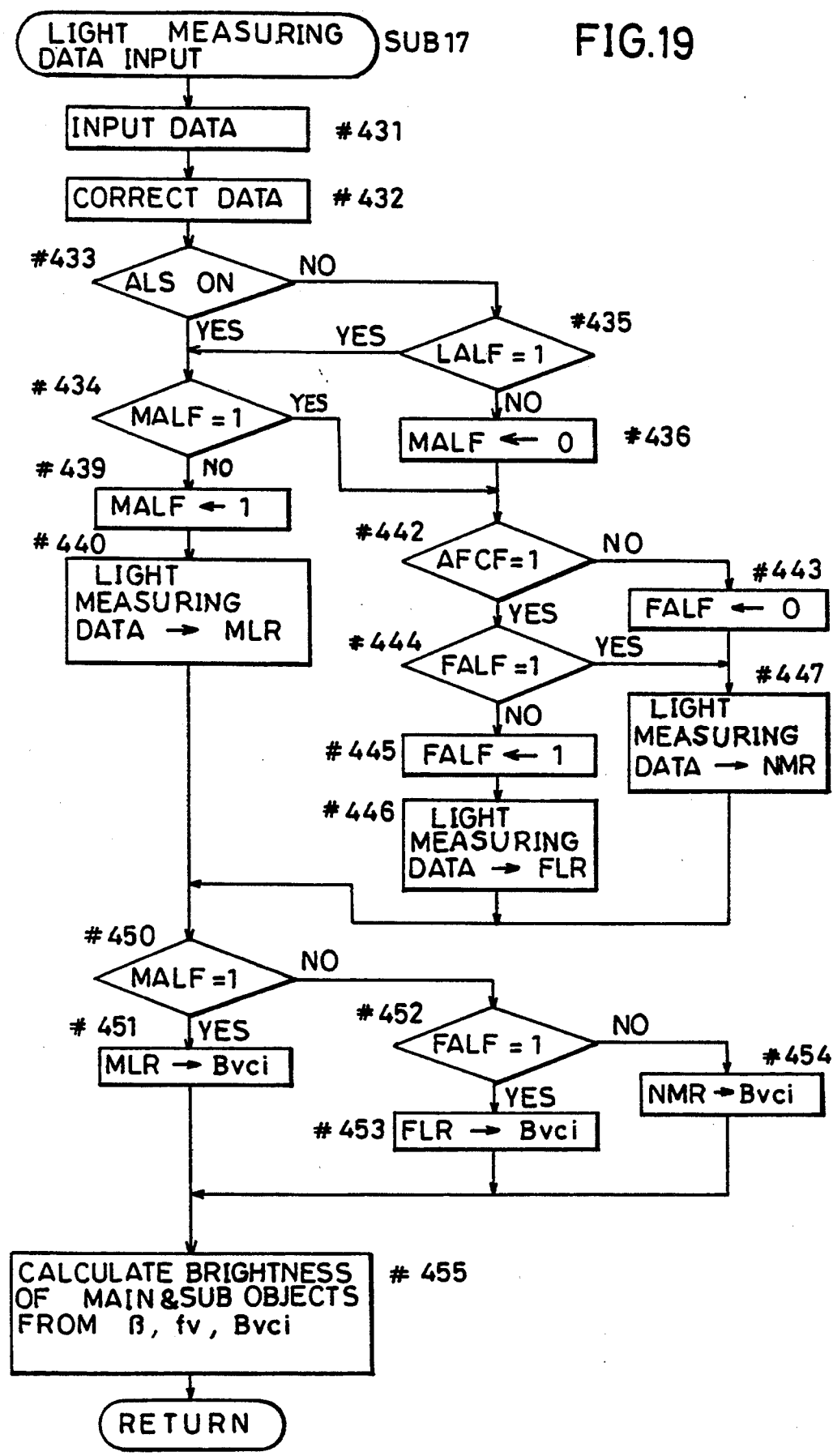

The light measuring data input routine (SUB17) will be described in the following with reference to FIG. 19. In this subroutine, various light measuring data are inputted and the errors in light measuring and the full open aperture value are corrected (#431, #432).

Thereafter, whether or not the AE lock switch ALS is turned from OFF to ON by the switch operation of the body or the lens unit is determined. If the AE lock switch has been turned from OFF to ON, then a manual AE lock completion flag MALF is set to 1 and the light measuring data are set in the register MLR (#433, #434, #439, #440). The register MLR is for inputting light measuring data at manual AE lock. If the AE lock switches ALS on the body and on the lens unit are both OFF, then whether or not AE lock flag LALF by the lens unit is 1 is determined (#435). If LALF=1, then the program proceeds to #434. If LALF is not 1, then MALF is set to 0, and the AF completion flag AFCF is checked (#436, #442). When the AE lock switch ALS has been ON, the program also proceeds from #434 to #442 to check the state of the AF completion flag AFCF. If AF completion flag AFCF is 1, then AF.AE completion flag FALF is checked (#444). If the flag FALF is not 1, it means that the AF completion flag AFCF is changed from 0 to 1. The flag FALF is set to 1 and the light measuring data are set in the register FLR (#445, #446). The register FLR is for inputting light measuring data at the AF.AE lock in which the first light measuring data after the in-focus state is realized are stored. If the flag FALF is 1 in #444, then the light measuring data are set in a register NMR. If AFCF=0 in #442, then AF.AE lock completion flag FALF is set to 0 and the light measuring data are set in the register NMR (#443, #447). The register NMR is for inputting normal light measuring data. More specifically, if AE lock switch ALS is turned OFF to ON, the light measuring data are set in the register MLR. If the AF completion flag AFCF is changed from 0 to 1, the data are set in the register FLR, and otherwise the data are set in the register NMR. The contents of the register MLR are regarded as the light measuring data $B_{vci}$ ($i=1$ to 6) for calculation when the AE lock is done by AE lock switch, the contents of the register FLR is regarded as the brightness data when the AE lock is done by in-focusing, and the contents of the register NMR are regarded as the light measuring data in other states. Brightness of a main object located at the center of a photographic scene and a sub object surrounding the main object are calculated on the photographing magnification rate $\beta$, the focal length $f_v$ and the light measuring data $B_{vci}$ ($i=1$ to 6) (#450 to #455).

A subroutine for exposure calculation (SUB18) will be described in the following with reference to FIG. 20. In this subroutine, whether or not the flash is attached is determined at first (#461). If the flash is attached, the program proceeds to #462, and if the flash is not attached, the program proceeds to #481. Whether or not a dedicated AF lens unit is attached is determined by checking AF lens attachment flag $LLF_1$. If the dedicated AF lens is not attached in #462, the program proceeds to #463 in which whether or not it is the M mode (manual mode) is determined. If it is the M mode in #463, then a manual setting value is limited by synchronization limiting speed Tvx. If it is not in the M mode, then the shutter speed TV is set at the synchronization limiting speed Tvx in #464, and the program returns to the main flow. If a dedicated AF lens unit is attached in #462, whether or not the lens unit is of the type II (a common zoom lens, not a varifocal lens) is determined (#469). If the lens is of the type II, whether or not it is a EXZM (Exposure During Zooming is determined (#470). If it is the EXZM, the EXZM flash subroutine (SUB21) is executed.

Figure 21:
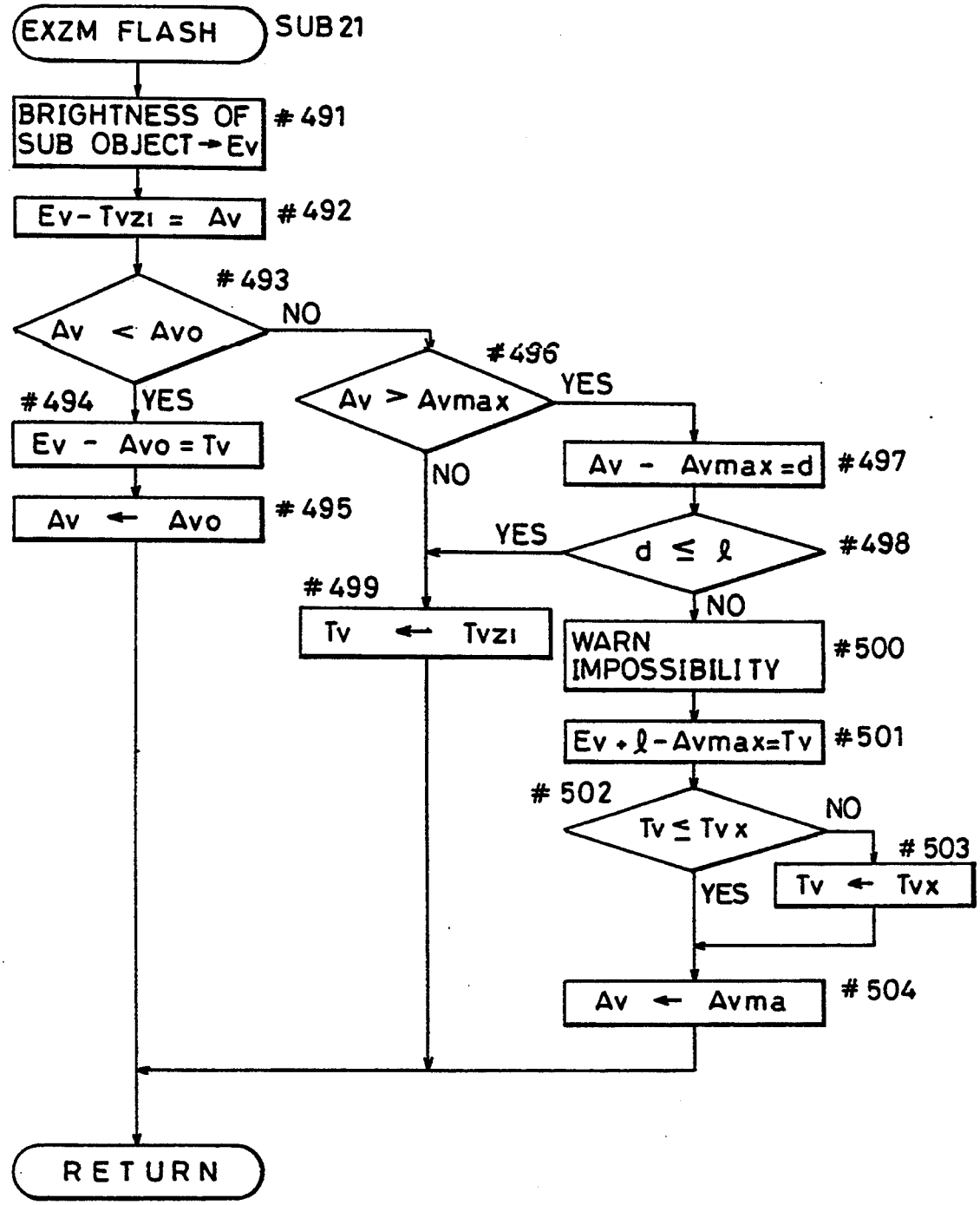

This subroutine will be described in the following with reference to FIG. 21. First, an exposure value Ev is determined based on the brightness of the sub subject. An aperture value $Av=Ev-Tvz_1$ is calculated with a prescribed shutter speed $Tvz_1$ given priority (#491, #492). The prescribed shutter speed $Tvz_1$ corresponds to an exposure time period enabling zooming while the shutter is fully opened. If the calculated aperture value is Av<Av0, then the aperture value Av is limited to the full open aperture value Av0 at Ev-Av0=Tv is set (#493, #494, #495). If the calculated aperture value is Avo≦Avmax, then the prescribed shutter speed $Tvz_1$ is used as the shutter speed Tv for controlling (#493, #496, #499). If Av>Avmax, whether or not a value Av-Avamax=d is no more than a film latitude is determined (#497, #498). If d≦1, the program proceeds to #499. If d>1, the proper correction of exposure is impossible, so that a warning indicative of the impossibility of the EXZM (for example flickering of the EXZM display) is carried out. A value Ev+1-Avmax=Tv is calculated, the calculated shutter speed Tv is limited to the synchronization limiting speed Tvx, the aperture value Av is limited to the maximum aperture value Avmax and the program returns to the main flow (#500 to #504).

Figure 20A:
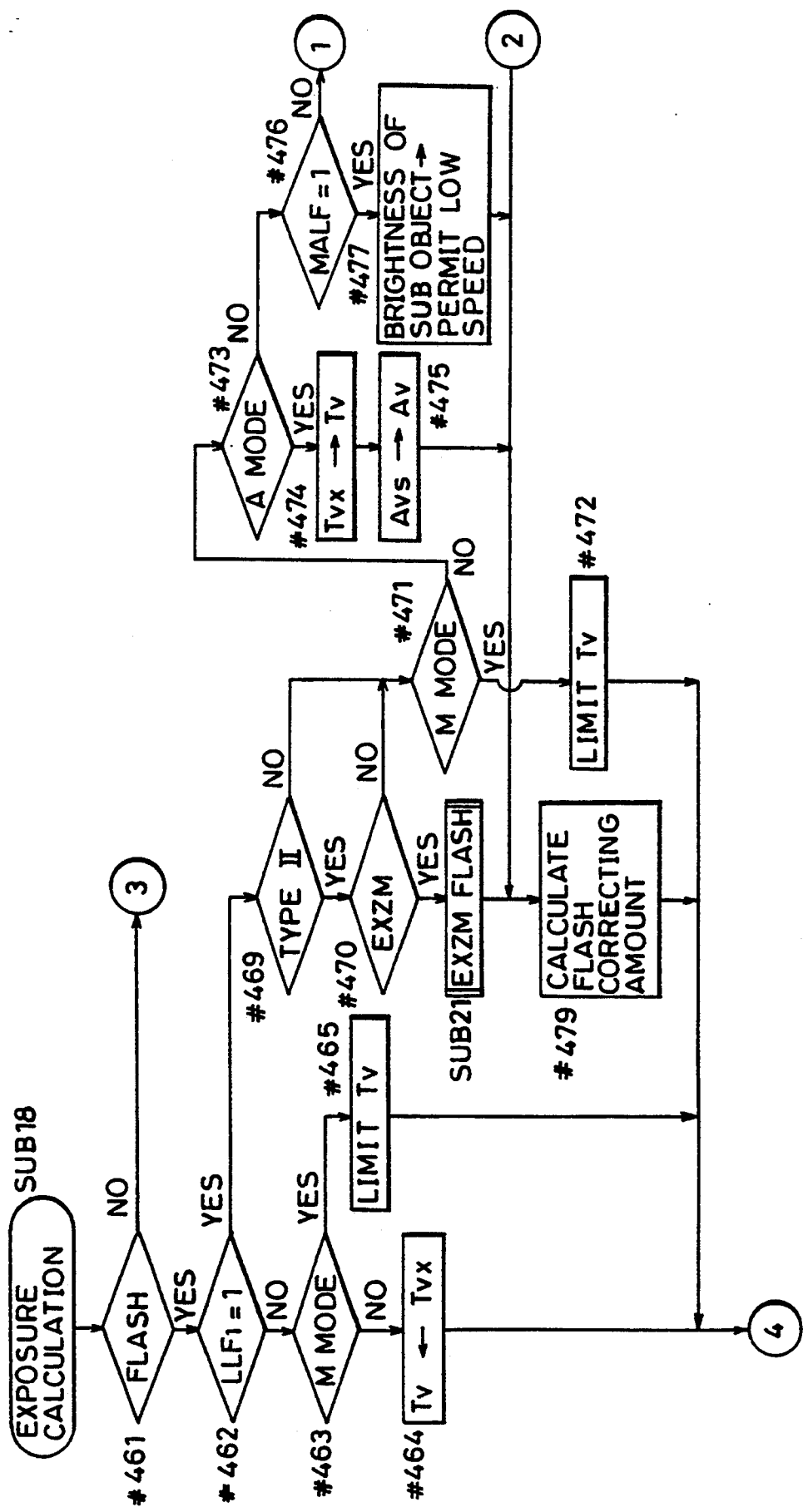

Returning to the flow of FIG. 20, if the lens unit is not of the type II in #469, or if it is not EXZM (Exposure During Zooming) in #470, the flow proceeds to the step starting from the step #471 to carry out calculation of the values Tv and Av in accordance with respective exposure modes and the state of AE lock. First, in #471, whether or not it is the M mode (manual mode) is determined. If it is the M mode, the shutter speed is limited as in the step #465 (#472). If it is not the M mode, whether or not it is the A mode (aperture priority AE mode) is determined (#473). If it is the A mode, the synchronizing speed Tvx is set as the shutter speed Tv, and a set aperture value Avs is set as the aperture value Av (#474 to #475). If it is not the A mode, whether or not the manual AE lock flag MALF is 1 is determined (#476). If MALF is 1, then the shutter speed Tv and the aperture value Av are determined based on the brightness of the secondly object In that case, a low shutter speed is also permitted. If the MALF is not 1, then the shutter speed TV and the aperture value Av are determined based on the brightness of the secondly objects with the shutter speed Tv limited by the synchronizing speed Tvx. The program proceeds from EXZM flash subroutine (SUB21), #475, #477, or #478 to #479 in which an amount of correction of the flash emitting light amount is calculated which corresponds to both a deviation between the brightness of the main object and a control exposure value (corresponding to the brightness of the secondly object) determined by Tv and Av, and the magnification rate, and then the program returns to the main flow.

In a natural (ambient) light mode, the program proceeds from #461 to #480. If the lens is not a dedicated AF lens unit, then in the M mode, the set shutter speed Tvs is used as the shutter speed Tv for controlling, and if it is not in the M mode, the shutter speed is determined as (brightness of the main object)+Sv=Tv, and the program returns to the main flow (#482 to #484). If the lens unit is a dedicated AF lens in #481, whether or not the lens unit is of the type II (a normal zoom lens, not a varifocal lens) is determined (#485). If the lens unit is of the type II, then whether or not it is EXZM (Exposure During Zooming) is determined (#486). If the lens unit is not of the type II in #485 or if it is not the EXZM in #486, then exposure calculation corresponding to the exposure control mode (P mode, S mode, A mode or M mode) is carried out in accordance with the brightness of the main object in #487, and the program returns to the main flow. If the lens employed is a dedicated AF lens of the type II and it is the EXZM (Exposure During Zooming), then the program proceeds through #481, #485, #486 to an exposure during zooming subroutine (SUB 22) under a natural light.

Figure 22:
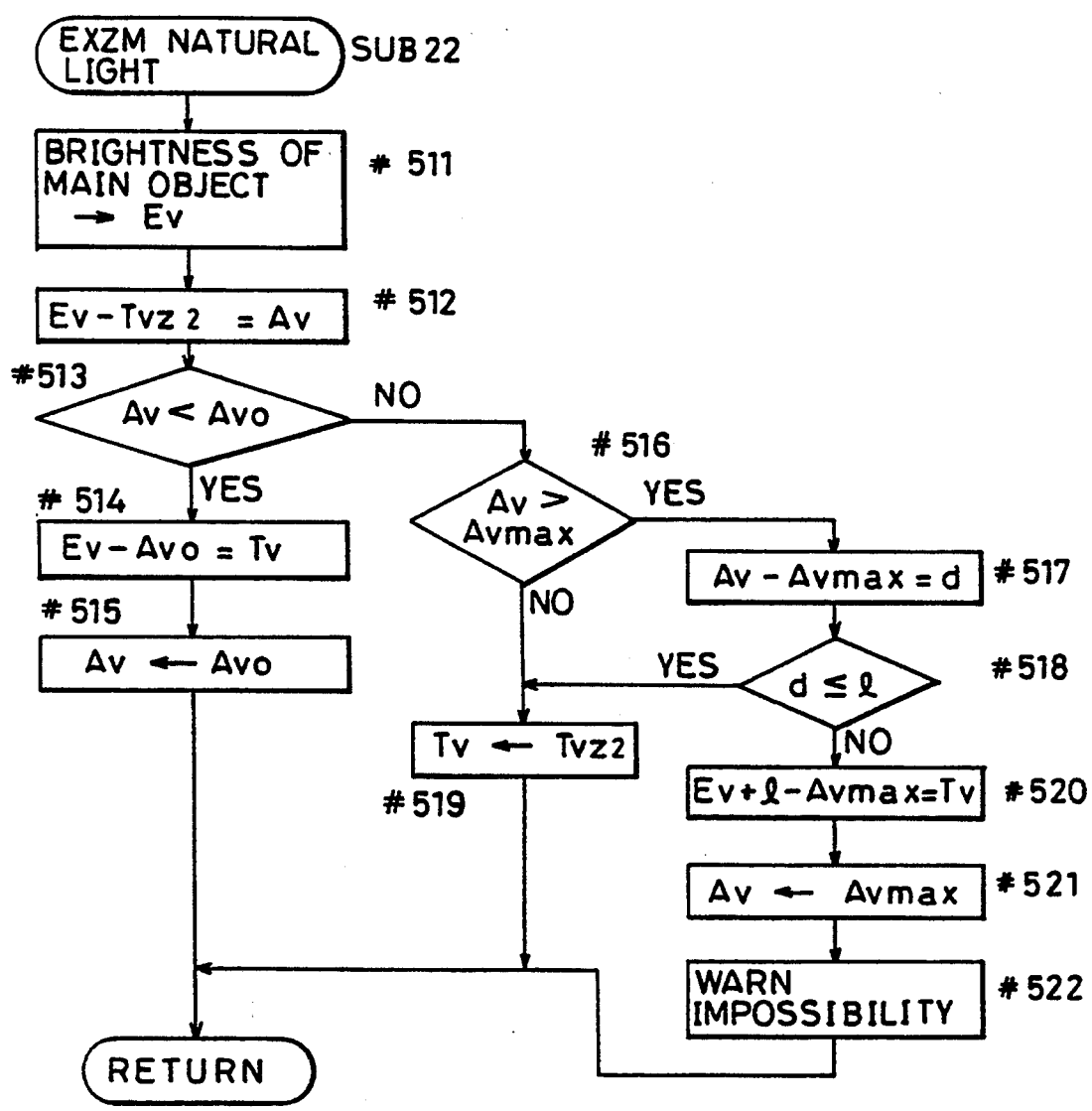

This subroutine will be described in the following with reference to FIG. 22. First, an exposure value Ev is calculated based on the brightness of the main object and an aperture value Av is calculated with a prescribed shutter speed $Tvz_2$ ($Tvz_2 < Tvz_1$) given priority (#511, #512). If the calculated aperture value is Av<Av0, then the aperture value Av is limited to the full open aperture value Av0 and it is determined that Ev-Av0=Tv (#514, #515). If the calculated aperture value is Av0≦Av≦Avmax, then a prescribed shutter speed $Tvz_2$ ($Tvz_2 < Tvz_1$) is directly used as the shutter speed Tv for controlling #513, #516, #519). If Av>Avmax, then whether or not a value Av-Avmax=d is no more than the film latitude 1 is determined (#517, #518). If d≦1, the flow proceeds to #519. If d>t, the value Ev+1-Avmax=Tv is calculated, and the aperture value Av is limited to the maximum aperture value Avmax. Since correction of proper exposure is impossible, a warning indicative of the impossibility of EXZM (for example, flickering of the EXZM display) is carried out and the program returns to the main flow (#520 to #522).

The value $Tvz_2$ is set to be smaller than $Tvz_1$ ($Tvz_2 < Tvz_1$) from the following reason. When an image which is to be the center is exposed, the exposure of the image as the center is carried out in a moment by the emission of a flash when the photography is taken with flash. However, when the photographing operation is carried out under the natural light (normal light), the zooming must be stopped for a prescribed time period in which the image which is to be the center is exposed. The above described shutter speed $Tvz_1$ and $Tvz_2$ may be changed in accordance with codes (not shown in this embodiment) indicative of the types of the lens unit or indicative of the zooming range of the lens units. In addition, these values may be set to values corresponding to a zooming range set by the user. Although no limitation is given for a long time photographing operation, there may be some limit for the long time photographing operation in order to prevent formation of two centers.

Figure 23:
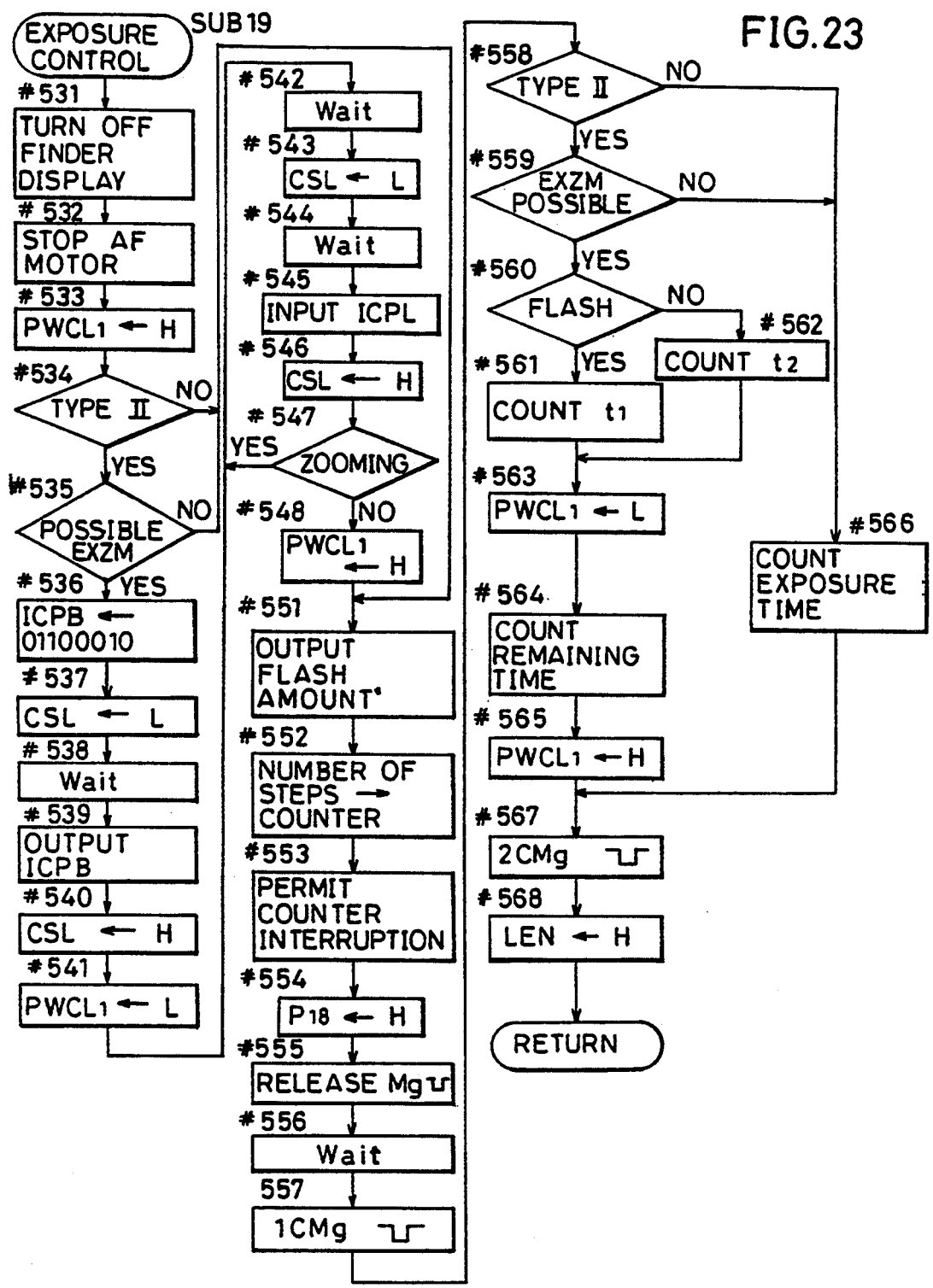

The exposure control routine (SUB19) will be described in the following with reference to FIG. 23. In this subroutine, the displays in the finder are erased at first, the AF motor $MO_2$ is stopped, and the application of the high voltage $V_{LEH}$ for the lens unit is stopped ($PWCL_1$="high") (#531 to #533). Thereafter, whether or not the lens unit is of the type II is determined (#534). If the lens unit is of the type II, then whether or not it is the EXZM (Exposure During Zooming) is determined (#535). If the lens unit is of the type II and it is the EXZM (Exposure During Zooming), then data ($ICPB_{54}=10$) indicating that the exposure control operation is being carried out is set in the body status data ICPB, and the same is transmitted to the lens unit (#536 to #540). A high voltage $V_{LEH}$ for the lens unit is supplied ($PWCL_1$="low") and zooming is started toward the shortest focal length (#541). Every time the lens status data ICPL is inputted from the lens unit (#542 to #546), whether or not the zooming is stopped is determined (#547). If is determined that the lens has reached the wide end and the zooming is completed, the application of the high voltage $V_{LEH}$ for the lens unit is stopped ($PWCL_1$="high"), and the zooming is stopped (#548). If the lens is not of the type II or if it is not the EXZM (Exposure During Zooming), then the program skips the steps #536 to #548 (exposure during zooming) and proceeds to #551.

In #551 to #556, the data for flash light amount control (Sv-Kc) (Kc is correction data$\geq 0$) are transmitted to the light measuring interface LMIF, the number of steps of stopping down (Av-Av0) is preset in a counter to permit counter interruption. The port $P_{18}$ is set to "high" so that the encoder ENC is ready to output pulses corresponding to the amount of stopping down operation. Thereafter, the release magnet RLMg (=$Mg_1$) is operated to start stopping down operation. When the expected amount of stopping down is done, a counter interruption is generated, and the process of counter interruption is carried out.

Figure 26:
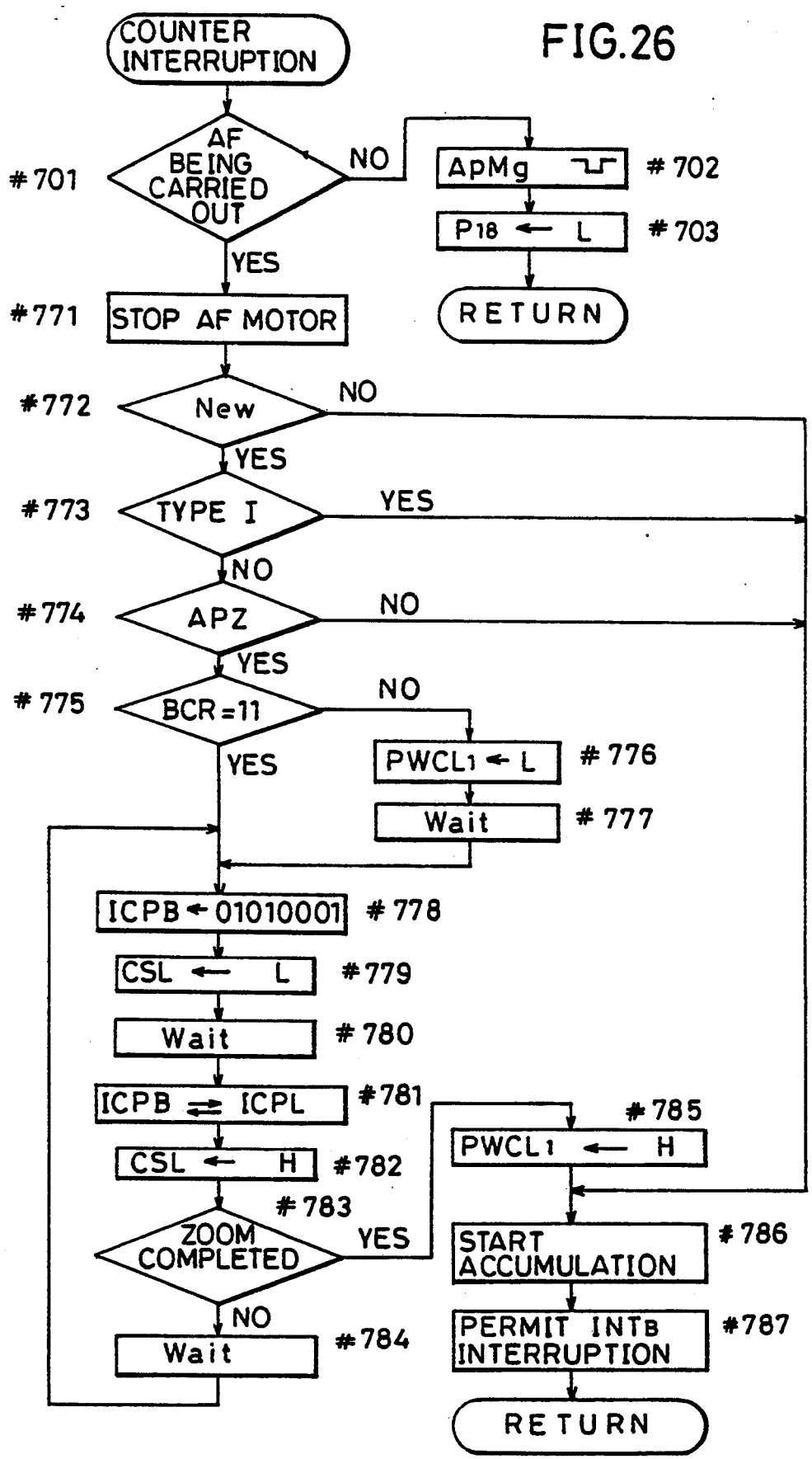

The counter interruption will be described in the following with reference to FIG. 26. If this interruption is generated, whether or not the AF operation is being carried out is determined (#701). If AF is being carried out, then pulses corresponding to the number of rotation of the AF motor $MO_2$ are outputted from the encoder ENC. It is assumed that the interruption is generated by the counting up of the pulses, the AF motor stopping process starting from the step #771 is carried out. If the AF operation is non being carried out, then pulses corresponding to the amount of stopping down by the stopping lever 11 are outputted from the encoder ENC. The interruption is generated by the counting up of the pulses, the process for stopping the stopping down starting from the step #702 is carried out. In #702, a stopping down magnet ApMg (=$Mg_2$) is operated. In #703, the port $P_{18}$ is set to the "low" level to permit output of pulses corresponding to the number of rotation of the AF motor $MO_2$ from the encoder ENC, and the program returns to the main flow.

When a lapse of a prescribed time period from the turning ON of the release magnet $Mg_1$ and a time period required for mirror up has passed, then the magnet 1 CMg (=$Mg_3$) for starting running of the preceding shutter curtain is operated to start running of the preceding shutter curtain (#556, #557). Thereafter, whether or not the lens unit is of the type II is determined (#558). If the lens unit is of the type II, then whether or not it is EZM (Exposure During Zooming) is determined (#559). If the lens unit is not of the type II or if it is not EZM (Exposure During Zooming), then the exposure time is counted. At the end of counting, a magnet. 2 CMg (=$Mg_4$) for starting running of the trailing shutter curtain is operated to start running of the trailing shutter curtain, LEN is set to the "high" level, and the program returns to the main flow (#566, #567, #568). If the flash is to be used, the flash emission is started when a synchro switch Sx is turned on during this time period. If the amount of received light by the flash emission reaches an expected amount, the emission of light is stopped.

If the lens unit is of the type II in #558 and it is the EXZM (Exposure During Zooming) in #559, then different times $t_1$, $t_2$ ($t_1 < t_2$) for the photographing operation under flash light and the photographing operation under natural light are counted (#560 to #562). The times $t_1$ and $t_2$ are the time periods for exposing the image which is to be the center. The time $t_1$ corresponds to the time period in which the shutter is fully open and the flash is emitted. The time $t_2$ is the time period required for exposing the image which is to be the center with natural light, and therefore it is longer than $t_1$. After the time lapse of $t_1$ or $t_2$, a high voltage $V_{LEH}$ for the lens unit is supplied ($PWCL_1$="low") to start zooming (#563). Thereafter, in #564, the remaining time ($T-t_1$) or $T-t_2$) is counted in accordance with the equation $Tv = \log_2 (1/T)$. When the counting is completed, the application of the high voltage $V_{LEH}$ for the lens unit is stopped ($PWCL_1$="high") in #565 to stop zooming, and the program proceeds to the process starting from the step #567. Although the direction of zooming is from the wide end to the tele end in this example, the direction may be changed from the tele end to the wide end.

Figure 24A:
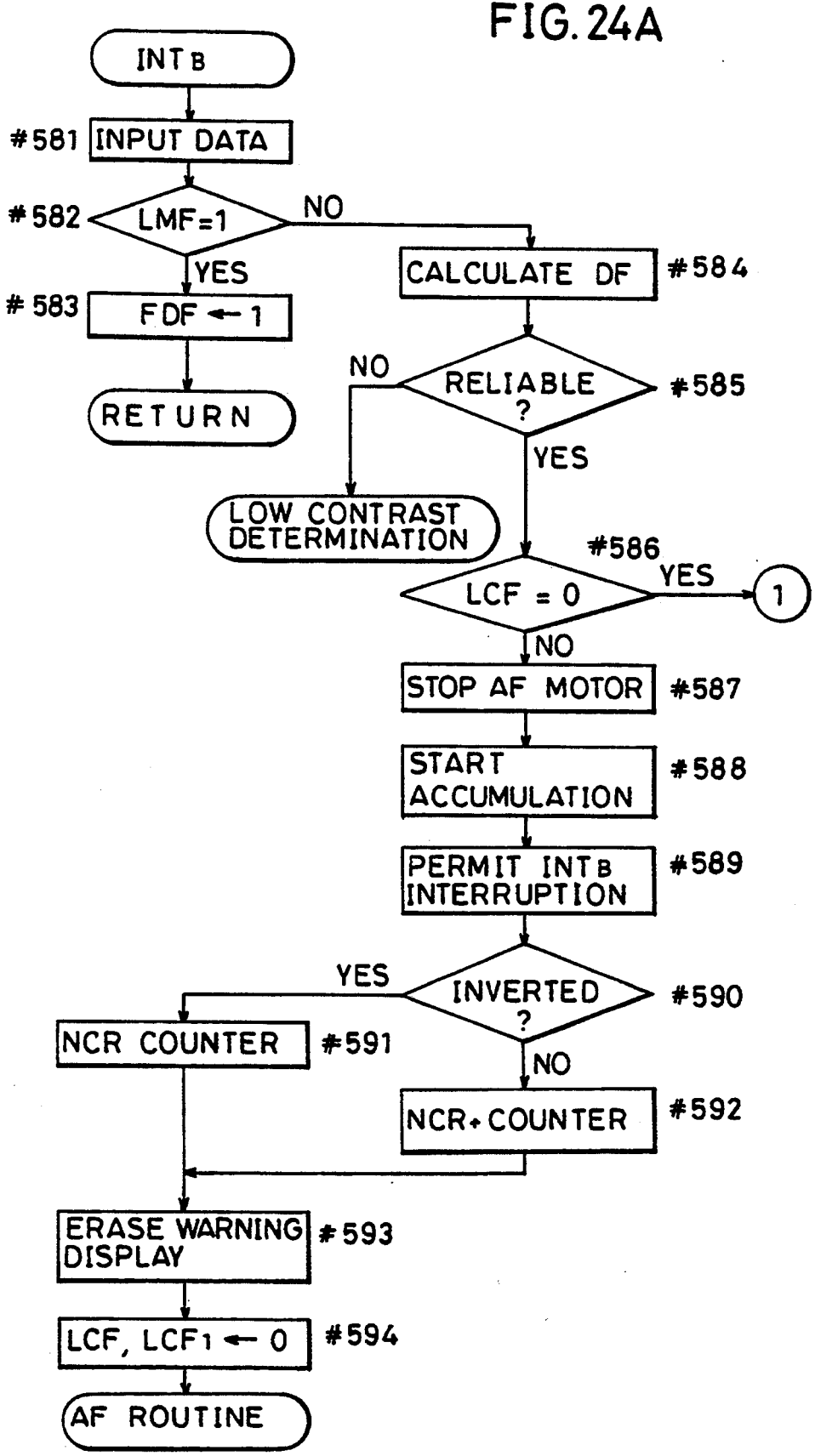
Figure 24B:
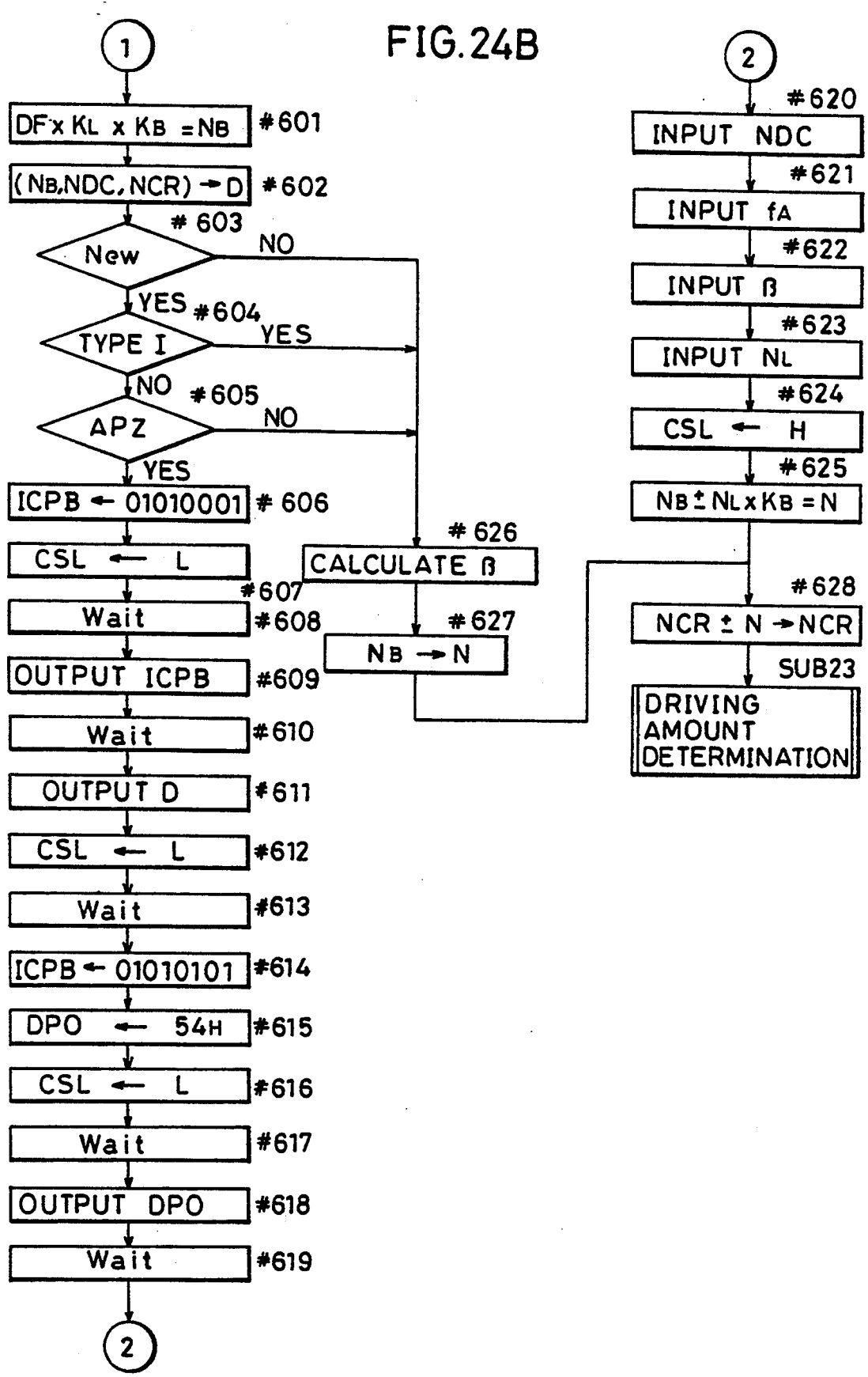

The AF operation will be described in the following. When the charge accumulation of the CCD is completed during the AE routine and an interruption signal is inputted to the interruption terminal $INT_B$, the interrupting process from the step #581 of FIG. 24 is executed. First, data provided by A/D converting the accumulated charges in the CCD are successively taken and whether or not light measuring calculation unfinished LMF is 1 is determined (#581, #582). If LMF=1, it means that the first operation on light measuring, exposure calculation and the displaying have not yet been completed, so that the flag FDF is set to 1, and the program returns to the original address (#583). If LMF is not 1, a defocus amount and a defocus direction are calculated and whether or not they are reliable is checked (#584, #585). If there is reliability, then whether or not there has been reliability in the detections heretofore (LCF=0) is determined (#586). If LCF=0, it means that the first detection or the detections carried out heretofore are reliable, so that the program proceeds to #601.

In #601, calculation of $DF \times K_L \times F_B = N_B$ is carried out to find the number of rotation $N_B$ of the AF motor (pulse number from the encoder) to eliminate the defocus amount DF. In #602, the photographing distance D is calculated based on the number of rotation $N_B$ of the AF motor, the content of the present position register NCR, and the coefficient NDC for converting the number of rotation N from the infinite photographing position into the photographing distance D. Thereafter, whether or not the lens unit employed is a new lens unit is determined (#603). If it is a new lens unit, whether or not the lens unit is of the type I is determined (#604). If the lens unit is not of the type I, it means that the lens unit is capable of APZ (Automatic Program Zooming), so that whether or not it is the APZ mode is checked (#605). If the lens unit is not the new lens unit or it is a lens unit incapable of the APZ (Automatic Programming of Zooming) or if it is not the APZ mode, the program proceeds from the step #603, #604 or #605, #626 to calculate the photographing magnification rate $\beta$. In #627, the number of rotation $N_B$ of the motor for eliminating the defocus DF is substituted for the number of rotation N. In #628, the number of rotation N is added to or subtracted from the content of the present position register NCR in accordance with the sign thereof, and the program proceeds to the driving amount determining routine (SUB23).

If the APZ (Automatic Programming of Zooming) is to be carried out by employing a new lens unit of the type II or III, the body status data ICPB indicative of the AF operation in the body and of the body data output, and the photographing distance D are transmitted to the lens unit (#610, #612). After a Eyrescribed time period, the body status data ICPB indicating that the body is carrying out the AF operation and the lens data input, and the data pointer DPO=$54_H$ designating that 4 bytes of lens data starting from the fifth address AD5 is to be inputted are transmitted to the lens unit, and the program waits for a prescribed time period (#613 to #619). During this time period, the photographing magnification rate $\beta$ corresponding to the photographing distance D and the focal length $f_A$ for zooming are found in the lens unit in the case of $APZ_1$ to $APZ_3$. If it is MLM (Magnification Rate Lock Mode), the focal length $f_A$ for zooming is calculated based on the set magnification rate $\beta_L$ and the photographing distance D. Further, the conversion coefficient NDC corresponding to the focal length $f_A$ is calculated, and in case of a varifocal lens (type III), the offset amount $N_L$ is calculated based on the focal length f at that time point, the focal length $f_A$ for zooming and the photographing distance D. In #620 to #628, the conversion coefficient NDC ($f_A$), the focal length $f_A$ for zooming, the photographing magnification rate $\beta$ and the offset amount $N_L$ are inputted. In #625, $N_B \pm N_L \times K_B = N$ is calculated, so as to find the number of rotation N required for realizing the in-focus position when zooming is carried out by APZ (Automatic Programming of Zooming) using a varifocal lens.

Figure 25:
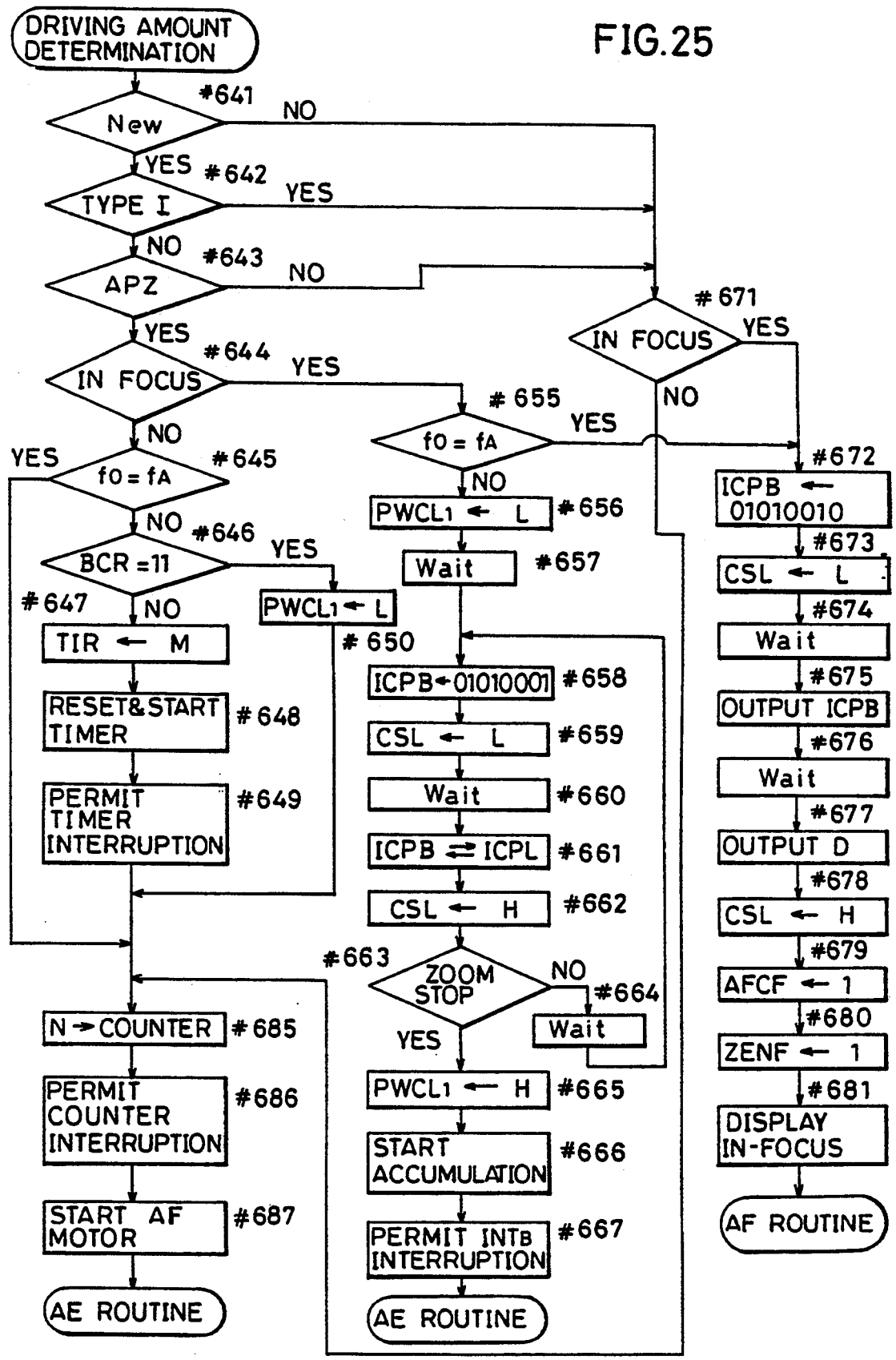

The driving amount determining routine (SUB23) will be described in the following with reference to FIG. 25. In this subroutine, whether or not the lens unit is a new lens unit is determined (#641). If it is a new lens unit, then whether or not the lens unit is of the type I is determined (#642). If it is not of the type I, it means that the lens unit is capable of the APZ (Automatic Programming of Zooming), so that whether or not it is APZ mode is determined (#643). If the lens unit is not the new lens unit, if the lens unit is incapable of APZ (Automatic Programming of Zooming) (type I), or if it is not the APZ mode, then the program proceeds from the step #641, #642 or #643 to #671 where the in-focus determination is carried out. Meanwhile, if the APZ (Automatic Programming of Zooming) is to be carried out by using a new lens unit of the type II or III, the program proceeds to #644 to carry out the in-focus determination.

If it is not the in-focus state in #671, then the number of rotation N is preset in the counter, a counter interruption is permitted, the AF motor $MO_2$ is driven in the driving direction and the program proceeds to AE routine (#685 to #687). If it is in the in-focus state in #671, then the body status data ICPB=01010010 indicating exposure calculation, body data output, power zoom and non-AF operation is transmitted to the lens. Thereafter, the photographing distance D is transmitted to the lens unit. The flags AFCF and ZENF are set to 1, the in-focus display is provided, and then the program proceeds to AE routine (#672 to #681).

If it is in the in-focus state in #644, whether the present focal length $f_0$ is equal to the calculated focal length $f_A$ is determined (#655). If $f_0 = f_A$, it means that APZ (Automatic Programming of Zooming) has been completed, and therefore it is regarded that the in-focus state is realized, and then the program proceeds to the process starting from the step #672. If $f_0$ is not equal to $f_A$ in #655, then a high voltage $V_{LEH}$ for the lens unit is supplied so as to carry out zooming ($PWCL_1$="low"). The body status data ICPB indicating the AF operation is being carried out and the body data output is to be provided is transmitted to the lens unit, and at the same time, the lens status data ICPL is inputted by the bidirectional lens-body status communication (#656 to ##662).

In #663, whether or not the zooming is stopped is determined. If the zooming is not stopped, the program waits for a prescribed time period in #664 and then the program returns to #658. Meanwhile, if the zooming is stopped in #663, then the application of the high voltage $V_{LEH}$ for the lens unit is stopped ($PWCL_1$="high"). The charge accumulation of the CCD is started so as to carry out focus detection and AF operation for confirmation, an interruption by the interruption terminal $INT_B$ is permitted, and the program proceeds to the AE routine (#665 to #667). The AF operation for confirmation is necessary from the following reason. In calculating the offset amount $N_L$ in the lens unit, the present focal length $f_0$ and the calculated focal length $f_A$ are used. However, these are not continuous values but discrete values corresponding to the resolution of the coding plate. Since highly precise calculation of the offset amount $N_L$ is impossible. Therefore, the $A_F$ operation is carried out for confirmation.

If it is not in the in-focus state in #644, then whether or not $f_0$ is equal to $f_A$ is determined in #645. If $f_0 = f_A$, the program proceeds to #685. Meanwhile, if $f_0$ is not equal to $f_A$, then whether or not the content of the battery check register is BCR=11 is checked (#646). If BCR=11, it means that AF motor MO$_2$ and the zooming motor MO$_3$ can be simultaneously driven, so that a high voltage V$_{LEH}$ for the lens unit is supplied (PWCL$_1$="low") in #650 and the program proceeds to #685. If BCR is not 11, then a prescribed value M is set in a timer register TIR in order to alternately drive AF motor MO$_2$ and the zoom motor MO$_3$ by prescribed time unit. The timer is reset and started, a timer interruption is permitted and the program proceeds to #685 in which the AF motor MO$_2$ is driven (#647 to #649).

Returning to the flow of FIG. 24, if it is determined that the results of focus detection which have been carried out are not reliable (LCF=1) in #586, there is a high possibility of low contrast scanning having been carried out. Therefore, AF motor MO$_2$ is stopped, charge accumulation of the CCD is started so as to carry out the measurement again, and an interruption by the interruption terminal INT$_B$ is permitted (#587 to #589). Whether or not the scanning direction is inverted is determined. If the scanning direction is inverted, then the content of the counter is subtracted from the present position register NCR monitoring the pulses from the encoder ENC. If the scanning direction is not inverted, then the content of the counter is added thereto (#590 to #592). Thereafter, the warning display indicative of the impossibility of focus detection is erased, the flags LCF and LCF$_1$ are set to 0, and the program proceeds to the AE routine (#593, #594).

Figure 27:
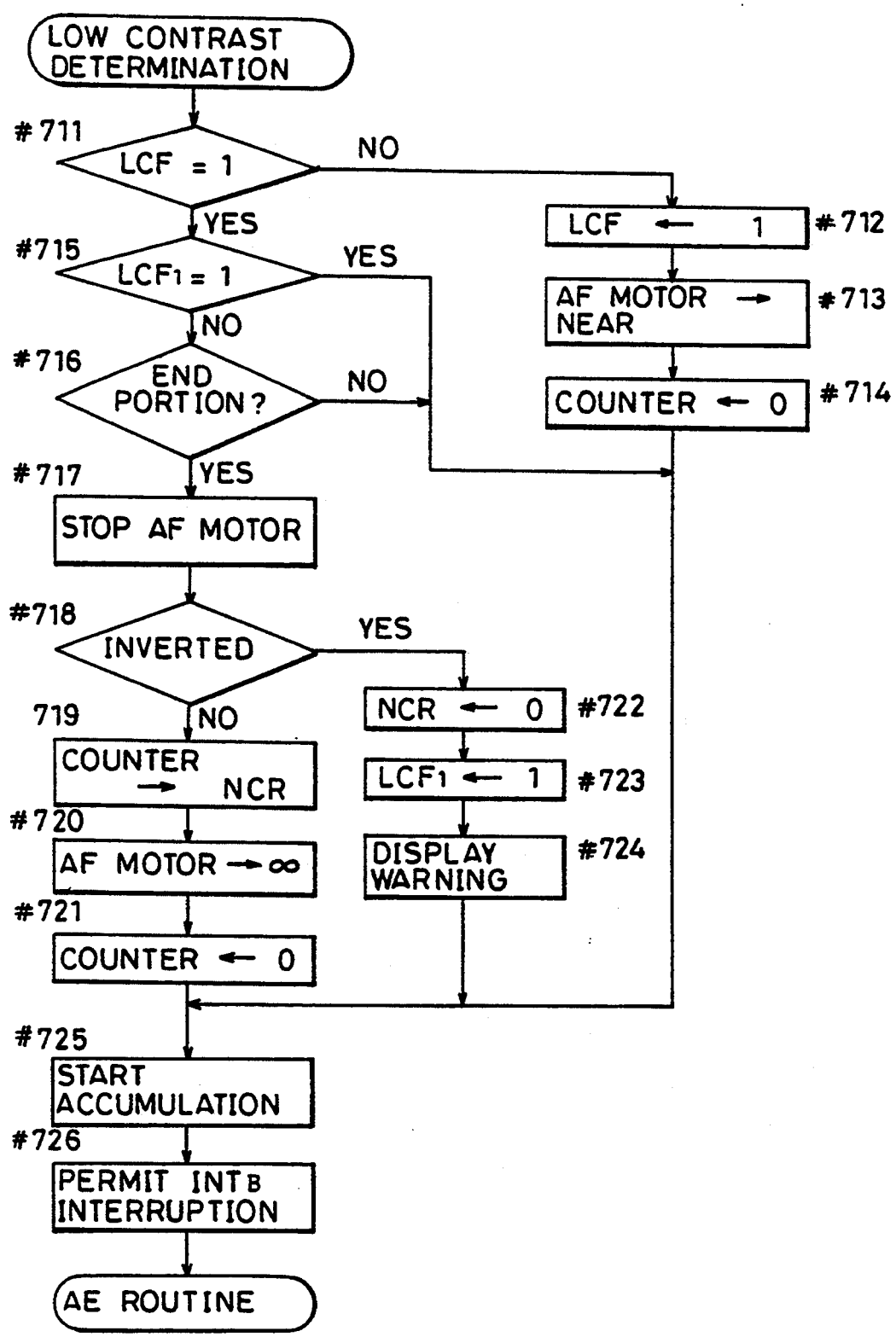

Meanwhile if it is determined that the result of focus detection is not reliable in #585, then the low contrast determination from the step #711 shown in FIG. 27 is carried out. At first, whether or not the low contrast flag LCF is 1 is checked (#711). If the LCF is not 1 in #711, it means that the unreliability is determined for the first time here, so that in #712 to #714 the flag LCF is set to 1, the AF motor MO$_2$ is driven in a direction in which the lens moves to the closest photographing position, the content of the counter is reset to 0 and the program proceeds to #725. If the LCF is 1 in #711, then whether or not the entire range low contrast flag LCF$_1$ is 1 is determined (#715). If the LCF$_1$ is not 1, it means that the low contrast scanning is being carried out, and whether or not the focusing lens is at the closest photographing position is determined (#716). If the LCF$_1$=1 in #715 or if the focusing lens is not at the closest photographing position in #716, then the program proceeds to #725. If it is the edge in #716, then AF motor MO$_2$is stopped, and whether or not the scanning direction has been inverted is determined (#717, #718). If the scanning direction has not yet been inverted, then in #719 to #721 the content of the counter is set in the NCR, the AF motor MO$_2$ is driven to the infinite photographing position, the counter is reset to 0 and the program proceeds to #725. If the scanning direction has been inverted in #718, it means that the focusing lens reaches the infinite photographing position with the focus detection being impossible, so that in #722 to #724 the present position register NCR is set to 0, the entire range low contrast flag LCF$_1$ is set to 1, the warning display is turned ON, and the program proceeds to #725. In #725, the charge accumulation of the CCD is started for the re-measurement. An interruption to the interruption terminal INT$_B$ incidental to the completion of accumulation is permitted in #726, and the program returns to the AE routine.

Figure 28:
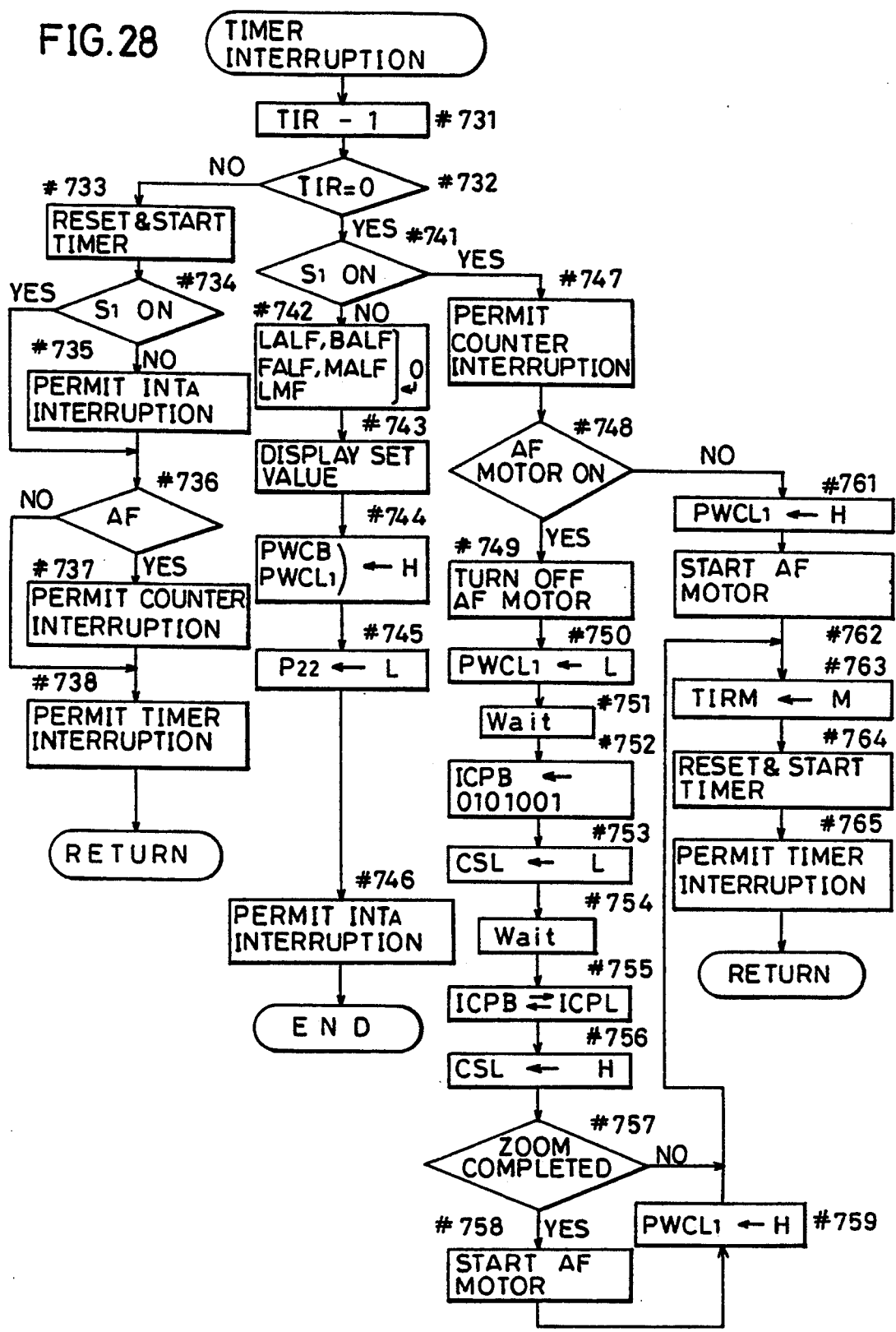

The flow of timer interruption will be described in the following with reference to FIG. 28. A timer is used as a first timer for measuring a prescribed time period after turning OFF of the preparatory switch S$_1$ and at a second timer for measuring a prescribed time period during AF operation. When a timer interruption is generated, the content of the timer register TIR is decremented by 1, and whether or not TIR=0 is determined (#731, #732). If TIR is not 0, it means that the expected time period has not yet passed, so that the timer is reset and started (#733). If the timer is used as the first timer, the INT$_A$ interruption is permitted (#734, #735). If the timer is used as the second timer, a counter interruption is permitted (#736, #737). A timer interruption is permitted, and the program returns to the main flow (#738).

When the content of the timer register reaches TIR=0 in #732, then whether or not the preparatory switch S$_1$ is ON is determined (#741). If the timer is used as the first timer, then the respective flags LALF, BALF, FALF, MALF and LMF are reset, and only the set values are displayed. The boosting circuit DD$_1$ in the body is stopped (PWCB="high") and the application of the high voltage V$_{LEH}$ for the lens unit is stopped (PWCL$_1$="high"). The port P$_{22}$ is set to "low" level, interruption by the interruption terminal INT$_A$ is permitted, and the operation is terminated (#742 to #746). Meanwhile, if the preparatory switch S$_1$ is ON in #741, the timer is used as the second timer, and the switching between AF motor MO$_2$ and the zooming motor MO$_3$ is carried out. The counter interruption is permitted in #747, and whether or not the AF motor MO$_2$ is ON is determined in #748. If AF motor MO$_2$ is ON, then the motor is turned OFF. The high voltage V$_{LEH}$ for the lens unit is supplied (PWCL$_1$="low") to start zooming (#749, #759). Thereafter, the lens status data ICPL is read by the bidirectional lens-body status communication in #751 to #756, and whether or not the zooming has been completed is determined in #757. If the zooming has been completed, then the driving of the AF motor MO$_2$ is started in #758. The application of the high voltage V$_{LEH}$ for the lens unit is stopped (PWCL$_1$="high") in #759, and the program proceeds to the process starting from the step #763. If the zooming has not yet been completed, the program skips the steps #758 and #759 and proceeds to the process starting from the step #763. Meanwhile, if the AF motor MO$_2$ is OFF in #748, the application of the high voltage V$_{LEH}$ for the lens unit is stopped (PWCL$_1$="high"), and the driving of AF motor MO$_2$ is started. The TIRM is set to M, the timer is reset and started, a timer interruption is permitted, and the program returns to the main flow (#761 to #765).

A counter interruption routine will be described in the following with reference to FIG. 26. If the counter interruption is generated, then whether or not the AF operation is being carried out is determined at first (#701). The operation carried out when the AF operation is not being carried out in the step #701 (stopping down stopping operation) is as described above. If the AF operation is being carried out in #701, it means that the focusing lens has been moved by a desired amount of driving, so that the AF motor MO$_2$ is stopped (#771). Thereafter, whether or not the lens unit is the new lens unit is determined (#772). If it is a new lens unit, then whether or not the lens unit is of the type I is determined (#773). If the lens unit is not the type I lens, it means that the lens unit is capable of the APZ (Automatic Programming of Zooming), so that whether or not it is the APZ mode is determined (#774). If it is an conventional lens, if it is a lens incapable of APZ (Automatic Programming of Zooming) (type I) or if it is not the APZ mode, then the program proceeds from #772, #773 or #774 to #786. Charge accumulation of the CCD is started, an interruption to the interruption terminal $INT_B$ incidental to the completion of accumulation is permitted in #787 and the program returns to the AE routine.

Meanwhile, if APZ (Automatic Programming of Zooming) is to be carried out by using a new lens unit of the type II or III, then whether or not the BCR=11 is determined (#775). If BCR is not 11 in #775, then a high voltage $V_{LEH}$ for the lens unit is supplied ($PWCL_1$="low") in #776 to start zooming, the program waits for a prescribed time period in #777 and then the program proceeds to #778. Meanwhile, if BCR=11, it means that the AF motor $MO_2$ and the zooming motor $MO_3$ can be simultaneously driven, and the program directly proceeds to #778. In #778 to #782, the lens status data ICPL is inputted by the bidirectional lens-body status communication, and in #783, whether or not the zooming is completed is determined. If the zooming is not completed in #783, then program waits for a prescribed time period in #784, and then returns to #778. If the zooming is completed in #783, then the application of the high voltage $V_{LEH}$ for the lens unit is stopped in #785 ($PWCL_1$="high"). The charge accumulation of the CCD is started in #786 so as to carry out focus detection for confirmation, an interruption to the interruption terminal $INT_B$ incidental to the completion of accumulation is permitted in #787, and the program returns to the AE routine.

Figure 30:
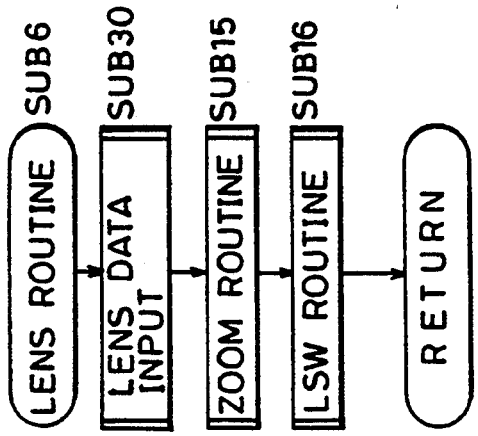
Figure 29:
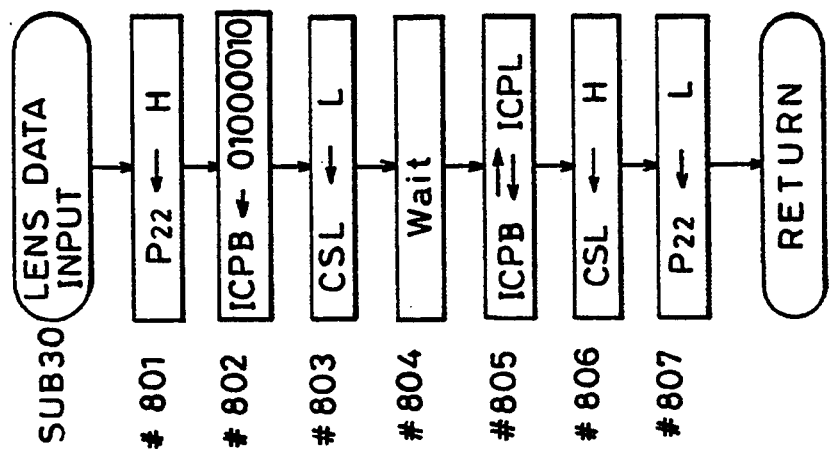

The lens routine (SUB6) will be described in the following with reference to FIG. 30. In this subroutine, the lens data input routine (SUB30), the zoom routine (SUB15) and the lens switch routine (SUB16) are called in this order. The lens data input subroutine (SUB30) will be described with reference to FIG. 29. In this subroutine, the port $P_{22}$ is set to "high" level so as to use bidirectional signal line LBL at a signal transmitting line from the body to the lens unit (#801). A body status data ICPB indicating that the body is in the non-operating state, zooming is possible and that the body data is to be outputted is set, and the body status data ICPB is transmitted to the lens unit by the bidirectional lens-body status communication. At the same time, the lens status data ICPL is inputted from the lens unit, the port $P_{22}$ is returned to the "low" level, and the program returns to the main flow (#802 to #807).

Figure 31:
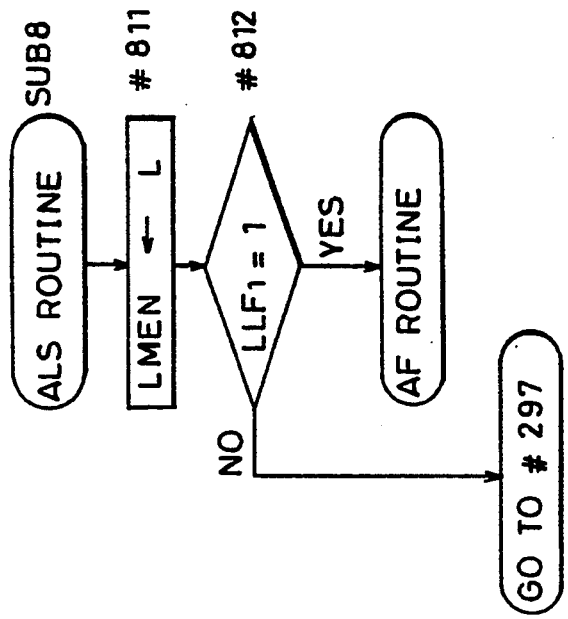

A subroutine (SUB8) based on an activation by the turning ON of the AE lock switch ALS will be described with reference to FIG. 31. In this subroutine, the light measuring enable signal LMEN is set to the "low" level at first, and thereafter whether or not a dedicated AF lens is attached is determined by checking the AF lens attachment flag $LLF_1$ (#811, #812). If a dedicated AF lens is attached, then the flow proceeds to the AE routine, and otherwise it proceeds to #297 (FIG. 14).

Figure 32:
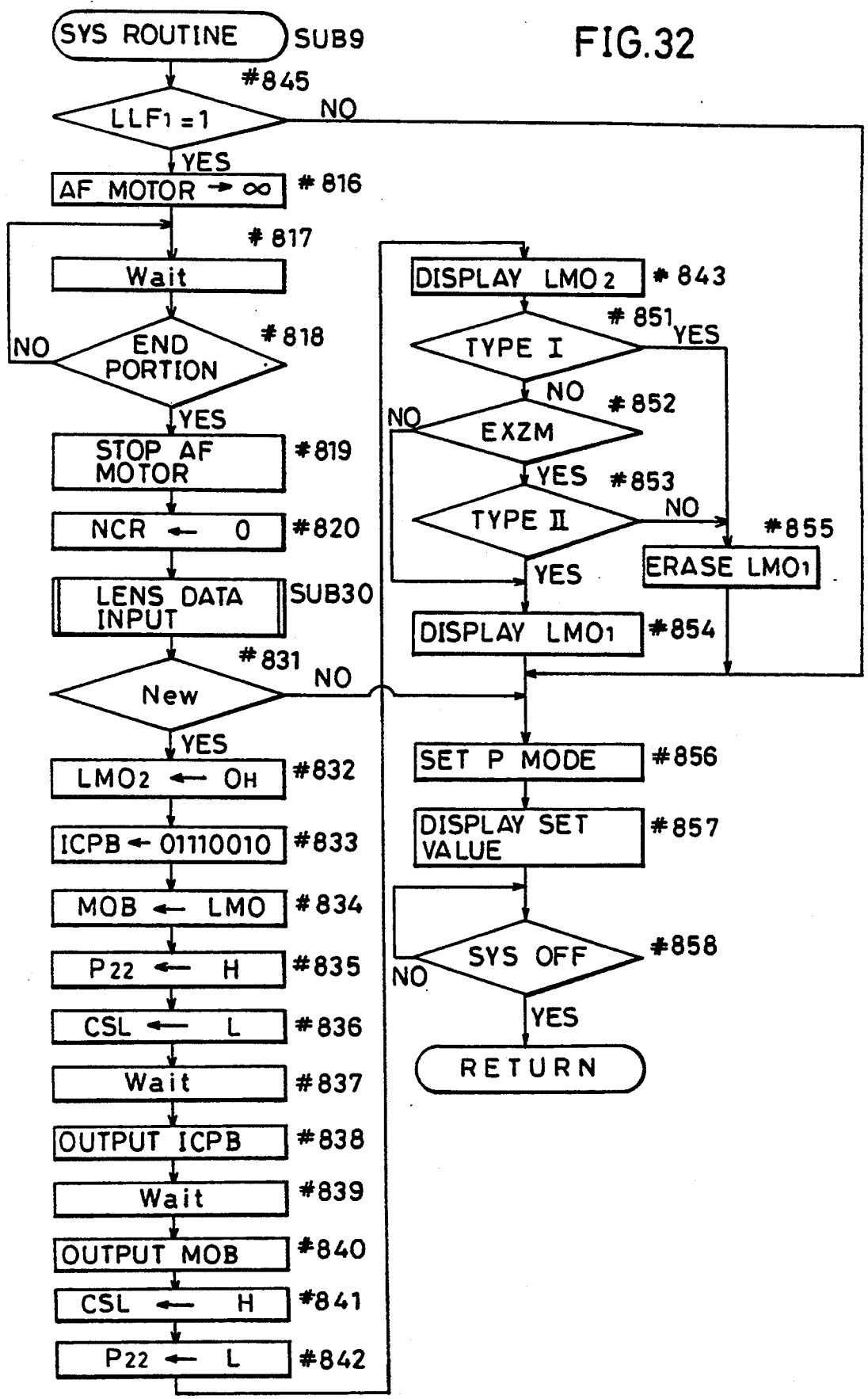

An SYS routine (SUB9) which is called when the system reset key 4 is pressed will be described with reference to FIG. 32. When this subroutine is called, whether or not a dedicated AF lens is attached is determined by checking the AF lens attachment flag $LLF_1$ (#845). If the $LLF_1$ is not 1, it means that the dedicated AF lens is non attached, so that the program proceeds to #856. Meanwhile, if $LLF_1=1$, it means that a dedicated AF lens is attached, so that the focusing lens is moved rearward to the infinite photographing position (#816 to #819). More specifically, the focusing lens is driven to the infinite position, the time lapse of a prescribed time period is waited, and whether or not the lens position is the edge is determined, which operation is repeated. If it is determined that the lens position is the edge, the AF motor $MO_2$ is stopped. When the focusing lens is moved rearward and reached the infinite position, then the present position register NCR is set to 0 in #820 and a lens data input routine (SUB30) is executed. Whether or not the attached lens unit is a new lens unit is determined (#831). If it is not a new lens unit, the program proceeds to #856. If it is a new lens unit, then the lens switch mode $LMO_2$ is set to $0_H$ so as to inactivate the functions settable by the lens switch (#832). Data 01110010 indicating that the system reset, body data output and power zoom possibility are set as the body status data ICPB (#833). The lens mode $LMO_1$ and the lens switch mode $LMO_2$ are set in the mode buffer MOB (#834). In #835 to #842, the set body status data ICPB and the content of the mode buffer MOB are transmitted to the lens unit. In #843, the lens switch mode $LMO_2$ is displayed. Since the function by the lens switch is inactivated here, the display of the lens switch mode $LMO_2$ is erased.

In #851, whether or not the lens unit is of the type I is determined. If the lens unit is of the type I, the program proceeds to #855 in which the display of the lens mode $LMO_1$ is erased. If the lens is not of the type I in #851, then whether or not it is EXZM (exposure During Zooming) is determined in #852. If it is not the EXZM in #852, then the program proceeds to #854 in which the lens mode $LMO_1$ is displayed. If it is the EXZM in #852, whether or not the lens unit is of the type II is determined (#853). If the lens unit is of the type II, then the program proceeds to #854 in which the lens mode $LMO_1$ is displayed. If the lens is not of the type II, then the program proceeds to #855 in which the display of the lens mode $LMO_1$ is erased. In the steps #851 to #854, the display of the lens mode $LMO_1$ corresponding to the types of the lens are provided. After the display of the lens mode $LMO_1$ is given or erased in #854 and #855, the exposure control mode is set to the P mode (program mode) in #856. In #857, the set values are displayed, in #858, the program waits for the turning OFF of the switch SYS corresponding to the system reset key 4, and then the program returns to the main flow.

Figure 33:
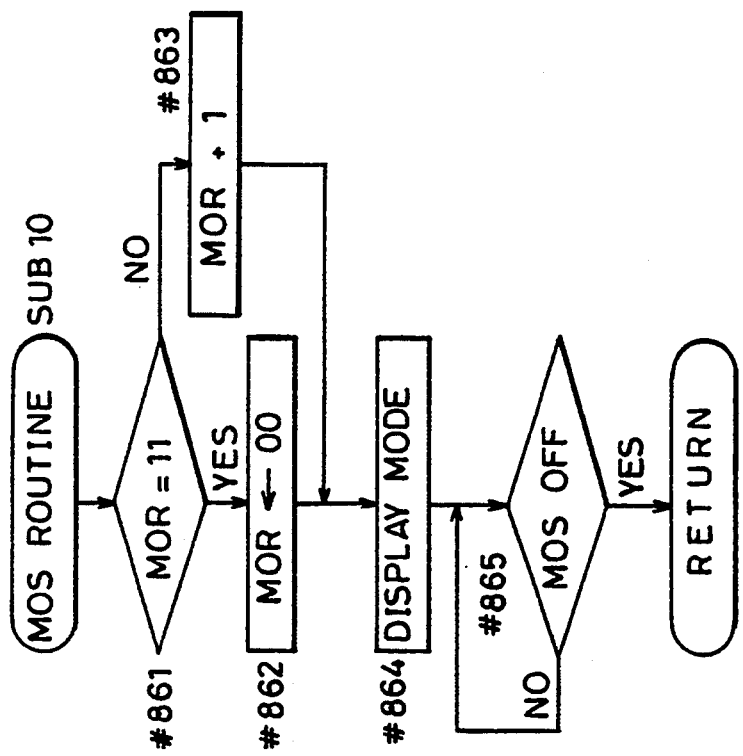

AMOS routine (SUB10) which is called when the mode switch MOS is turned ON by the pressing of the mode key 3 will be described with reference to FIG. 33. In this subroutine, whether or not the mode register MOR is 11 is determined (#861). If MOR=11, the flow proceeds to #862 in which MOR is set to 00. If MOR is not 11, then the program proceeds to #863 in which MOR is set to MOR+1. The mode register MOR is a 2 bit register for selecting four different exposure controlling modes. When MOR is 00, the P mode (program AE mode) is selected; when MOR=01, the S mode (shutter speed priority AE mode) is selected; when MOR=10, A mode (aperture priority AE mode); and when MOR=11, the M mode (manual mode) is selected. Therefore, every time the MOS routine is called, the exposure control mode is switched from the P mode to S mode, from the S mode to A mode, from the A mode to M mode and from the M mode to P mode. In #864, the set mode is displayed, the program is kept in a waiting state until the mode switch MOS is turned OFF in #865, and the program returns to the main flow.

Figure 34:
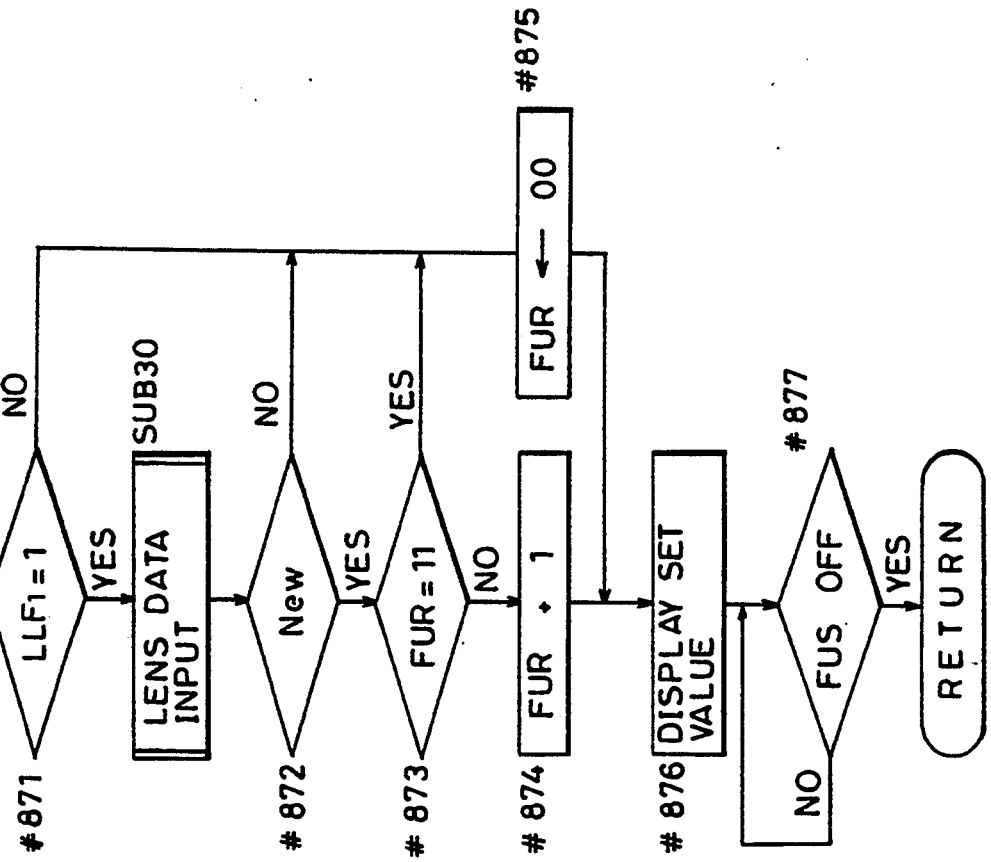

An FUS routine (SUB11) which is called when a function switch FUS is turned ON by the pressing of the function key 2 will be described with reference to FIG. 34. In this subroutine, whether or not a dedicated AF lens is attached is determined by checking the AF lens attachment flag $LLF_1$ (#871). If $LLF_1$ is not 1, it means that the dedicated AF lens is not attached, so that the program proceeds to #875 in which the function register FUR is set to 00 to inactivate the function. If $LLF_1=1$ in #871, it means that a dedicated AF lens is attached, so that the subroutine of the lens data input (SUB30) is executed and whether or not the lens unit is a new lens unit is determined (#872) if it is not a new lens unit, the program proceeds to #875 to inactivate the function, and if it is a new lens unit, then whether or not FUR is 11 is determined in #873. If FUR=11, then the program proceeds to #875. If FUR is not 11, the program proceeds to #874 in which 1 is added to the content of the function register FUR. The function register FUR is a 2 bit register for selecting four different functions. When FUR is 00, the function is inactive; when FUR=01, the ALM (AE lock mode) is selected; when FUR=10, the RLPM (Release Priority Mode) is selected; and when FUR=11, the AVSM (Aperture Value Setting Mode) is selected. Therefore, every time the FUS routine is called, the function is changed from inactive to ALM, ALM to RLPM, RLPM to AVSM and from AVSM to inactive. In #876, the set content of the function is displayed, the program is kept in a waiting state in #877 until the function switch FUS is turned OFF, and then the program returns to the main flow.

Figure 35:
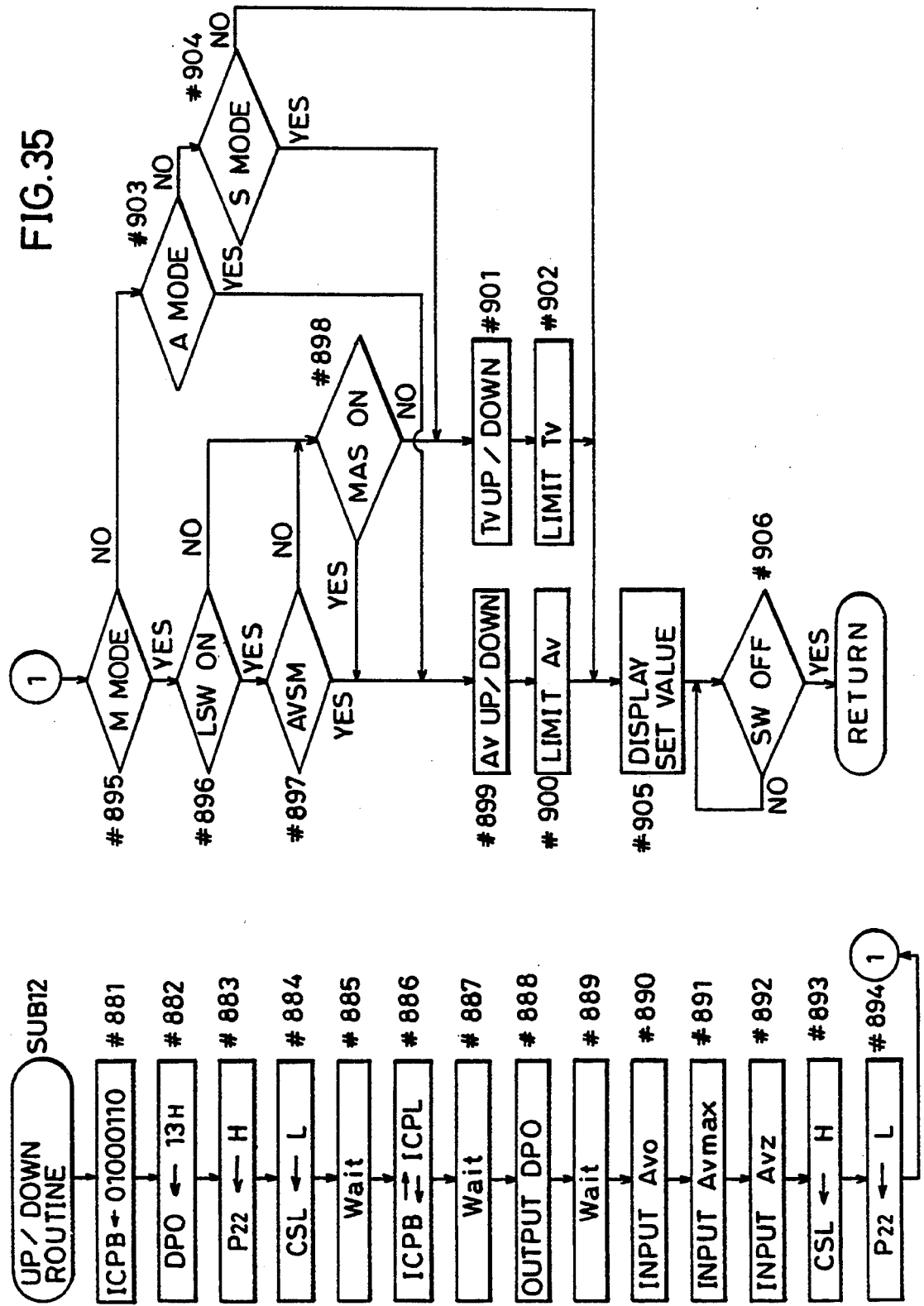

An UP/DOWN routine (SUB12) which is called by an operation of up/down lever 7 will be described in the following with reference to FIG. 35. First, data 01000110 indicating that the body is non-operative and the lens data input is to be carried out are set in the body status data ICPB, and $13_H$ is set in the data pointer DP0 (#881, #882). The content of the data pointer DPO, that is $13_H$, means that 3 bytes of lens data from the first address AD1 are to be inputted. In #883 to #888, the set body status data ICPB and the data pointer DPO are transmitted to the lens unit. In #889 to #894, various lens data such as the full open aperture value Av0, the maximum aperture value Avmax and the deviation of aperture value ΔAvz are inputted from the lens unit.

Thereafter, whether or not the exposure control mode is M mode (manual mode) is determined (#895). If it is the M mode, then whether or not the lens switch is ON is determined (#896). If the lens switch is ON, then whether or not it is AVSM (Aperture Value Setting Mode) is determined (#897). If the lens switch is not ON in #896 or if it is not AVSM in #897, then whether or not the manual Av switch MAS is ON is determined (#898). If it is the AVSM in #897 or if the manual Av switch MAS is ON in #898, then the aperture value Av is increased or decreased by 0.5 Ev, and the said aperture value Av is limited in accordance with the data from the lens unit (#899, #900). If the lens switch is OFF and the manual Av switch MAS is also OFF or even if the lens switch is ON, when the manual Av switch MAS is OFF and it is not AVSM (Aperture Value Setting Mode), then the shutter speed Tv is increased or decreased by 1 Ev (#901). The shutter speed Tv is also limited by the minimum and maximum shutter speed (#902).

If it is not the M mode (Manual mode) in #895, then whether or not it is the A mode (Aperture Priority AE mode) is determined (#903). If it is the A mode, then the aperture value Av is increased or decreased (#899, #900). If it is not the A mode, then whether or not it is the S mode (shutter speed priority AE mode) is determined (#904). If it is the S mode, then the shutter speed Tv is increased or decreased (#901, #902). If it is not the S mode, it means that it is the P mode (Program mode), and the program proceeds to #905. Also in the cases of M mode, A mode and S mode, the flow proceeds from #900 or #902 to #905 in which set values are displayed. If the up switch UPS and the down switch DOS are both OFF in #906, then the program returns to the main flow.

Figure 36:
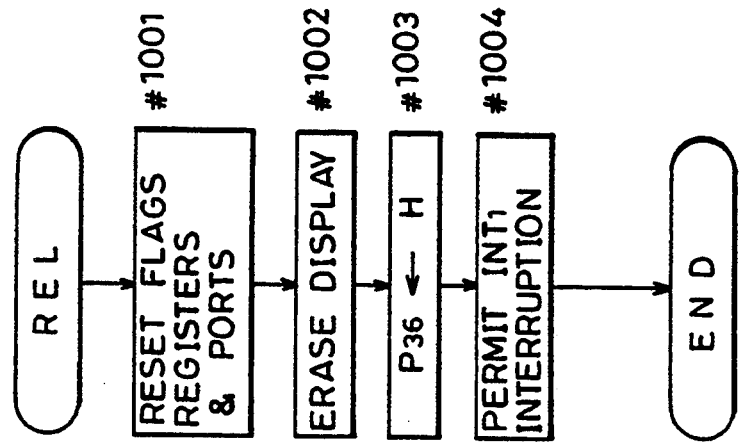

The operation of the microcomputer CPUL in the varifocal lens will be described in the following. When the lens unit is attached to the body, a low voltage $V_{LEL}$ for the lens unit is supplied and a "low" level reset signal is inputted to the reset terminal REL of the microcomputer CPUL in the lens unit, then the resetting operation shown in FIG. 36 is carried out. First, the flags, registers and ports are reset in #1001. Displays are erased in #1002, and the port $P_{36}$ is set to the "high" level in #1003 to permit input of a lens select signal CSL from the body. An $INT_1$ interruption generated when the signal SCL attains the "low" level is permitted, and the operation is stopped to be ready for the above described lens communication.

When any one of the switches LMS, LES, TeS, WiS of the lens unit is turned ON, then an interruption by the interruption terminal $INT_0$ is generated. The interruption routine will be described with reference to FIG. 37. First, whether or not the lens switch LES is ON is determined (#1011). If the lens switch LES is ON then whether or not it is power zooming is determined (#1012). If it is the power zooming, then whether or not it is MLM (Magnification Lock Mode) is determined (#1013). If it is the MLM, then whether or not the flag $LSF_0$ is 1 is determined (#1014). The flag $LSF_0$ is to determine whether or not the lens switch LES has been ON. If $LSF_0=1$, it means that the lens switch LES has been ON, so that the program proceeds to a stopping routine. If $LSF_0$ is not 1, it means that the switch LES is turned from OFF to ON, so that the $LSF_0$ is set to 1 (#1015). Thereafter, whether or not the lens switch flag LSF is 1 is determined (#1016). When LSF=1, it means that the lens switch is in a set state, and if LSF=0, it means that the lens switch is in the reset state. If LSF is not 1 in #1016, then LSF is set to 1 in #1017, and the program proceeds to the stopping routine. Consequently, the set state of the lens switch is stored. If LSF=1 in #1016, it means that the lens switch LES has been turned OFF to ON in that mode and that the lens switch is in the set state. Therefore, LSF is set to 0 and MLF is also set to 0, a display of the locked magnification rate $\beta_L$ is erased (#1018 to #1020), and the program proceeds to the stopping routine. Consequently, the reset state of the lens switch is stored.

If it is not the MLM (Magnification Rate Lock Mode) in #1013, then whether or not it is the WIM (Wide Mode) is determined (#1025). If it is not the WIM, then whether or not it is ALM (AE Lock Mode) is determined (#1026). If the lens is not set to PZOOM (Power Zoom) in #1012, it means that the manual zooming is selected, so that the determination of the modes, that is, whether MLM or WIM is selected (#1013, #1025) is omitted, and whether or not it is the ALM (AE Lock Mode) is determined (#1026). If it is not the ALM, the program proceeds to the stopping routine. If it is determined that WIM is set in #1025 or if it is determined that the ALM is set in #1026, then whether or not the flag $LSF_0$ is 1 is determined in #1027. If $LSF_0$ is 1, it means that the lens switch LES has been ON, so that the program proceeds to the stopping routine. If the $LSF_0$ is not 1, it means that the lens switch LES is turned from OFF to ON, so that $LSF_0$ is set to 1 in #1028. The state of the lens switch flag LSF is checked in #1029. If LSF=1, then LSF is set to 0 in #1031. If LSF is not 1, then it is set to 1 in #1030. Namely, every time the state of the lens switch LES changes from ON to OFF, the lens switch is alternately switched between the set state and the reset state. Thereafter, whether or not the body is non-operable is determined in #1032. If the body is not operating, then an activating signal is transmitted to the interruption terminal $INT_A$ of the microcomputer CPUB in the body through the bidirectional signal line LBL by setting the ports $P_{36}$ and $P_{35}$ to "low" level for a prescribed time period, in order to provide information from the lens unit to the body. Thereafter, the ports $P_{35}$ and $P_{36}$ are returned to "high" level (#1033 to #1037). If the body is not non-operable in #1032, the information can be transmitted in the next signal communication, so that the program proceeds to the stopping routine.

If the lens switch LES is not ON in #1011, then whether or not the tele switch or the wide switch is ON is determined (#1041, #1042). If either one of the switches is ON, then whether or not the lens unit is set to PZOOM (Power Zoom) is determined (#1043). If it is set to PZOOM (Power Zoom), then the program proceeds to #1032 to carry out the above described operation. If the tele switch TeS and the wide switch WiS are both OFF or when the lens is not set to PZOOM (Power Zoom) even if one of the switches is ON, then the program proceeds to #1044, in which whether or not the lens mode switch LMS is ON is determined. If the lens mode switch LMS is ON, whether or not the flag $LSF_1$ is 1 is determined (#1045). The flag $LSF_1$ is 1 when the lens mode switch LMS has been ON, and it is 0 when the lens mode switch has been OFF. If $LSF_1=1$ in #1045, it means that the lens mode switch LMS has been ON, so that the program proceeds to the stopping routine. If $LSF_1=0$ in #1045, it means that the lens mode switch LMS is turned from OFF to ON, so that $LSF_1$ is set to 1 in #1046, and whether or not it is APZ (Automatic Programming of Zooming) is determined in #1047. If it is not the APZ, then the program proceeds to the stopping routine. If it is the APZ, then flags $LSF_0$, LSF and MLF are reset to 0 and the locked magnification rate $\beta_L$ is erased (#1048 to #1051). The reason for this is that the mode may possibly be changed in the APZ (Automatic Programming of Zooming) while the magnification is in a locked state in the MLM (Magnification Rate Lock Mode).

Thereafter, whether or not the content of an auto zoom program register AZR is 100 is determined (#1052). The auto zoom program register AZR is a 3 bit register for switching four different modes in automatic programming of zooming. When AZR=001, a first auto zoom program $APZ_1$ is selected; when AZR=010, a second auto zoom program $APZ_2$ is selected; when AZR=011, a third auto zoom program $APZ_3$ is selected and when AZR=100, MLM (Magnification Lock Mode) is selected. If AZR=100 (MLM) in #1052, then AZR is set to 001 ($APZ_1$) in #1054. In #1058, the lens mode $LMO_1$ is displayed, and the program proceeds to the stopping routine. If AZR is not 100 in #1052, then the content of the auto zoom program register AZR is increased by 1 in #1053. In #1055, whether or not AZR is 100 is determined. If AZR=100 in #1055, then the lens switch LES serves as a switch for locking photographing magnification rate. Therefore, the display of the lens switch mode $LMO_2$ is erased. The NLM mode (Magnification Lock Mode) is displayed, and the program proceeds to the stopping routine (#1056, #1057). If AZR is not 100 in #1055, then the lens mode $LMO_1$ ($APZ_1$ to $APZ_3$) is displayed in #1058 and the program proceeds to the stopping routine.

Interruption is permitted in the stopping routine. Thereafter, if the lens switch LES is OFF then $LSF_0$ is set to 0, if the lens mode switch LMS is OFF, then $LSF_1$ is set to 0, and the operation is stopped (#1061 to #1065).

Figure 38:
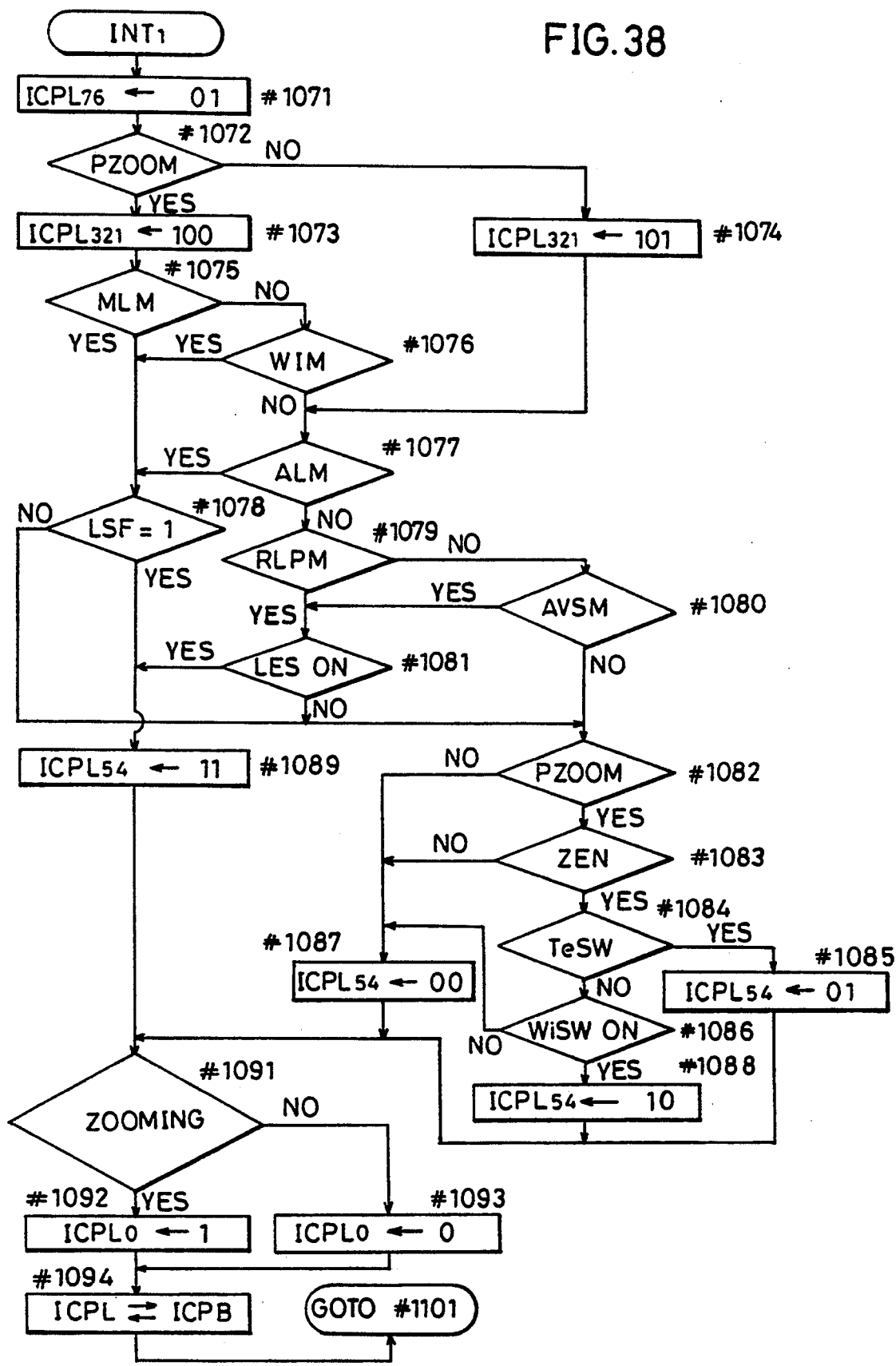

An interruption routine which is called when a "low" level interruption signal is inputted to the interruption terminal $INT_1$ of the microcomputer CPUL in the lens unit from the body will be described in the following with reference to FIGS. 38 and 39.

In this interruption routine, the lens status data ICPL is set at first (#1071 to #1093). First, 01 is set in the bits $b_7$ and $b_6$ of the lens status data ICPL, as a new lens unit is used (#1071). Thereafter, whether or not PZOOM (Power Zoom) is set is determined (#1072). If power zooming is set, then 100 are set in the bits $b_3$, $b_2$ and $b_1$ respectively of the lens status data ICPL in #1073. In #1075, #1076 and #1077, whether the photographing mode is MLM (Magnification Lock Mode), WIM (Wide Mode) or ALM (AE Lock Mode) is determined. If power zooming is not set in #1072, then 101 are set in the bits $b_3$, $b_2$ and $b_1$ of the lens status data ICPL in #1074, and whether or not it is the ALM (AE Lock Mode) is determined in #1077. If it is determined that the photographing mode is MLM, WIM or ALM in any of the steps #1075, #1076 and #1077, then whether or not the lens switch flag LSF is 1 is determined (#1078). If it is ALM (AE Lock Mode), then the lens switch flag LSF is kept 1 from the time when the lens switch LES is turned from OFF to ON once to the time when switch is changed from OFF to ON. If the lens switch LSF is 1 in #1078, then 11 are set in the bits $b_5$ and $b_4$, respectively, of the lens status data ICPL (#1089). If the lens switch flag LSF is 0 in #1078, then the flow proceeds to #1082.

If it is not ALM (AE Lock Mode) in #1077, then whether or not it is the RLPM (Release Priority Mode) or AVSM (Aperture Setting Mode) are determined in #1079, #1080. If it is either the RLPM or AVSM, then whether or not the lens switch LES is ON is determined (#1081). If the lens switch LES is ON, then the flow proceeds to #1089 in which 11 are set in the bits $b_5$ and $b_4$, respectively, of the lens status ICPL. If the photographing mode is neither the RLPM nor AVSM in #1079 and #1080, or when the lens switch LES is not ON even if the photographing mode is one of three modes, then the flow proceeds to #1082 in which whether or not PZOOM (Power Zoom) is set is determined. If power zooming is set, then whether or not a signal indicating that the zooming is possible is inputted from the body is determined (#1083). If the power zooming is not set in #1082 or if the signal indicating that the zooming is possible is not inputted from the body, then 00 are set in the bits $B_5$ and $b_4$, respectively, of the lens status data ICPL (#1087). If power zooming is set in #1082 and the signal indicating that the zooming is possible is inputted from the body in #1083, then whether or not the tele switch or the wide switch is ON is determined in #1084 and #1086. If the tele switch is ON in #1084, then 01 are set in the bits $b_5$ and $b_4$ of the lens status data ICPL (#1085). If the wide switch is ON in #1086, then 10 are set in the bits $b_5$ and $b_4$ of the lens status data ICPL. If the tele switch and the wide switch are both OFF in #1084 and #1086, then the program proceeds to #1087 in which 00 are set in the bits $b_5$ and $b_4$ of the lens status data ICPL.

After the bits $b_5$ and $b_4$ of the lens status data ICPL are set in the step #1089, #1087, #1088 or #1085, then whether or not zooming is being carried out is determined in #1091. When the zooming is being carried out, then 1 is set in the least significant bit $b_0$ of the lens status data ICPL. Otherwise, 0 is set in the least significant bit $b_0$ (#1092, #1093). Thereafter, the lens status data ICPL is outputted in #1094 and the body status ICPB is read.

Figure 39A:
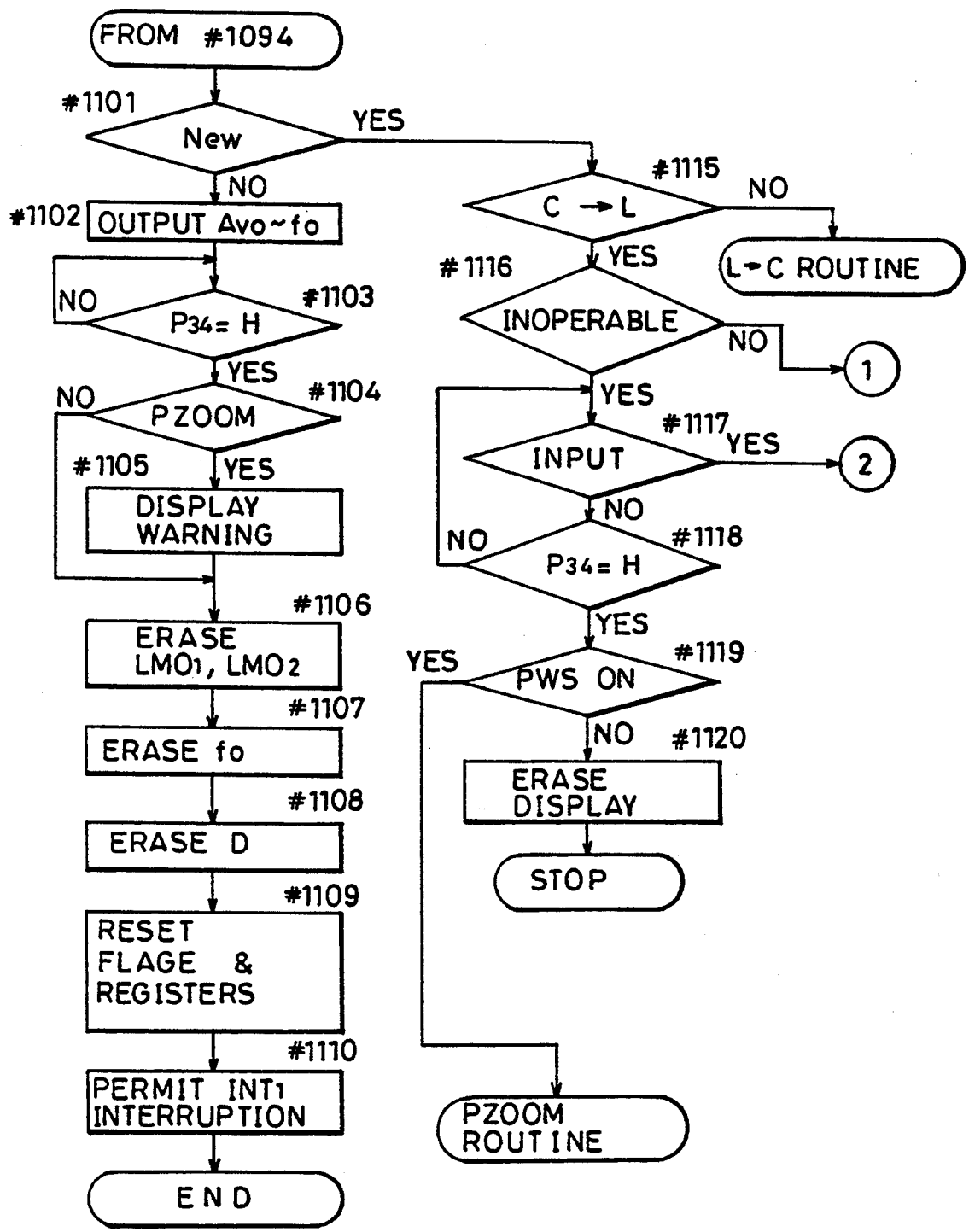
Figure 39B:
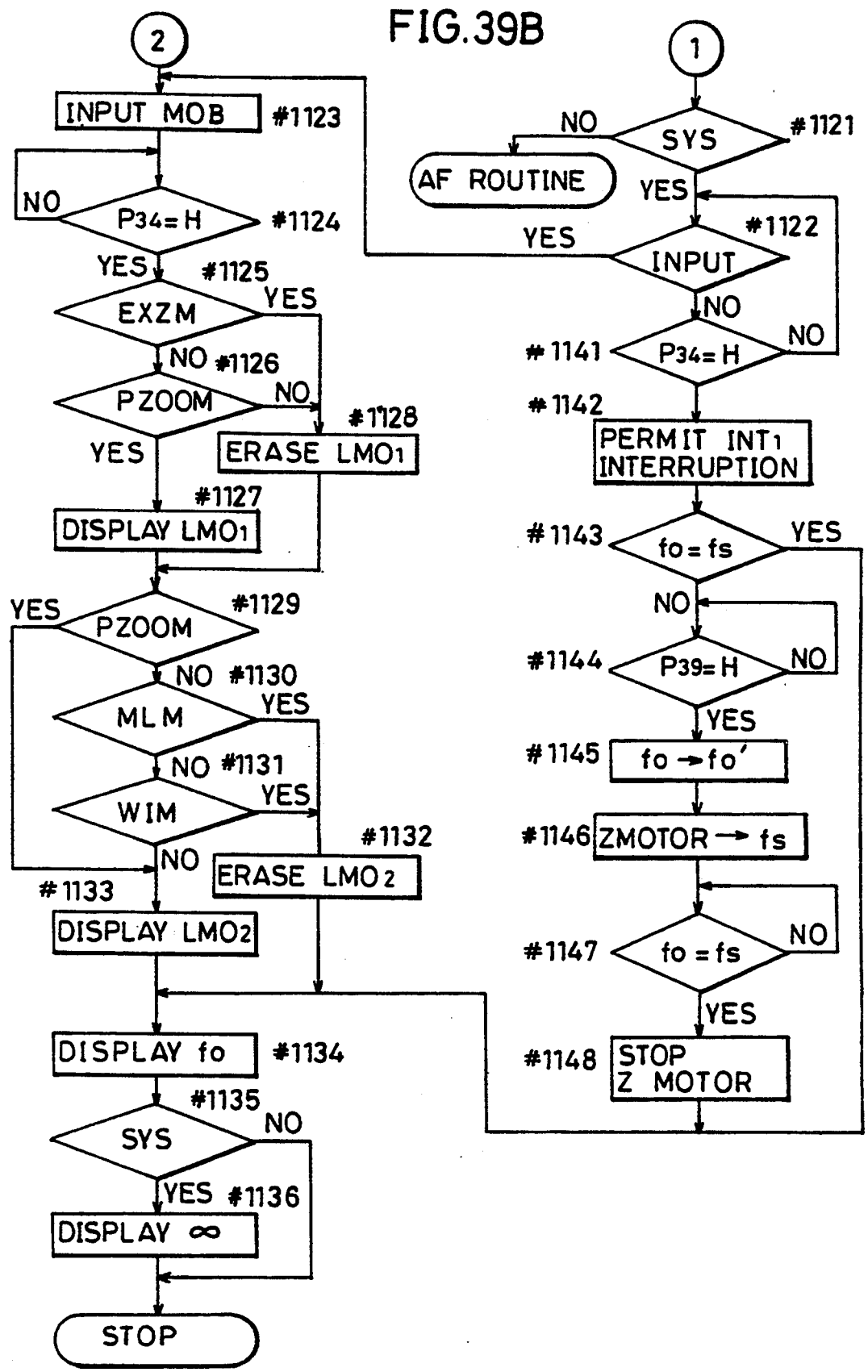

After the body status ICPB is read, the program proceeds to the flow of FIG. 39. In #1101, whether or not the body is a new body (ICPB$_{76}$=01) is determined. If not, it means that the body is a conventional body. The lens data Av0 to $f_0$ are outputted and after the lens select signal SCL attained the "high" level, which signal inputted to the port $P_{34}$, whether or not PZOOM (Power Zoom) is set is determined. If the power zooming is set, a warning is displayed, since a conventional old body is incapable of power zooming (#1102 to #1105). Meanwhile, a conventional body comprises only the terminals $J_{12}$ (low voltage $V_{LEL}$ for the lens unit), $J_{13}$ (lens select signal CSL), $J_{15}$ (serial input SIN), $J_{16}$ (serial clock SCK), and $J_{17}$ (ground line $G_1$). Displays of the lens modes LMO$_1$ and LMO$_2$, the present focal length $f_0$ and the photographing distance D are erased, flags and registers are reset, an interruption by the interruption terminal INT$_1$ is permitted, and the operation is stopped (#1106 to #1110).

Figure 40:
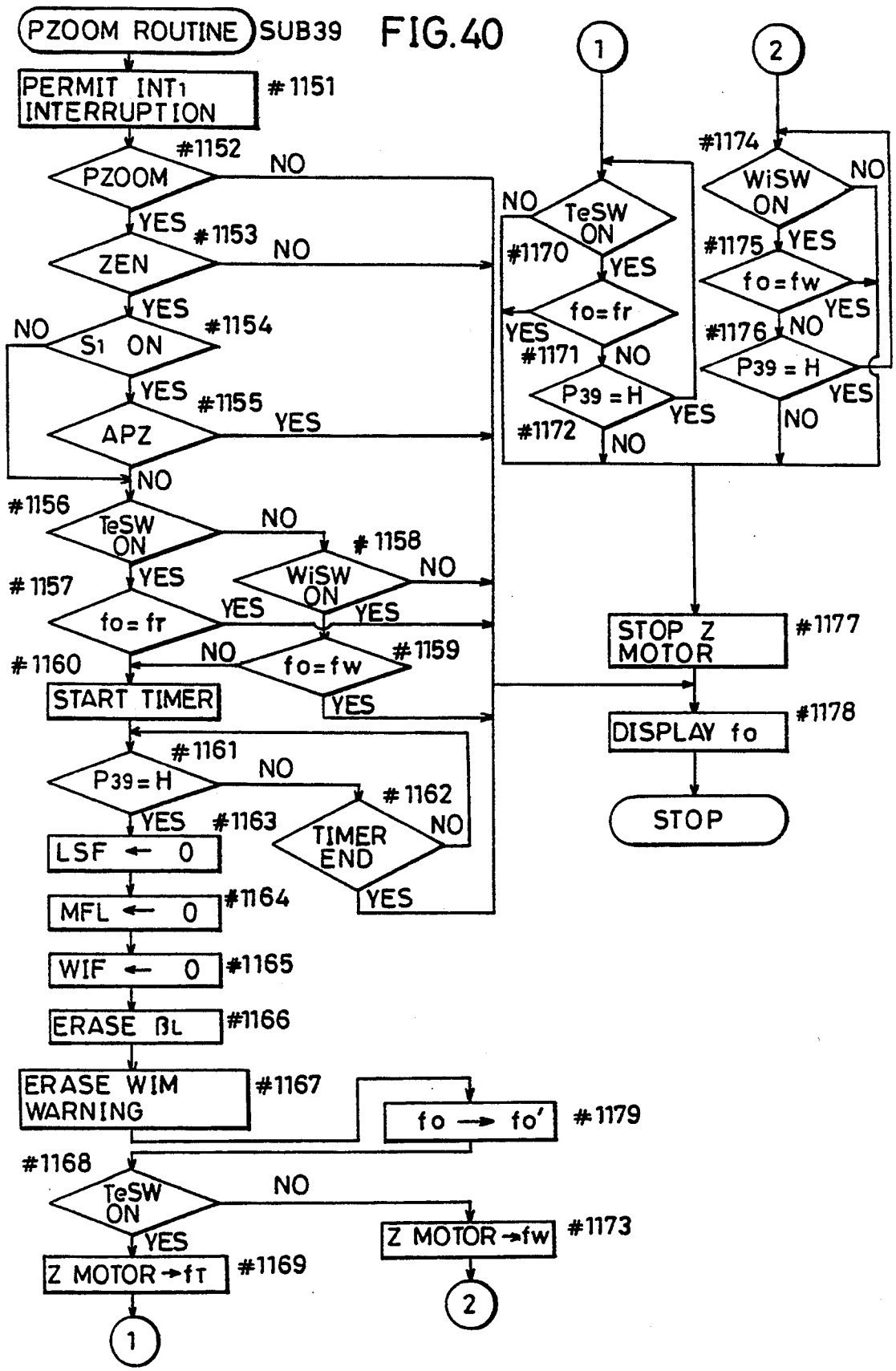

If it is determined that the body is a new body in #1101, then whether the body data input is set (ICPB$_2$=0) or the lens data output is set (ICPB$_2$=1) is determined (#1115). If the body data input is to be carried out, then the program proceeds to #1116, and if the lens data output is to be carried out, then the program proceeds to the lens data output routine shown in FIG. 45. In #1116, whether or not the body is non-operable (ICPB$_{54}$=00) is determined. If the body is non-operable, then the program waits for the input of the next data from the body in #1117 while it waits for the port $P_{34}$ to attain "high" level in #1118. If the port $P_{34}$ attains "high" level without the data input from the body, then whether or not the power switch PWS on the body is ON is determined (ICPB$_3$=0) (#1119). If the power switch PWS is ON, then the flow proceeds to the power zoom routine (FIG. 40). If the power switch PWS is OFF, then displays are erased in #1120 and the program proceeds to the stopping routine.

In the power zoom routine shown in FIG. 40, an interruption of the INT$_1$ is permitted, and whether or not PZOOM (Power Zoom) is set is determined (#1151, #1152). If the power zooming is set, then whether or not a signal indicating that the zooming is possible is inputted from the body (ICPB$_1$=1) is checked (#1153). If the power zoom is not set in #1152 or when the signal indicating that the zooming is possible is not inputted from the body in #1153, then the program proceeds to #1178 in which the present focal length $f_0$ is displayed, and the program returns to the main flow.

If the power zooming is set and the signal indicating that the zooming is possible is inputted from the body in #1152 and #1153, then whether or not the preparatory switch $S_1$ is ON is determined (#1154). If the preparatory switch $S_1$ is ON, then whether or not it is APZ (Automatic Programming of Zooming) is determined (#1155). If it is APZ, then the program proceeds to #1178 in which the present focal length $f_0$ is displayed, and the program returns to the main flow. If the preparatory switch $S_1$ is OFF, then the program skips the step #1155 and proceeds to #1156. Even if the preparatory switch $S_1$ is ON, the flow proceeds to #1156 when it is not the APZ. In #1156 and #1158, whether or not the tele switch is ON, and whether or not the wide switch is ON are determined. If the tele switch and the wide switch are both OFF in #1156 and #1158, then the flow proceeds to #1178. If the tele switch is ON in #1156, then whether or not the present focal length $f_0$ has reached the focal length $f_T$ at the tele end is determined in #1057. If the wide switch is ON in #1158, then whether or not the present focal length $f_0$ has reached the focal length $f_W$ at the wide end is determined in #1159. If it is determined that $f_0=f_T$ or $f_0=f_W$ in #1157 or #1159, then the program proceeds to #1178. If $f_0$ is not equal to $f_T$ #1157, or if $f_0$ is not $f_W$ in #1159, then a timer is started in #1160.

In #1161 and #1162, the program waits for the start of application of the high voltage $V_{LEH}$ for the lens unit ($P_{39}$="high") until the operation of the timer is completed. If the operation of the timer is completed in #1162, then the program proceeds to #1178. If the high voltage $V_{LEH}$ for the lens unit is supplied in #1161 before the time up, then the flags LSF, MFL and WIF are reset to 0, the locked magnification rate $\beta_L$ is erased and a wide mode warning is erased (#1163 to #1167). The present focal length $f_0$ is saved in a register $f_0$, in #1179, and then whether the tele switch is ON or not is determined in #1168. If the tele switch is ON, then the zoom motor MO$_3$ is driven toward the focal length $f_T$ at the tele end. If the tele switch is not ON, then the zoom motor MO$_3$ is driven toward the focal length $F_W$ at the wide end (#1169, #1173). If the zooming in the tele direction is started (#1169) the loop from #1170 to #1172 is circulated so long as three conditions are satisfied, that is, the present focal length $f_0$ has not yet reached the focal length $f_T$ at the tele end, the tele switch is ON, and the high voltage $V_{LEH}$ for the lens unit is being supplied ($P_{39}$="high"). When any one of the above described three conditions is not satisfied, the zoom motor MO$_3$ is stopped in #1177, the present focal length $f_0$ is displayed in #1178, and the program returns to the main flow. Similarly, when zooming in the wide direction is started (#1173), the loop from #1174 to #1176 is circulated so long as the three conditions are satisfied, that is, the wide switch is ON, the present focal length $f_0$ has not yet reached the focal length $f_W$ at the wide end and the high voltage $V_{LEH}$ for the lens unit is being supplied ($P_{39}$="high"). When any one of the three conditions is not satisfied, the zoom motor MO$_3$ is stopped in #1177, and the present focal length $f_0$ is displayed in #1178 and the program returns to the main flow.

Returning to the flow of FIG. 39, when there is a data input from the body in #1117, then the mode buffer MOB is read and the program waits for the port $P_{34}$ to be the "high" level (#1123, #1124). Whether or not it is EXZM (Exposure During Zooming) is determined (#1125). If it is not EXZM, then whether or not it is PZOOM (Power Zoom) is determined (#1126). If it is determined that it is EXZM in #1125, or if it is determined that it is not power zooming in #1126, then the display of the lens mode $LMO_1$ is erased in #1128 and the program proceeds to #1129. If it is determined that it is not EXZM but power zooming in #1125 and #1126, then the lens mode $LMO_1$ is displayed in #1127, and the program proceeds to #1129.

In #1129, whether or not PZOOM (Power Zoom) is set is determined. If power zoom is not set, then whether the photographing mode is MLM (Magnification Lock Mode) or WIM (Wide Mode) is determined in #1130 and #1131. If the photographing mode is MLM or WIM, the lens switch LES serves as a switch for locking magnification rate or a switch for setting and resetting wide zoom. Since the display of the lens switch mode $LMO_2$ becomes meaningless, the display is erased (#1132). If the photographing mode is neither MLM nor WIM in #1130 and #1131 or if the power zoom is set in #1129, then the lens switch mode $LMO_2$ is displayed (#1133). The program proceeds from #1132, #1133 to #1134 in which the present focal length $f_0$ is displayed. If the body is in the state of system reset, then a display is provided indicating that the lens position is the infinite photographing position and the program proceeds to the stopping routine (#1135, #1136). If the power switch PWS is OFF, these displays should preferably be erased.

Meanwhile, if the body is in operation ($ICPB_{54}=00$) in #1116), then whether or not it is system reset ($ICPB_{56}=11$) is determined (#1121). If the body is not in the state of system reset, then the program proceeds to the AF routine. If it is the system reset, then the program waits for the data input from the body or the port $P_{34}$ to be the "high" level (#1122, #1141). If there is a data input from the body, it is an operation by the system reset key so that the program proceeds to #1123. Meanwhile, if the port $P_{34}$ attains the "high" level, it means that the lens is attached with the power switch PWS being OFF. In that case, an interruption of the $INT_1$ is permitted, and then the lens is moved to a focal length $f_s$ in which the entire lens length along the optical axis becomes the shortest (#1142 to #1148). More specifically, whether or not the present focal length $f_0$ is equal to the focal length $f_s$ in which the entire lens length along the optical axis becomes the shortest, and if $f_0=f_s$, the program proceeds to #1134. If $f_0$ is not equal to $f_s$, then the program proceeds to #1144 in which the program waits for the supply of the high voltage $V_{LEH}$ for the lens unit ($P_{39}=$"high"). The high voltage $V_{LEH}$ for the lens unit is supplied, then the present focal length $f_0$ is saved in the register $f_0'$ and the zoom motor $MO_3$ is driven toward the focal length $f_s$ (#1145, #1146). When the present focal length $f_0$ reaches the focal length $f_s$ in which the entire lens length along the optical axis becomes the shortest, then the zoom motor $MO_3$ is stopped and the program proceeds to #1134 (#1147, #1148).

Figure 41:
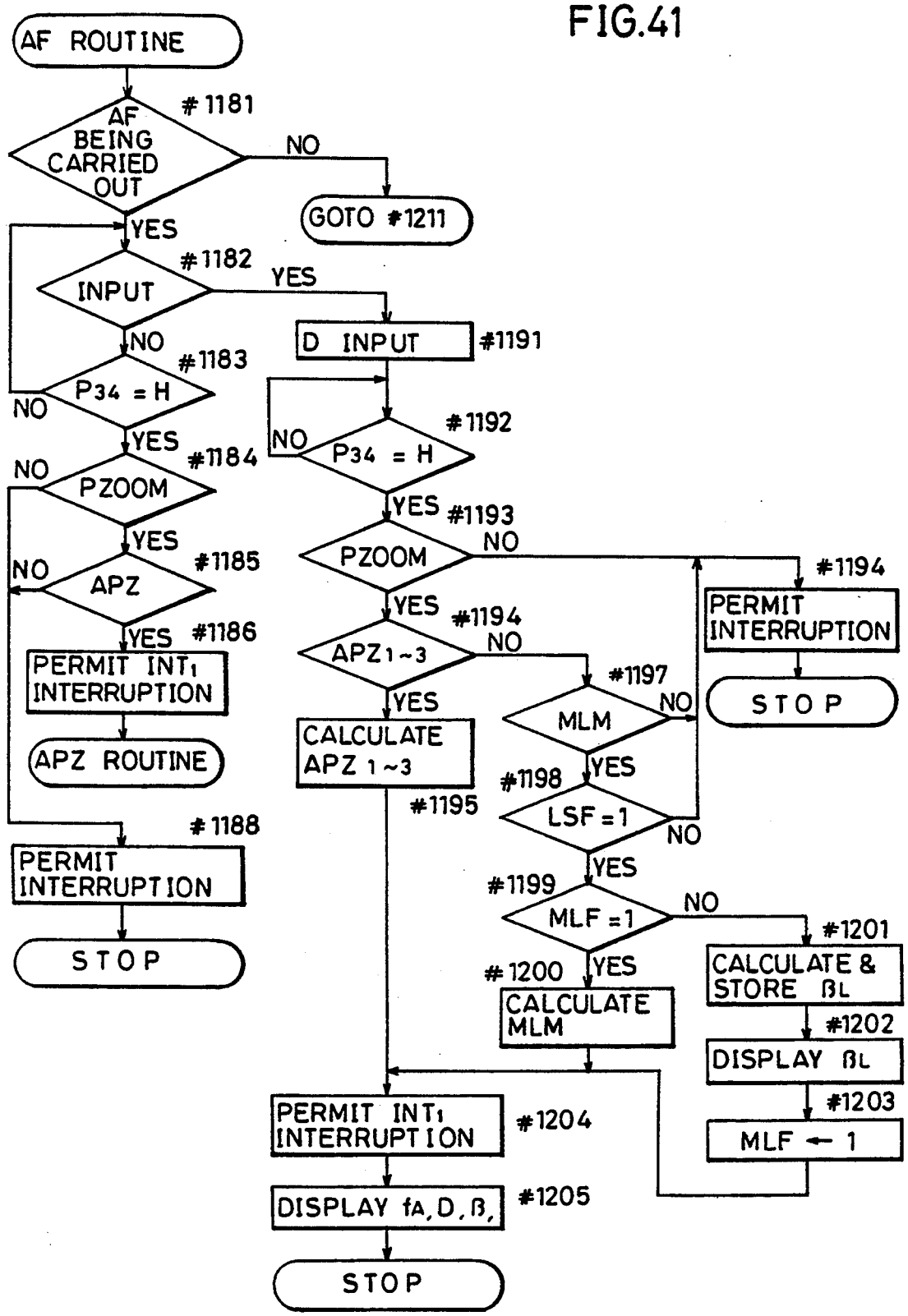

If the body is not in the system reset state ($ICPB_{54}=11$) in #1121, then the program proceeds to the AF routine shown in FIG. 41. In #1181, whether or not AF operation is being carried out is checked ($ICPB_0=1$). If the AF operation is being carried out, then the program waits for the data input from the body or for the port $P_{34}$ to be the "high" level in the steps #1182 and #1183. When the port $P_{34}$ attains the "high" level in #1183, then whether or not PZOOM (Power Zoom) is set and whether or not it is APZ (Automatic Programming of Zooming) is determined (#1184, #1185). If it is determined that the power zooming is not set in #1184 or if it is determined that it is not APZ in #1185, then interruptions are permitted in #1188, and the program proceeds to the stopping routine. If it is determined that the power zoom is set and it is AZP in #1184 and #1185, then an interruption by the interruption terminal $INT_1$ is permitted in #1186 and the program proceeds to the APZ routine.

Meanwhile, if there is a data input from the body in #1182, then the photographing distance D is inputted and the program waits for the port $P_{34}$ to attain "high" level (#1191, #1192). Thereafter, whether or not PZOOM (Power Zoom) is set is determined (#1193). If the power zooming is set, then whether or not any one of $APZ_1$ to $APZ_3$ is selected is determined (#1194). If any one of $APZ_1$ to $APZ_3$ is selected, then the first automatic programming of zooming shown in FIG. 50 ($APZ_1$), the second automatic programming of zooming ($APZ_2$) shown in FIG. 51 or the third automatic programming of zooming ($APZ_3$) shown in FIG. 52 is carried out corresponding to the selected one to calculate the photographing magnification rate $\beta$, the focal length $f_A$ and the offset amount $N_L$ from the photographing distance D (#1195). If none of $APZ_1$ to $APZ_3$ is selected in #1194, then whether or not it is MLM (Magnification Lock Mode) is determined (#1197). If it is the MLM, then whether or not the lens switch flag LSF is 1 is determined (#1198). When the photographing mode is not MLM in #1197, when the lens switch flag LSF is not 1 in #1198 even if the photographing mode is MLM, or when power zooming is not set in #1193, then interruptions are permitted in #1194 and the program proceeds to the stopping routine. If it is determined that the photographing mode is the MLM (Magnification Lock Mode) and the lens switch flag LSF is 1 in #1197 and #1198, then whether or not MLF is 1 (Lock magnification Rate $\beta_L$ has been stored) is determined (#1199). If MLF is not 1 indicating that the magnification rate $\beta_L$ has not yet been stored, then the magnification rate $\beta_L$ is calculated from the photographing distance D and the present focal length $f_0$ to store the same, the locked magnification rate $\beta_L$ is displayed, and the flag MLF is set to 1 (#1201 to #1203). If MLF=1 in #1199, then the focal length $f_A$ and the offset amount $N_L$ are calculated from the stored magnification rate $\beta_L$ and the photographing distance D (#1200).

Figure 42:
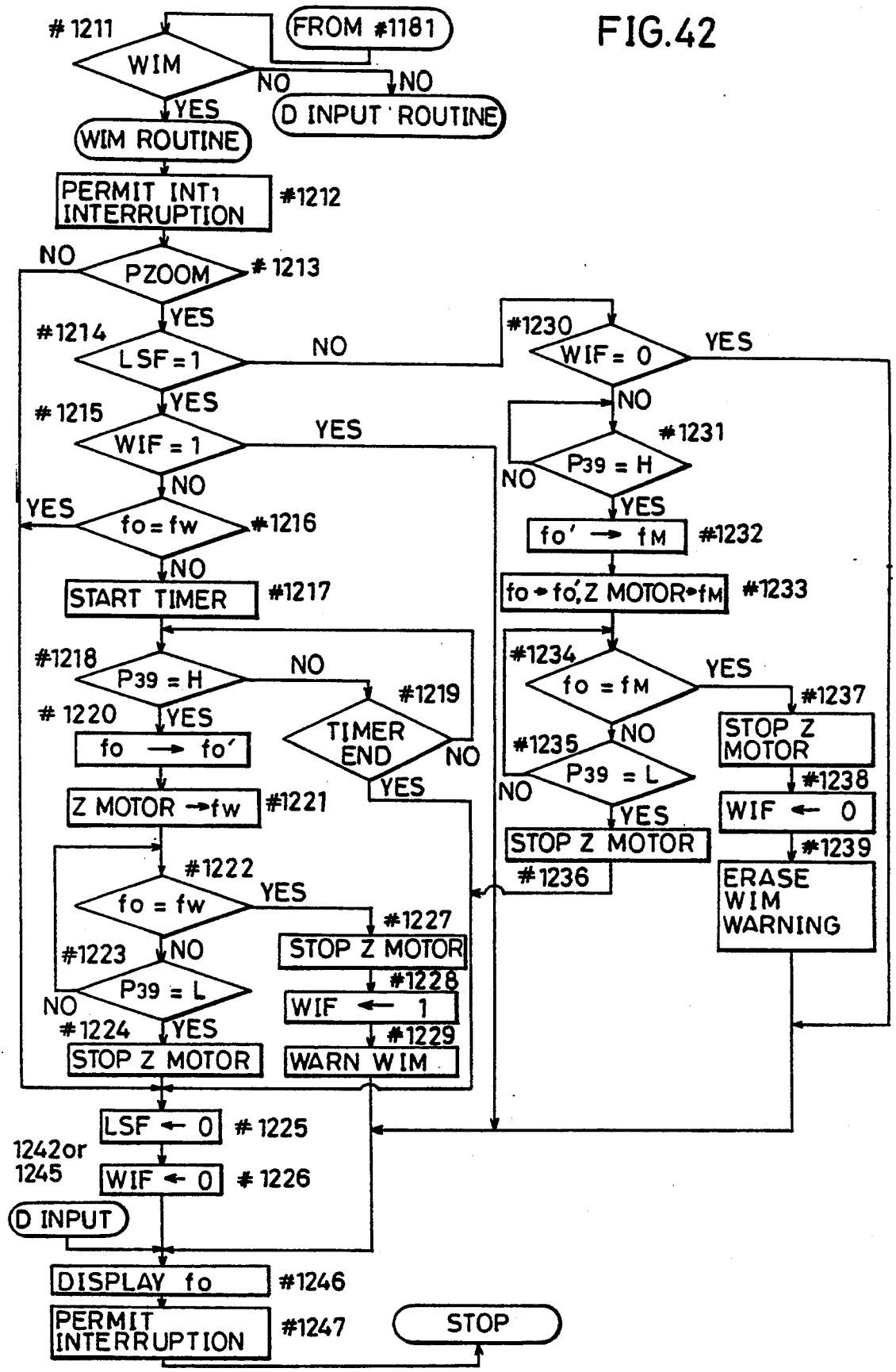

If the AF operation is not being carried out in #1181, then the flow proceeds to #1211 shown in FIG. 42 in which whether or not the photographing mode is the WIM (Wide Mode) is determined. If the photographing mode is the WIM in #1211, then the program proceeds to the WIM (wide) routine. An interruption by the interruption terminal $INT_1$ is permitted, and whether or not PZOOM (Power Zooming) is set is determined (#1212, #1213). If power zooming is not set, then the program proceeds to #1225. If the power zoom is set, then whether or not the lens switch flag LSF is 1 is determined (#1214). If LSF=1, then whether or not the wide flag WIF is 1 is determined (#1215). If WIF is not 1, then whether or not the focal length $f_0$ at present is equal to the focal length $f_W$ at the wide end is determined (#1216). If $f_0=f_W$, the program proceeds to #1225.

Otherwise zooming is carried out to the wide end. First, the timer is started in #1217, and the program waits for the supply of the high voltage $V_{LEH}$ for the lens ($P_{39}$="high") until the time is up in the timer in #1218 and #1219. If the time is up in #1219, then the program proceeds to #1225. If the supply of the high voltage $V_{LEH}$ for the lens unit ($P_{39}$="high") is detected in #1218, then the present focal length $f_0$ is saved in the register $f_0'$. The zoom motor MO3 is driven toward the focal length $f_W$ at the wide end (#1220, #1221). The loop of the steps #1222 and #1223 is circulated until $f_0$ reaches $f_W$ or until the supply of the high voltage $V_{LEH}$ for the lens unit is stopped ($P_{39}$="low"), to continue zooming to the wide end. If the supply of the high voltage $V_{LEH}$ for the lens unit is stopped ($P_{39}$="low") in #1223, then the zoom motor MO3 is stopped (#1224). The lens switch flag LSF and the wide flag WIF are reset (#1225, #1226). Thereafter, the present focal length $f_0$ is displayed, interruptions are permitted, and the program proceeds to the stopping routine (#1246, #1247).

Meanwhile, if it is determined that $f_0 = f_W$ in #1222, it means that the lens has reached the wide end. Therefore, the zoom motor MO3 is stopped (#1227) and the wide flag WIF is set to 1 (#1228). A wide mode warning is given in #1229 and the flow proceeds to #1246. The wide mode warning is continued while the lens is at the wide end.

Meanwhile, if LSF is not 1 in #1214, then whether or not the wide flag WIF is 0 is determined (#1230). If WIF=0, then the program directly proceeds to #1246. If the wide flag WIF is not 0 in #1230, the lens is returned to the original focal length (stored as $f_M$). Upon application of the high voltage $V_{LEH}$ for the lens unit ($P_{39}$="high"), the focal length saved in the register $f_0'$ is stored as the original focal length $f_M$, the present focal length $f_0$ is saved in the register $f_0'$, and the zoom motor MO3 is driven toward the original focal length $f_M$ (#1231 to #1233). The loop of the steps #1234 and #1235 is circulated until the present focal length $f_0$ reaches original focal length $f_M$ or until the application of the high voltage $V_{LEH}$ for the lens unit is stopped ($P_{39}$="low"). If it is determined that the supply of the high voltage $V_{LEH}$ for the lens unit is stopped ($P_{39}$="low") in #1235, the zoom motor MO3 is stopped in #1236 and the program proceeds to #1225. If it is determined that $f_0 = f_M$ in #1234, then the zoom motor MO3 is stopped (#1237) and the wide flag WIF is reset to 0 (#1238). The warning of the wide mode is cancelled (#1239), and the program proceeds to #1246.

Figure 43:
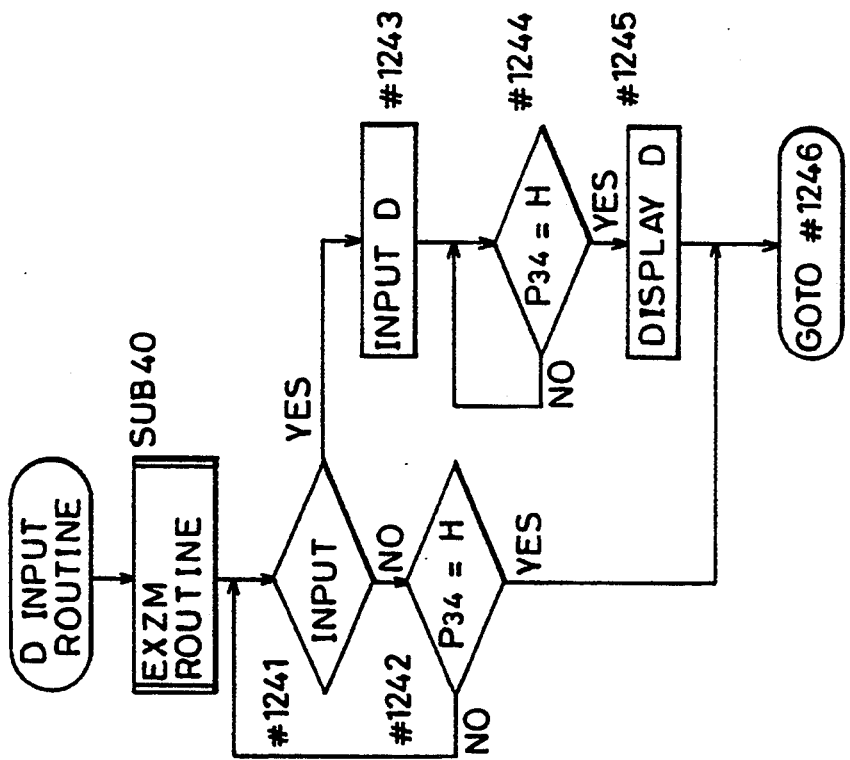

If the photographing mode is not the WIM in #1211, then the program proceeds to D input routine shown in FIG. 43. In this routine, EXZM (Exposure during Zooming) subroutine (SUB40) is executed. The loop of the steps #1241 and #1242 is circulated until there is a data input from the body or until the port $P_{34}$ attains the "high" level. If there is a data input from the body in #1241, then the data of the photographing distance D is inputted (#1243). When the port $P_{34}$ attains the "high" level (#1244), the photographing distance D is displayed (#1245), and the program proceeds to #1246. If the port $P_{34}$ attains the "high" level without the data input from the body (#1242), then the program directly proceeds to #1246.

Figure 44:
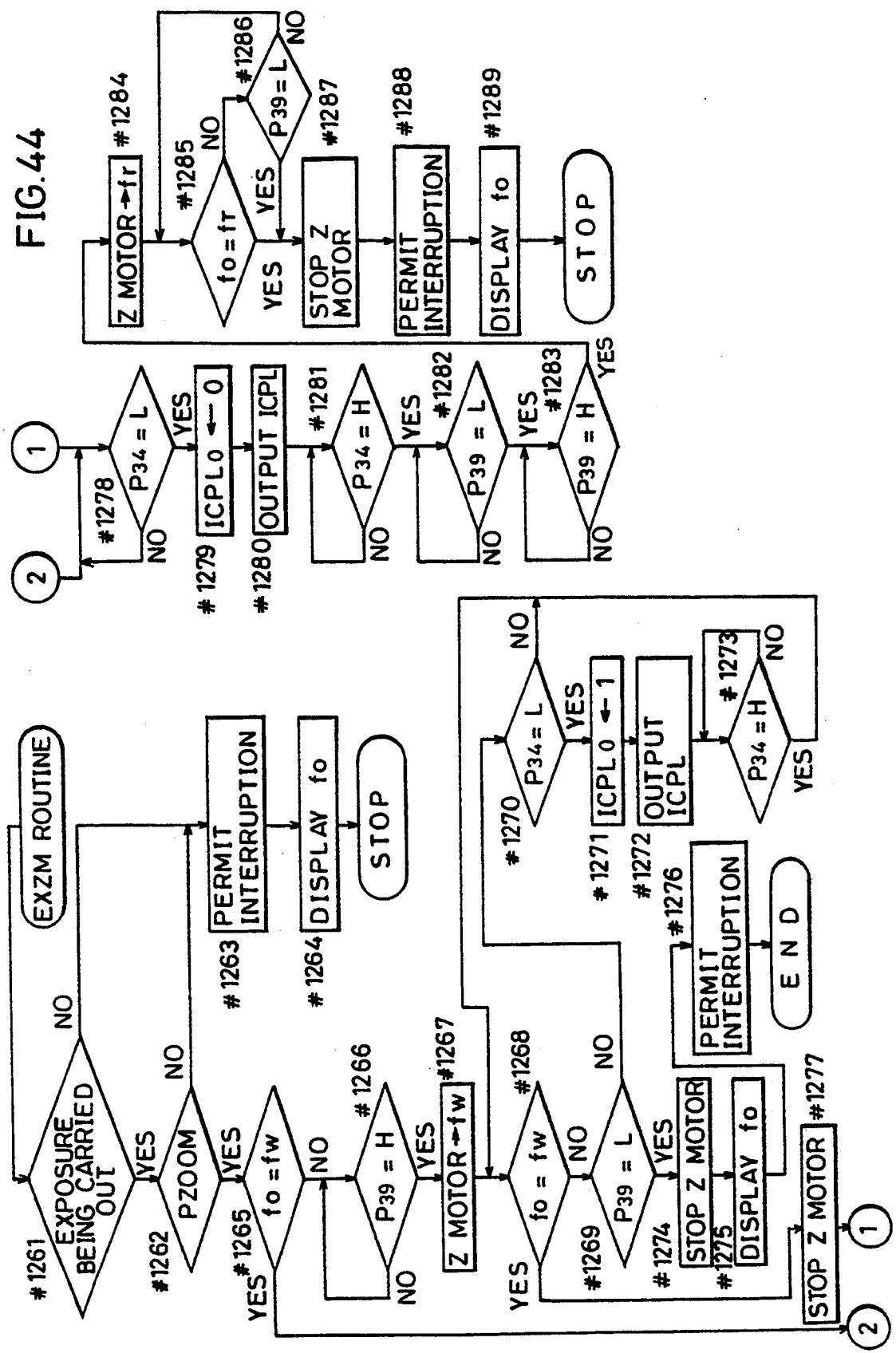

The EXZM (Exposure During Zooming) subroutine will be described in the following with reference to FIG. 44. In this subroutine, whether or not the exposure is being carried out is determined (#1261). If the exposure is being carried out, then whether or not PZOOM (Power Zoom) is set is determined (#1262). If exposure is not being carried out in #1261 or if the power zoom is not set in #1262, then interruptions are permitted (#1263). The present focal length $f_0$ is displayed (#1264), and the program proceeds to the stopping routine.

If it is determined that the exposure is being carried out in #1261 and it is determined that the power zooming is set in #1262, then whether or not the present focal length $f_0$ is equal to the focal length $f_W$ at the wide end is determined (#1265). If $f_0 = f_W$, then the flow proceeds to #1278. If $f_0$ is not equal to $f_W$, then the program waits for the application of the high voltage $V_{LEH}$ for the lens unit ($P_{39}$="high") and then the zoom motor MO3 is moved toward the focal length $f_W$ at the wide end (#1266, #1267). The loop of the steps #1268, #1269 and #1270 is circulated until the present focal length $f_0$ reaches the focal length $f_W$ at the wide end, the application of the high voltage $V_{LEH}$ for the lens unit is stopped ($P_{39}$="low") or the lens select signal CSL inputted to the port $P_{34}$ from the body through the bidirectional signal line LBL attains the "low" level.

If $f_0$ reaches $f_W$ in #1268, it means that the lens has reached the wide end, so that the zoom motor MO3 is stopped in #1277, and the program proceeds to #1278. If the application of the high voltage $V_{LEH}$ for the lens unit is stopped in #1269 ($P_{39}$="low"), the zoom motor MO3 is stopped (#1274). The present focal length $f_0$ is displayed (#1275), interruptions are permitted (#1276), and the operation is completed. Meanwhile, if the lens select signal CSL from the body attains the "low" level ($P_{34}$="low") in #1270, it means that status communication is required from the body, so that the least significant bit $b_0$ of the lens status data ICPL is set to 1 (indicating that the zooming is being carried out) and the lens status data ICPL is outputted (#1271, #1272). Thereafter, the program waits for the port $P_{34}$ to attain the "high" level in #1273, and the loop from the steps #1268 to #1270 is again circulated.

If $f_0$ becomes equal to $f_W$ in #1265 or #1268, the program proceeds to #1278, then the program waits for the lens select signal CSL inputted from the body to the port $P_{34}$ through the bidirectional signal line LBL to attain the "low" level. If the port $P_{34}$ attains the "low" level in #1278, it means that the status communication is requested from the body, and therefore, the least significant bit $b_0$ of the lens status data ICPL is set to 0 (zooming is stopped), and the lens status data ICPL is outputted (#1279, #1280). Thereafter, the program waits for the port $P_{34}$ to return to the "high" level in #1281. The exposure on the film is started, the supply of the high voltage $V_{LEH}$ for the lens unit is once stopped in #1282 ($P_{39}$="low") and when the supply of the high voltage is started again in #1283 ($P_{39}$="high"), the zoom motor MO3 is operated for zooming to the focal length $f_T$ at the tele end in #1284. The loop of the steps #1285 and #1286 is circulated until the present focal length $f_0$ reaches the focal length $f_T$ at the tele end or the supply of the high voltage $V_{LEH}$ for the lens unit is stopped ($P_{39}$="low"). If $f_0$ becomes equal to $f_T$ in #1285 or if the supply of the high voltage $V_{LEH}$ for the lens unit is stopped ($P_{39}$="low") in #1286, the zoom motor MO3 is stopped. Interruptions are permitted, the present focal length $f_0$ is displayed and the program proceeds to the stopping routine (#1287 to #1289).

When a varifocal zoom lens is used, the photographing distance changes during zooming, so that EXZM (Exposure During Zooming) is inhibited. However, if the image which is to be the center is well focused, the change of the photographing distance may not be a serious problem. In addition, the blurring of the image may provide a special effect of zooming. Therefore, in such cases, the program is modified as follows. Namely, if EXZM (Exposure During Zooming) is selected, the lens is zoomed to the wide end before the execution of the offset routine (SUB13) no matter whether the varifocal zoom lens is used or not. Thereafter, the AE calculation and AF operation are carried out so that the image which is to be the center is focused at the wide end. In the exposure controlling routine shown in FIG. 23, the steps #534 to #548 (zooming toward the wide end) are skipped and whether or not the lens unit employed is of the type I is determined in #558. If the lens is of the type I, the program proceeds to #566. Otherwise it proceeds to #559, and the operation which is the same as described above is carried out. In the lens unit also, the steps #1265 to #1282 (zooming toward the wide end) in the EXZM routine shown in FIG. 44 are skipped, and the operation is started from the step #1283 when EXZM (Exposure During Zooming) is set. Although the display of the EXZM is erased in this embodiment (#1125 and #1128 in FIG. 39 and #1312 and #1315 in FIG. 45), when EXZM (Exposure During Zooming) is selected with the lens being the type III lens unit, this erasure operation becomes unnecessary.

Figure 45A:
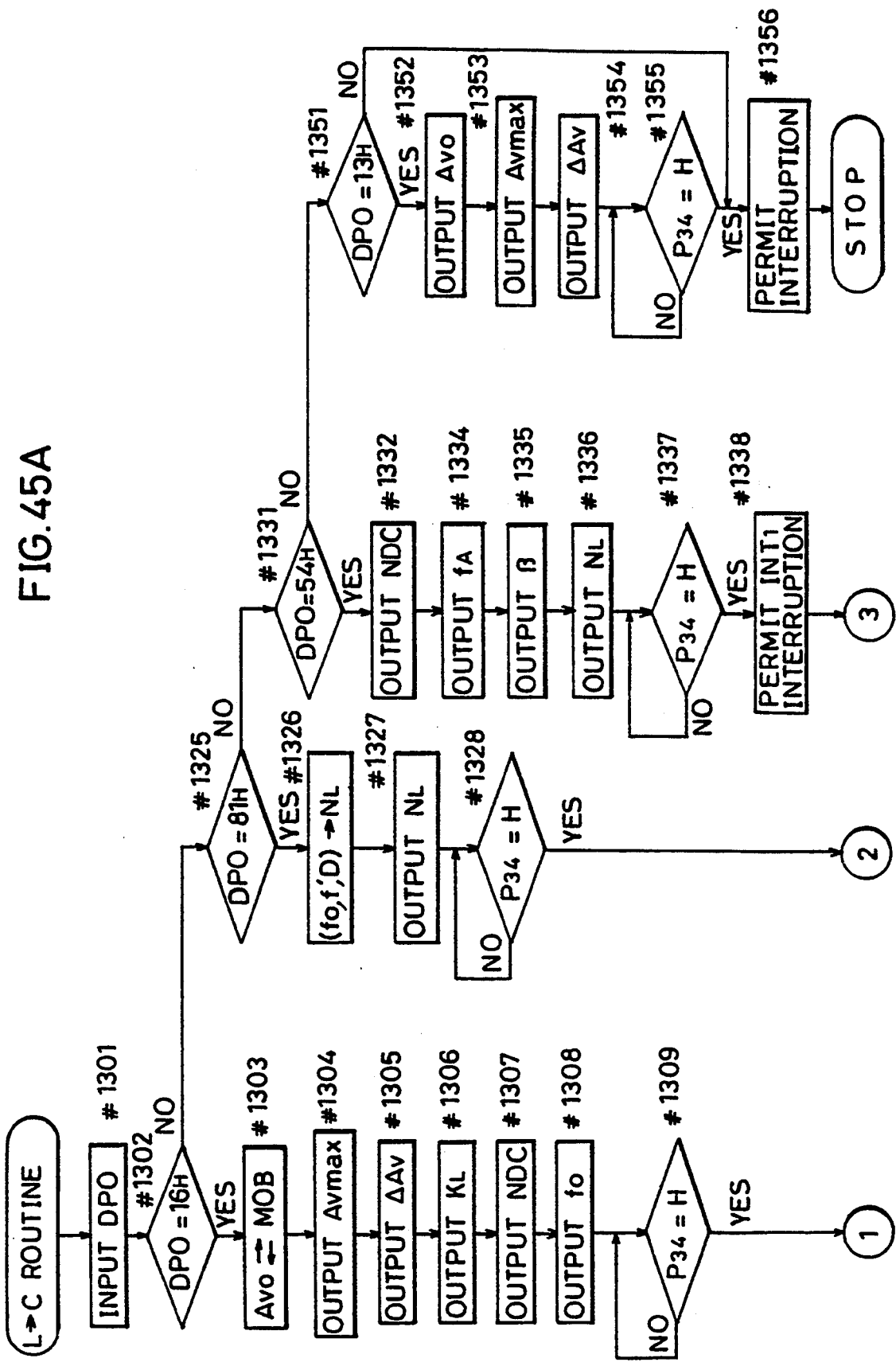
Figure 45B:
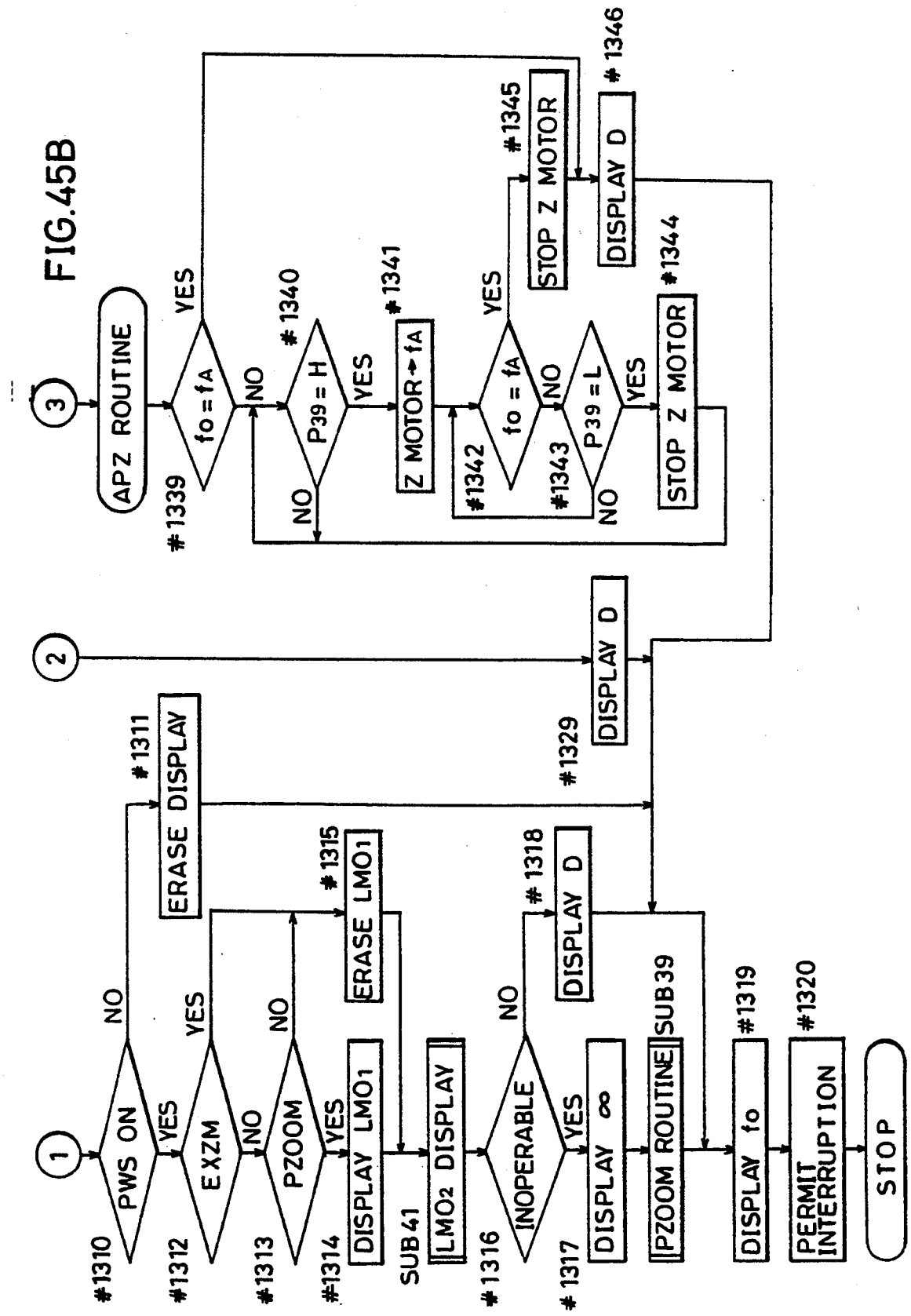

The lens data output routine for transmitting data from the lens unit to the body will be described with reference to FIG. 45. In this routine, different operations are carried out in accordance with the contents of the data pointer DPO. First, the data pointer DPO is inputted and whether or not DPO=$16_H$ is determined (#1301, #1302). If DPO=$16_H$, it means that transmission of 6 bytes of lens data from the first address AD1 is requested by the body. Therefore, the full open aperture value Av0 and the content of the mode buffer MOB are exchanged, and the maximum aperture value Awmax, the deviation of the aperture value ΔAv, the conversion coefficients $K_L$ and NDC and the present focal length $f_0$ are outputted (#1303 to #1308). The communication is terminated when the lens select signal CSL inputted to the port $P_{34}$ returns to "high" level (#1309").

Thereafter, whether or not the power switch PWS is ON is determined (#1310). If the power switch PWS is not ON, then the display is erased, the present focal length $f_0$ is displayed, interruptions are permitted, and the flow proceeds to the stopping routine (#1311, #1319, #1320). If the power switch PWS is ON in #1310, then whether or not the EXZM (Exposure During Zooming) is selected is determined (#1312). If EXZM is set, then the display of the lens mode $LMO_1$ is erased (#1315). If the EXZM is not set, then whether or not PZOOM (Power Zoom) is set is checked (#1313). If the power zoom is not set, then the display of the lens mode $LMO_1$ is erased (#1315). If the power zoom is set, then the lens mode $LMO_1$ is displayed (#1314).

The subroutine for displaying the lens switch mode $LMO_2$ (SUB41) is executed. Thereafter, whether or not the body is being operated is determined (#1316). If the body is being operated, then the photographing distance D is displayed (#1318) and the program proceeds to #1319. If the body is not operated in #1316, then a display is provided in #1317 indicating that the lens is at the infinite photographing position, the subroutine of power zooming (SUB39) is executed, and the flow proceeds to #1319.

If the data pointer DPO is not $16_H$ in #1302, then whether or not DPO=$81_H$ is determined in #1325. If DPO=$81_H$, it means input of 1 byte lens data from the eighth address AD8 (that is, the offset amount $N_L$) is requested from the body. Therefore, the data of the offset amount $N_L$ for correcting the position of the focusing lens is calculated in #1326 based on the present focal length $f_0$, the focal length saved in the register $f_0$, and the photographing distance D in accordance with an equation, which will be described later. The data is transmitted to the body (#1327). When the lens select signal CSL inputted to the port $P_{34}$ returns to the "high" level (#1328), the photographing distance D is displayed (#1329), and the program proceeds to #1319.

If the data pointer DPO is not $81_H$ in #1325, then whether or not DPO is $54_H$ is checked in #1331. If DPO=$54_H$, it means that the 4 bytes of lens data from the fifth address AD5 is to be inputted, so that the conversion coefficient NDC ($f_A$), the focal length $f_A$, the magnification rate β and the offset amount NL provided by the operation of APZ (Automatic Programming of Zooming) are outputted (#1332 to #1336). The program waits for the lens select signal CSL inputted to the port $P_{34}$ to return to the "high" level, and then an interruption to the interruption terminal $INT_1$ is permitted and the program proceeds to the APZ routine.

In the APZ routine, zooming is carried out to realize the calculated focal length $f_A$. At first, whether or not the present focal length $f_0$ is equal to the calculated focal length $f_A$ is determined (#1339). If $f_0=f_A$, then the photographing distance D is displayed in #1346 and the program proceeds to #1319. If $f_0$ is not equal to $f_A$ in #1339, then the program waits for an application of the high voltage $V_{LEH}$ for the lens unit ($P_{39}$="high"), and the zoom motor $MO_3$ is driven toward the calculated focal length $f_A$ (#1341). The loop of the steps #1342 and #1343 is circulated until the present focal length $f_0$ reaches the calculated focal length $f_A$ or the supply of the high voltage LEH for the lens unit is stopped ($P_{39}$="low"). If it is determined that the application of the high voltage $V_{LEH}$ for the lens unit is stopped in #1343, then the zoom motor $MO_2$ is stopped in #1344 in order to drive the AF motor $MO_2$. The program returns to #1340 and kept in a waiting state for the re-application of the high voltage $V_{LEH}$ for the lens unit. If $f_0$ becomes equal to $f_A$ in #1342, then the zoom motor $MO_3$ is stopped in #1345, the photographing distance D is displayed in #1346 and the program proceeds to #1319.

If the data pointer DPO is not $54_H$ in #1331, then whether or not the DPO is $13_H$ is determined in #1351. If DPO=$13_H$, it means that the transmission of 3 bytes lens data from the first address AD1 to the body is requested, so that the full open aperture value Av0, the maximum aperture value Avmax and the deviation of the aperture value ΔAv are transmitted to the body (#1352 to #1354). The program waits for the port $P_{34}$ to which the lens select signal CSL from the body is inputted to attain the "high" level, interruptions are permitted, and the program proceeds to the stopping routine (#1355, #1356). If DPO is not $13_H$ in #1351, then interruptions are permitted in #1356, and the program proceeds to stopping routine.

In the foregoing, the power supply (especially the power supply to the zoom motor $MO_3$) of the lens unit is provided from the power supply battery EB in the body. However, a power supply battery may be provided on the lens unit also, and in that case, the AF motor $MO_2$ and the zoom motor $MO_3$ can be be simultaneously operated regardless of the state of the battery check. Therefore, there is no need to alternately operate the motors $MO_2$ and $MO_3$ in the APZ routine (#1340, #1341, #1343, #1344), so that APZ (Automatic Programming of Zooming) can be carried out at high speed. In addition, when power zooming is to be carried out, there is no need to activate the body from the lens unit and to receive power supply from the body before zooming. However, even in this case, the power zooming may preferably be inhibited in order to maintain high AF precision, when it is detected that AF operation (the focus detection is being carried out or focus adjustment is being carried out) is being carried out.

Figure 46:
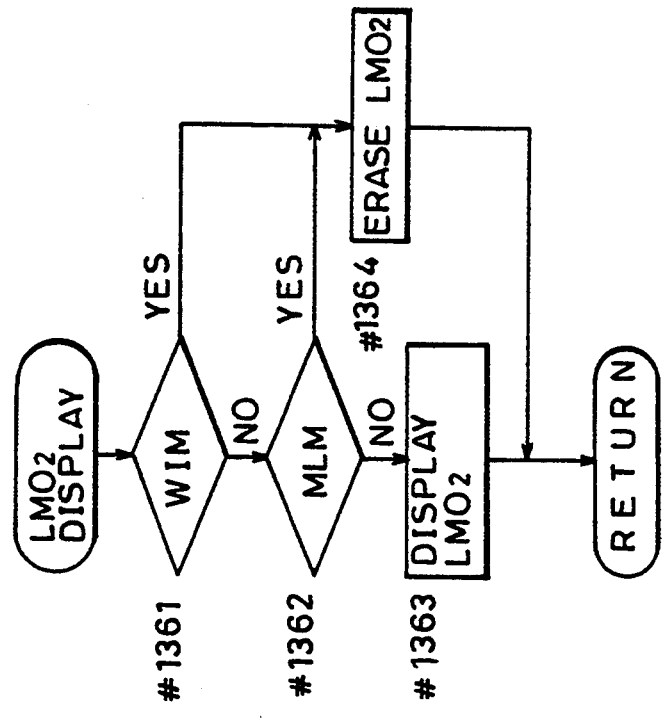

A subroutine for displaying the lens switch mode $LMO_2$ will be described with reference to FIG. 46. In #1361, whether or not it is the WIM (Wide Mode) is determined. In #1362, whether or not it is MLM (Magnification Lock Mode) is determined. If it is the WIM or MLM, then the display of the lens switch mode $LMO_2$ is erased in #1364 and the flow returns to the main flow. If it is neither the WIM nor MLM, then the lens switch mode $LMO_2$ is displayed in #1363, and the flow returns to the main flow.

Figure 47A:
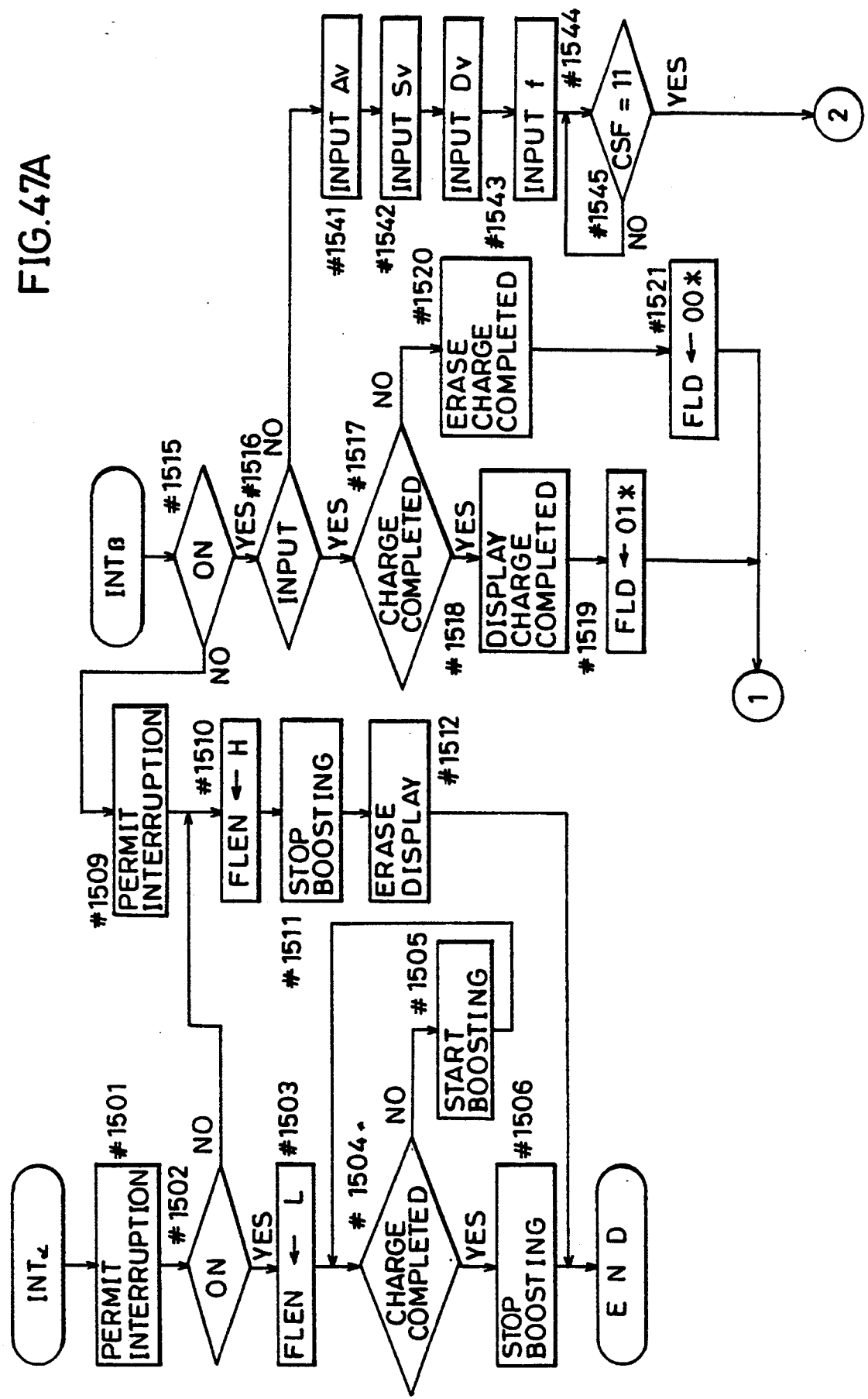
Figure 47B:
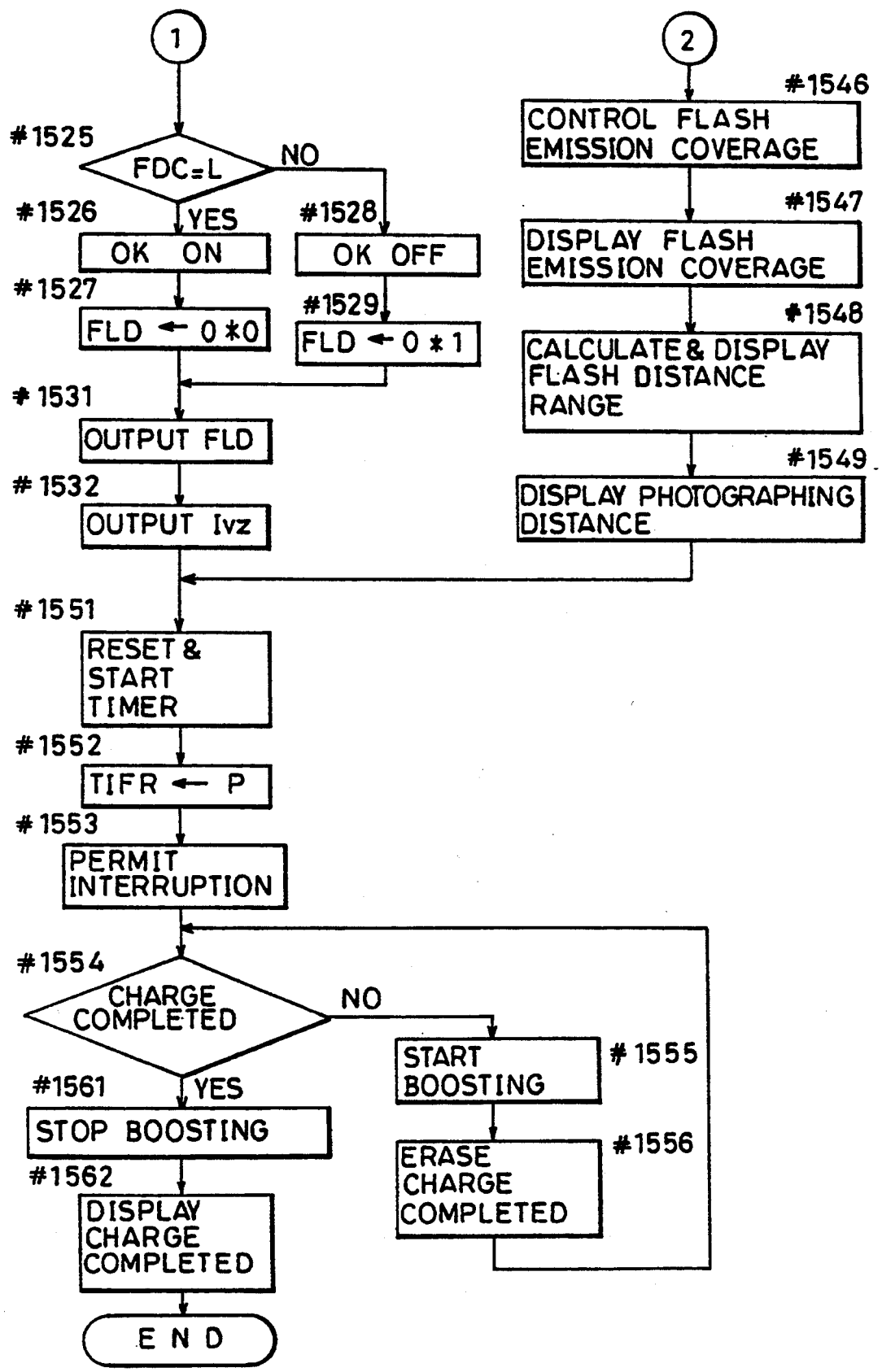

The description of the flow chart showing the operation of the microcomputer CPUL in the lens unit is finished. The flow chart showing the operation of the microcomputer CPUF in the flash will be described in the following. FIG. 47 shows the flow of the operation of the microcomputer CPUF in the flash. When the flash main switch FMS is turned from ON to OFF or from OFF to ON, a "low" level pulse is inputted from a pulse generator $PG_3$ to the interruption terminal $INT_\alpha$, and the interruption routine from the step #1501 of FIG. 47 is executed. In this interruption routine, the interruption is permitted at first, and thereafter whether the flash main switch FMS is ON is determined (#1501, #1502). If the flash main switch FMS is ON, then a flash enable signal FLEN is set to the "low" level so as to permit emission of light, and the boosting circuit DDF in the flash is operated until the charging is completed (#1503 to #1506). If the flash main switch FMS is OFF in #1502, then emission of light is inhibited (FLEN='high"), boosting is stopped, the display is erased, and the operation is stopped (#1510 to #1512).

Meanwhile, if the flash select signal CSF transmitted from the body attains the "low" level, then the interruption routine by the interruption terminal $INT_\beta$ (from the step #1515 of FIG. 47) is executed. In this interruption routine, whether or not the flash main switch FMS is ON is determined (#1515). If the flash main switch FMS is not ON, then interruption is permitted in #1509 and the program proceeds to #1510. If the flash main switch FMS is ON, then whether or not the body is in the flash data input mode is determined (#1516). More specifically, when the flash select signal CSF is at the "high" level at this time, it is determined that the body is in the flash data input mode, and therefore the flash data FLD are transmitted to the body in #1517 to #1531. The flash data FLD are 3 bits ($b_2$, $b_1$, $b_0$) of status data. The ith (i=0 to 2) data will be hereinafter referred to as $FLD_i$. In #1517, whether or not the charging is completed is determined. If the charging is completed, then the charge completion is displayed and data 01* indicating that a dedicated flash is used and the charging is completed are set as the flash data FLD (#1518, #1519). $FLD_2$ being 0 means that a dedicated flash is used, and $FLD_1$ being 1 means that the charging is completed. If the charging has not yet been completed in #1517, then the display of charge completion is erased, and data 00* indicating that a dedicated flash is used and that charging has not yet been completed are set in the flash data FLD (#1520, #1521). $FLD_1$ being 0 indicates that the charging has not yet been completed. If the signal FDC is at the "low" level, then a display is carried out indicating that the proper flash light control is attained, and the data 0*0 indicating that a dedicated flash is used and the proper flash light control is attained are set as the flash data FLD (#1526, #1527). $FLD_0$ being 0 indicates that the proper flash light control is attained. If the signal FLD is not at the "low" level in #1525, then the display of the flash light control is released, and data 0*1 indicating that a dedicated flash is used and that flash light control is not attained are set as the flash data FLD (#1528, #1529). $FLD_0=1$ means that the flash light control is not attained. The flash data FLD set as described above are transmitted to the body as the status data of the flash in #1531. Data $I_{vz}$ of the flash amount in accordance with the flash emission coverage is transmitted to the body, and the program proceeds to #1551.

Meanwhile, if the flash select signal CSF is at the "low" level in #1516, then it is determined that the body is set not in the flash data input mode but the body data output mode. Consequently, the data of the aperture value Av, the film speed $S_v$, photographing distance Dv and of the focal length f are inputted from the body to the flash (#1541 to #1544). When the flash select signal CSF attains the "high" level, then the flash emission range is controlled by the motor $MO_5$ and output of the encoder ZPC in accordance with the focal length f (#1545, #1546). Thereafter, the flash emission range is displayed (#1547), the available flash distance range capable of providing proper exposure by flash is calculated and displayed based on the aperture value Av, the film speed Sv and the data Ivz of the flash amount (#1548), and the photographing distance D is displayed (#1549). Thereafter the program proceeds to #1551.

Figure 48:
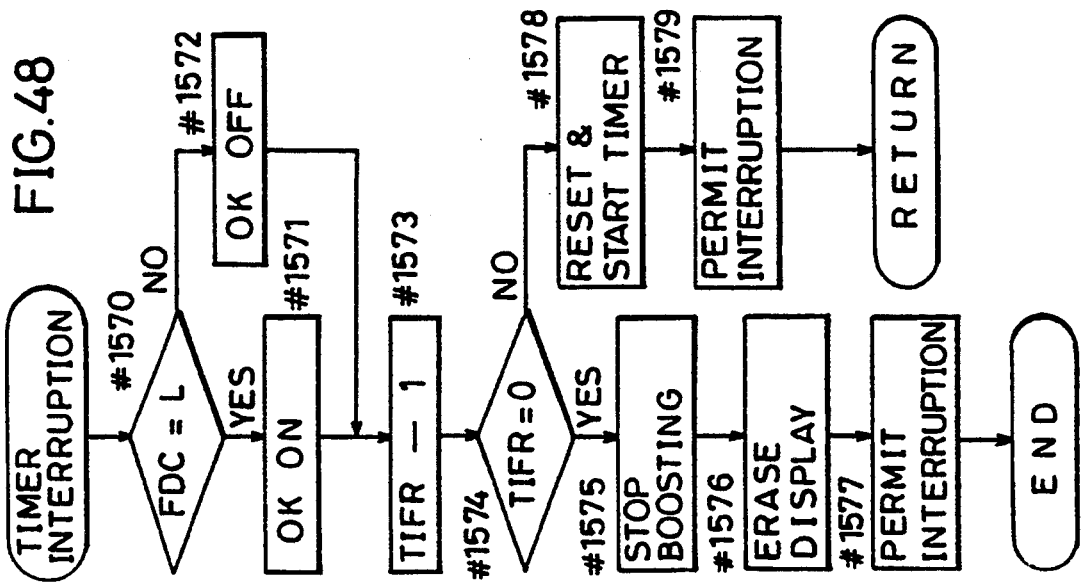

In #1551, the timer is reset and started. A prescribed value P is set in a timer register TIFR of the flash, and an interruption is permitted (#1552, #1553). Thereafter, boosting is carried out until the completion of charging, and when the charging is completed, the display of charge completion is provided (#1554 to #1562). If an interruption by the interruption terminal $INT_\beta$ is generated during this time period, the above described operation is carried out again. If the flash select signal CSF from the body attains the "low" level, a timer interruption is generated. The interruption routine will be described with reference to FIG. 48. If the signal FDC is at the "low" level, then a display is provided indicating that the proper flash light control is attained, and if it is at the "high" level, that indication is erased (#1570 to #1572). The content of the flash timer register TIFR is decremented by 1, and whether or not TIFR=0 is checked (#1573, #1574). If TIFR is not 0, then the timer is again resetted and started (#1578), an interruption is permitted (#1579), and the program returns to the routine of the boosting operation (#1554 to 1556). After a prescribed time period (for example 3 sec) from the completion of communication with the body, TIFR becomes 0 in #1574. Boosting is stopped, displays are turned OFF, interruptions are permitted, and the operation is terminated (#1575 to #1577).

Figure 49:
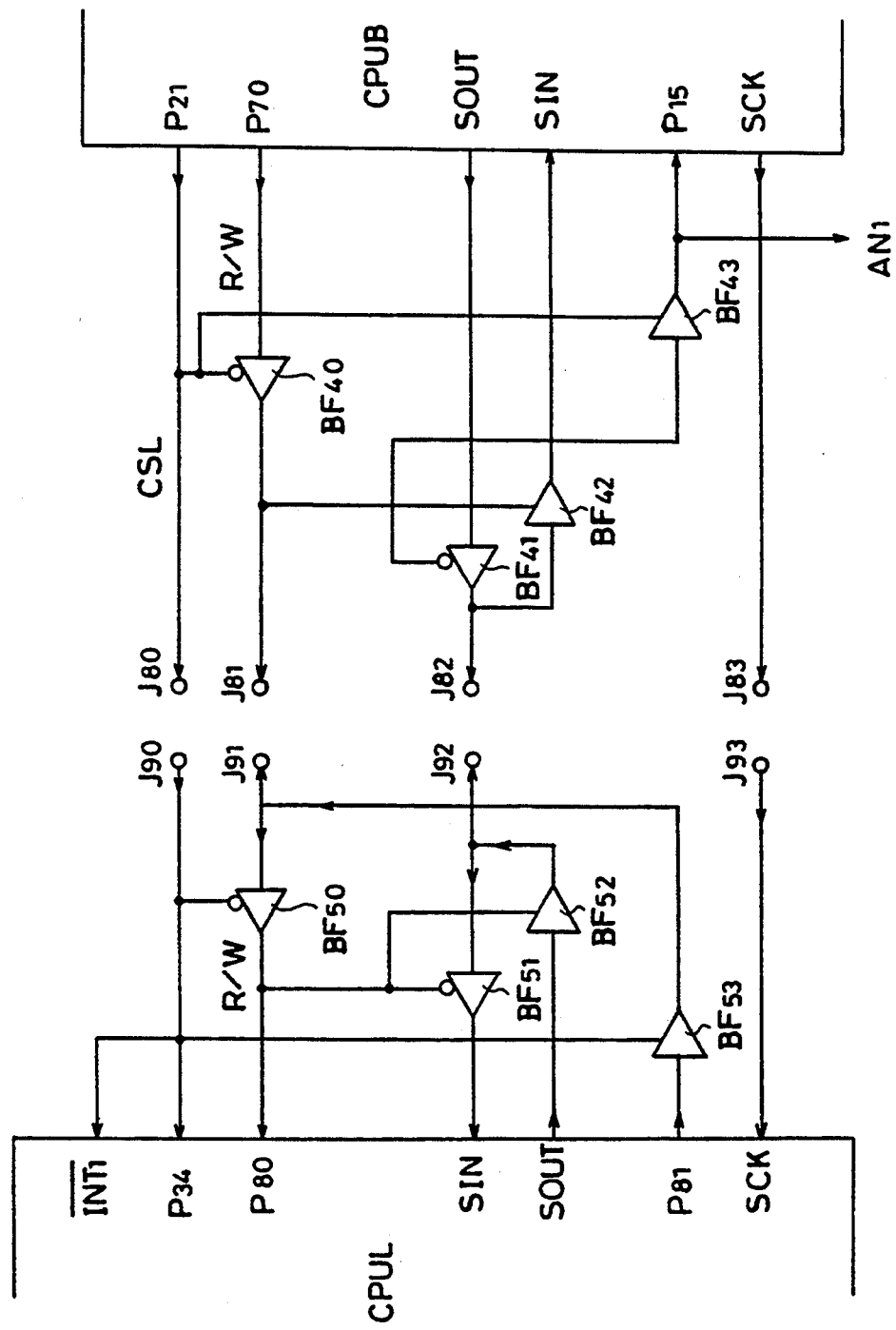
FIG. 49 is a circuit diagram of a modification of the communication circuit between the camera body and the interchangeable lens unit.

FIG. 49 shows a modification of a terminal for transmitting signals between the microcomputer CPUL in the lens unit and the microcomputer CPUB in the body. In this example, the microcomputer CPUL in the lens unit is activated when the lens select signal SCL attains the "low" level. The buffers $BF_{40}$ and $BF_{50}$ are activated and a read/write signal R/W is transmitted to the microcomputer CPUL in the lens unit. If the read/write signal R/W attains the "low" level, the buffers $BF_{41}$ and $BF_{51}$ are activated and the data are transmitted from the microcomputer CPUB in the body to the microcomputer CPUL in the lens unit. When the read/write signal R/W attains the "high" level, the buffers $BF_{52}$ and $BF_{42}$ are activated, and data are transmitted from the microcomputer CPUL in the lens unit to the microcomputer CPUB in the body. When the lens select signal CSL attains the "high" level, the buffers $BF_{40}$ and $BF_{50}$ are set into a high output impedance state and the buffers $BF_{43}$ and the $BF_{53}$ are activated. Therefore, when the port $P_{81}$ attains the "low" level, an interruption signal is inputted to the interruption terminal $INT_A$ through the buffers $BF_{53}$, terminals $J_{91}$ and $J_{81}$, the buffer $BF_{43}$ and an AND gate $AN_1$ to activate the microcomputer CPUB in the body. In this system, also, the number of terminals between the lens unit and the body is the same as that employed in the system shown in FIGS. 3 and 4. The buffers shown in the figure are all tristate buffers.

FIGS. 50 to 52 show program lines of the first to third automatic programming of zooming ($APZ_1$ to $APZ_3$). In the figures, the ordinate represents the focal length f (mm) while the abscissa represents the photographing distance D (m). The reference character $f_T$ represents the focal length at the tele end, while the reference character $f_W$ represents the focal length at the wide end. The reference character $D_T$ represents the photographing distance at the tele end, while $D_W$ represents the photographing distance at the wide end. The reference character $\beta_T$ represents the magnification rate at the tele end while $\beta_W$ represents the magnification rate at the wide end. The respective program lines will be described in the following.

As for the program line of the first automatic programming of zooming $APZ_1$, when $D \leq D_W$, then $f_A = f_W$, when $D \geq D_T$, then $f_A = f_T$, and when $D_W < D < D_T$, then the program line becomes a line passing through the points ($D_W$, $f_W$) and ($D_T$, $f_T$) as shown in FIG. 50. Namely, in case of this program line, the points ($D_W$, $f_W$) and ($D_T$, $f_T$) are connected by a line having a constant gradient, and the magnification rate $\beta_T$ at the photographing distance $D_T$ at the tele end is smaller than magnification rate $\beta_W$ at the photographing distance $D_W$ at the wide end. The characteristics in photographing is that a person as well as the background are photographed in appropriate size. When the photographing distance D is large, the person is photographed a little smaller, and if the distance D is small, the person is photographed a little larger.

The program line of the second automatic programming of zooming $APZ_2$ is as shown by a solid line of FIG. 51, in which when $D \leq D_1$, then $f_A = f_W$, $D \geq D_4$, then $f_A = f_T$, when $D_1 < D \leq D_2$, it becomes a line passing through the points ($D_1$, $F_W$) and ($D_2$, $f_2$), when $D_2 < D \leq D_3$, then $f_A = D \times \beta_{23}$ ($\beta_1 > \beta_{23} > \beta_4$), and when $D_3 < D \leq D_4$, it becomes a line passing through the points ($D_3$, $f_3$) and ($D_4$, $f_T$). As shown by this program line, compared with the first program line (represented by a thin solid line), the magnification rate $\beta$ is generally larger, and it is steeper than the first program line. The photographing characteristic is that a person is photographed in an appropriate size, and the person (or the main object) is emphasized by vignetting the background.

Finally, the program line of the third automatic programming of zooming $APZ_3$ is as shown in FIG. 52, in which when $D \leq D_1$, then $f_A = f_W$, when $D \geq D_4$, then $f_A = f_T$, when $D_1 < D \leq D_2$, then it becomes a line passing through the points ($D_1$, $F_W$) and ($D_2$, $f_2$), when $D_2 < D \leq D_3$, then $f_A = D \times \beta_{23}$ ($\beta_1 > \beta_{23} > \beta_4$), and when $D_3 < D = D_4$, then it becomes a line passing through the points ($D_3$, $f_3$) and ($D_4$, $f_T$). Compared with the first program line (represented by a thin solid line), the magnification rate $\beta$ is generally smaller, and the program line is less steeper than the first program line. The photographing characteristic is that a deep snap shot can be taken.

Figure 53:
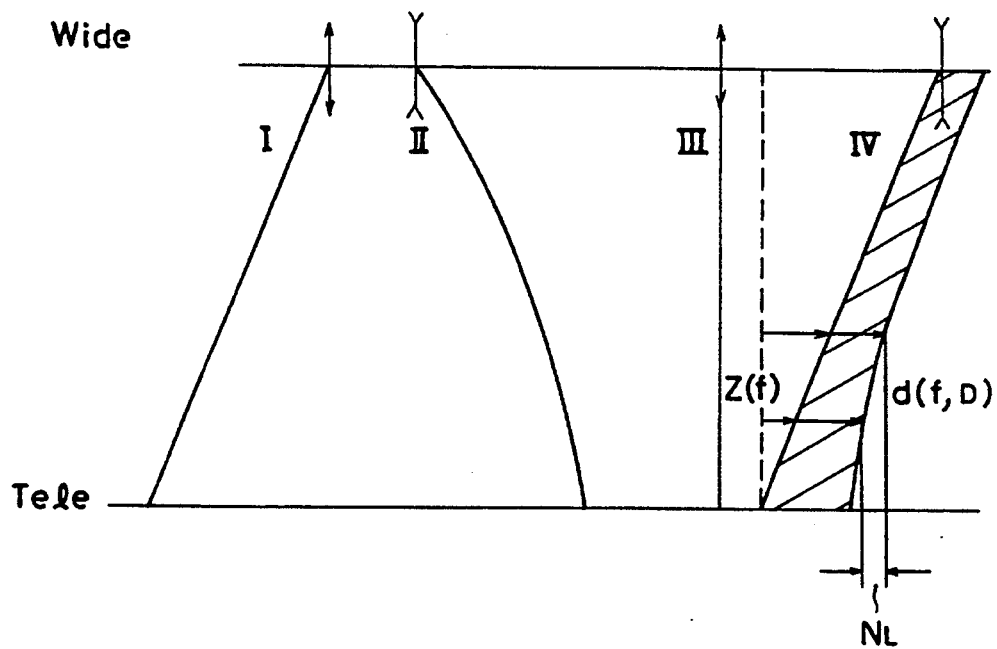
FIGS. 53 and 54 illustrate a method for calculating an offset amount of a valuable focal length employed in the present invention.
Figure 54:
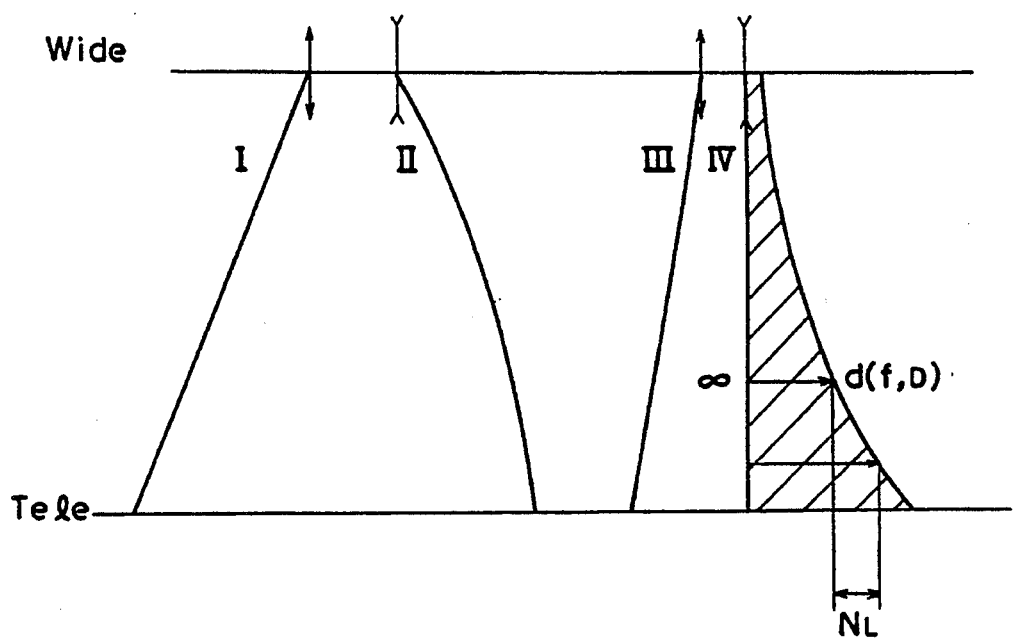

FIGS. 53 and 54 illustrate a method for calculating the offset amount $N_L$ for driving the focusing lens in the offset routine (SUB13), when a varifocal lens is used. In the figures, the reference characters I to IV represent lenses of the first to fourth lens groups. The horizontal direction represents the direction of the optical axis of the lens, and the vertical direction shows changes in the focal length during zooming. An upper horizontal line represents arrangements of respective lenses at the wide end, while the lower horizontal line represents the arrangements of the respective lenses at the tele end. At arbitrary zooming positions between the wide end and the tele end, the respective lenses are moved in relation with each other so that the lenses are arranged at the intersection of the horizontal line and the tracks represented by the curves. The focusing lens is the lens IV of the fourth group, and the offset amount $N_L$ is determined such that the lens is in the hatched range.

When we represent the photographing distance as D, the amount of forward movement of the lens from the infinite photographing position to the photographing distance D as d, the change of the amount d as $\Delta d$, the defocus amount as $\Delta L$ and $\Delta d / \Delta L = K_0$, then the following equation can be applied.

$$d = f^2 \cdot K_0 / D \qquad (1)$$

When we represent the number of rotation of the AF coupler from the infinite photographing position to the photographing distance D as $N_L$ and the amount of change of the number of rotation as $\Delta N_L$ and $\Delta N_L / \Delta L = K_L$, then the following equation can be applied.

$$N_L = f^2 \cdot K_L / D \qquad (2)$$

Let us assume that when the focal length is $f = f_1$, the in-focus state is realized at the photographing distance $D = D_1$ and $K_L = K_{L1}$, $N_L = N_{L1}$. When zooming is to be carried out from this state to a state in which the focal length is $f = f_2$, the photographing distance is $D = D_2$, $K_L = K_{L2}$, and $N_L = N_{L2}$, then the offset amount $N_L$ for moving the focusing lens to a range permitting focus detection will be represented as follows, when the lens shown in FIG. 54 is used:

$$N_L = f_2^2 \cdot K_{L2}/D - f_1^2 \cdot K_{L1}/D = f_2^2 \cdot K_{L2}/D - N_{L1} \qquad (3)$$

when the lens shown in FIG. 54 is used, it will be represented as $$N_L = f_2^2 \cdot K_{L2}/D - N_{L1} + \{N_Z(f_2) - N_Z(f_1)\} \qquad (4)$$

In the equation, $N_Z(f)$ is an amount of movement of the lens which becomes necessary as the infinite position is changed by the zooming, which is a function variously changed by dependent on optical design. In the above equation, the conversion coefficient $K_L$ is in one to one correspondence with the focal length f, however, the manner of correspondence is different in each lens, so that the correspondence is stored in the form of a table in the memory of the lens unit. In case of a zoom lens in which focusing is carried out by a rear lens group and the infinite position is stable, such as shown in FIG. 54, the conversion coefficient $K_L$ is not changed during zooming as in the case of the whole unit forwarding zoom, so that the equation (3) can be changed to $$N_L = (f_2^2 - f_1^2) \cdot K_L/D$$

Although a camera employing interchangeable lens unit has been described in the foregoing, the present invention can be applied to a camera in which the zoom lens is fixedly attached thereto. Although the setting of the exposure during zooming is carried out by attaching an IC card in the foregoing, it may be set by a mode button on the camera body or on the lens unit. Although a focal plane shutter is described, a lens shutter serving also as a diaphragm may be used. In that case, exposure on the entire film surface is carried out from the opening of the shutter, so that the limit exposure time can be made shorter than in the case of the focal plane shutter, by carrying zooming after a prescribed time period after the opening of the shutter, when photographing is to be carried out under the natural light. When photographing operation is to be carried out with flash emission, the flash may be emitted at the time when the aperture opening determined by a flashmatic calculation is realized, and zooming may be carried out after the emission of the flash.

In the above described embodiment, the lens is initially set at the wide end, and zooming is carried out toward the tele end. However, the lens may be initially set at the tele end and it may be moved toward the wide end during exposure to provide a different effect, or the direction may be switched. The same effect as the above described embodiment may be provided by setting the lens at the tele end at first and by exposing for a longer time period at the wide end finally at last. The speed of zooming may be controlled by calculating the speed based on the exposure time and the range of zooming. The range of zooming is defined as the entire zoom range of the zoom lens or the range set by the user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera system having a varifocal lens in which an in-focus position of a focusing lens is changed in correspondence with a change in focal length, comprising:

(a) varifocal lens driving means having a zooming motor for driving said varifocal lens;

(b) focusing lens driving means having a focusing motor for driving said focusing lens;

(c) a power supply for supplying power to said zooming motor and said focusing motor;

(d) power supply capacity detecting means for detecting the capacity of said power supply; and (e) lens driving control means for controlling said motors so as to vary the driving manner of the motors corresponding to said power supply capacity.

2. A camera system according to claim 1, wherein said power supply capacity detecting means detects four different levels of said power supply capacity and outputs a corresponding signal ranging from first to fourth levels.

3. A camera system according to claim 2, wherein said lens driving controlling means simultaneously drives said zooming motor and said focusing motor when said power supply capacity detecting means outputs said signal of the first level.

4. A camera system according to claim 2, wherein said lens driving controlling means alternately drives said zooming motor and said focusing motor when said power supply capacity detecting means outputs said signal of the second level.

5. A camera system according to claim 2, further comprising
   first warning means for giving a warning when said power supply capacity detecting means outputs said signal of the third level.

6. A camera system according to claim 2 wherein said lens driving controlling means alternately drives said zooming motor and said focusing motor when said power supply capacity detecting means outputs said signal of the third level.

7. A camera system according to claim 2, further comprising second warning means for giving a warning when said power supply capacity detecting means outputs said signal of the fourth level.

8. A camera system according to claim 2 wherein said lens driving controlling means inhibits driving of said zooming motor and said focusing motor when said power supply capacity detecting means outputs said signal of the fourth level.

9. A camera system according to claim 8 wherein said lens driving controlling means alternately drives said zooming motor and said focusing motor when said power supply capacity detecting means outputs said signal of the third level.

10. A camera system according to claim 10 wherein said lens driving controlling means inhibits driving of said zooming motor and said focusing motor when said power supply capacity detecting means outputs said signal of the fourth level.

11. A camera system having a varifocal lens in which an in-focus position of a focusing lens is changed in a correspondence with a change in focal length, comprising:

(a) varifocal lens driving means having a zooming motor for driving said varifocal lens;

(b) focusing lens driving means having a focusing motor for driving said focusing lens;

(c) a power supply for supplying power to said zooming motor and said focusing motor;

(d) power supply capacity detecting means for detecting whether the capacity of said power supply is below a predetermined level; and (e) lens driving controlling means for controlling said motors in a first manner when said power supply capacity is below the predetermined level and in a second manner when said power supply capacity is not below the predetermined level.

12. A camera system according to claim 11, wherein said motors are driven alternately in said first manner and are driven simultaneously in said second manner.

* * * * *